United States Patent
Newman et al.

(10) Patent No.: US 9,896,096 B2
(45) Date of Patent: Feb. 20, 2018

(54) SYSTEMS AND METHODS FOR HAZARD MITIGATION

(71) Applicants: David E. Newman, Poway, CA (US); R. Kemp Massengill, Leucadia, CA (US)

(72) Inventors: David E. Newman, Poway, CA (US); R. Kemp Massengill, Leucadia, CA (US)

(*) Notice: Subject to any disclaimer, the term of this patent is extended or adjusted under 35 U.S.C. 154(b) by 0 days.

(21) Appl. No.: 15/347,573

(22) Filed: Nov. 9, 2016

(65) Prior Publication Data
US 2017/0291602 A1    Oct. 12, 2017

Related U.S. Application Data

(60) Provisional application No. 62/390,847, filed on Apr. 11, 2016, provisional application No. 62/391,443, (Continued)

(51) Int. Cl.
*G08G 1/16* (2006.01)
*G01S 13/93* (2006.01)
(Continued)

(52) U.S. Cl.
CPC ............ *B60W 30/09* (2013.01); *B60Q 9/008* (2013.01); *B60W 10/04* (2013.01); *B60W 10/18* (2013.01);
(Continued)

(58) Field of Classification Search
None
See application file for complete search history.

(56) References Cited

U.S. PATENT DOCUMENTS

| 3,466,409 A | 9/1969 | Pernet |
| 3,882,449 A | 5/1975 | Bouchard |

(Continued)

FOREIGN PATENT DOCUMENTS

EP    0136553 A2    4/1985

OTHER PUBLICATIONS

"Automatic Post-Collision Braking System", Volkswagon, Retrieved from: http://www.volkswagen.co.uk/technology/braking-and-stability-systems/automatic-post-collision-braking-system Retrieved on: Oct. 31, 2016 (3 pages total).

(Continued)

*Primary Examiner* — John Olszewski
*Assistant Examiner* — Navid Ziaeianmehdizadeh
(74) *Attorney, Agent, or Firm* — Mark D. Wieczorek; Stuart H. Mayer; Mayer & Williams PC

(57) ABSTRACT

A system and method to avoid collisions on highways, and to minimize the fatalities, injury, and damage when a collision is unavoidable. The system includes sensor means to detect other vehicles, and computing means to evaluate when a collision is imminent and to determine whether the collision is avoidable. If the collision is avoidable by a sequence of controlled accelerations and decelerations and steering, the system implements that sequence of actions automatically. If the collision is unavoidable, a different sequence is implemented to minimize the overall harm of the unavoidable collision. The system further includes indirect mitigation steps such as flashing the brake lights automatically. An optional post-collision strategy is implemented to prevent secondary collisions, particularly if the driver is incapacitated. Adjustment means enable the driver to set the type and timing of automatic interventions.

30 Claims, 22 Drawing Sheets

Related U.S. Application Data filed on Apr. 29, 2016, provisional application No. 62/392,003, filed on May 16, 2016, provisional application No. 62/392,010, filed on May 17, 2016, provisional application No. 62/493,266, filed on Jun. 27, 2016, provisional application No. 62/494,750, filed on Aug. 18, 2016.

(51) Int. Cl.

| | | |
|---|---|---|
| *B60W 30/09* | (2012.01) | |
| *B60W 10/20* | (2006.01) | |
| *B60W 10/04* | (2006.01) | |
| *B60W 10/18* | (2012.01) | |
| *B60W 30/095* | (2012.01) | |
| *B60Q 9/00* | (2006.01) | |
| *B60W 50/16* | (2012.01) | |
| *B60W 50/12* | (2012.01) | |
| *B60W 50/14* | (2012.01) | |
| *G05D 1/02* | (2006.01) | |

(52) U.S. Cl.
CPC ........ *B60W 10/20* (2013.01); *B60W 30/0956* (2013.01); *B60W 50/12* (2013.01); *B60W 50/14* (2013.01); *B60W 50/16* (2013.01); *G05D 1/0214* (2013.01); *G08G 1/16* (2013.01); *B60W 2050/143* (2013.01); *B60W 2420/42* (2013.01); *B60W 2420/52* (2013.01); *B60W 2550/10* (2013.01); *B60W 2710/00* (2013.01); *B60W 2750/30* (2013.01); *G05D 2201/0213* (2013.01)

(56) References Cited

U.S. PATENT DOCUMENTS

| | | | |
|---|---|---|---|
| 3,952,381 A | 4/1976 | Barbe | |
| 4,381,829 A | 5/1983 | Montaron | |
| 4,524,287 A | 6/1985 | Brannen | |
| 5,894,906 A | 4/1999 | Weber | |
| 5,959,552 A * | 9/1999 | Cho | B60R 19/205 180/167 |
| 5,983,161 A | 11/1999 | Lemelson | |
| 6,084,508 A | 7/2000 | Mai | |
| 6,269,308 B1 | 7/2001 | Kodaka | |
| 6,275,773 B1 | 8/2001 | Lemelson | |
| 6,317,692 B2 | 11/2001 | Kodaka | |
| 6,359,553 B1 * | 3/2002 | Kopischke | B60Q 9/008 180/169 |
| 6,420,996 B1 * | 7/2002 | Stopczynski | G01S 13/765 340/435 |
| 6,442,485 B2 | 8/2002 | Evans | |
| 6,496,764 B1 * | 12/2002 | Wang | B60R 21/0132 280/728.1 |
| 6,597,974 B2 * | 7/2003 | Roelleke | B60R 21/0132 180/282 |
| 6,791,471 B2 | 9/2004 | Wehner | |
| 6,831,572 B2 * | 12/2004 | Strumolo | B60Q 1/525 180/167 |
| 7,016,782 B2 * | 3/2006 | Schiffmann | G01S 13/505 340/903 |
| 7,124,027 B1 * | 10/2006 | Ernst, Jr. | B60W 30/09 340/435 |
| 7,409,295 B2 * | 8/2008 | Paradie | G06K 9/00805 701/301 |
| 7,696,863 B2 * | 4/2010 | Lucas | B60K 31/0008 340/435 |
| 7,840,354 B2 * | 11/2010 | Knoop | B60T 7/042 180/275 |
| 7,966,127 B2 * | 6/2011 | Ono | B60R 21/0134 701/300 |
| 8,447,472 B2 * | 5/2013 | Joh | G01S 13/723 701/30.1 |
| 8,463,500 B2 * | 6/2013 | Cuddihy | B60R 21/0132 280/735 |
| 8,527,172 B2 | 9/2013 | Moshchuk | |
| 8,538,674 B2 * | 9/2013 | Breuer | B60T 8/17558 340/436 |
| 8,849,515 B2 * | 9/2014 | Moshchuk | B62D 15/0265 340/435 |
| 9,031,743 B2 | 5/2015 | Okita | |
| 9,031,761 B2 | 5/2015 | Koshizen | |
| 9,031,774 B2 | 5/2015 | Suk | |
| 9,037,379 B2 | 5/2015 | Shin | |
| 9,108,582 B1 * | 8/2015 | Kozloski | B60R 21/0132 |
| 9,165,469 B2 * | 10/2015 | Bowers | G08G 1/161 |
| 9,250,324 B2 * | 2/2016 | Zeng | G01S 13/87 |
| 9,318,023 B2 * | 4/2016 | Moshchuk | G08G 1/167 |
| 2003/0067219 A1 * | 4/2003 | Seto | B60T 7/22 303/193 |
| 2003/0080543 A1 * | 5/2003 | Takagi | B60R 21/01512 280/735 |
| 2004/0030498 A1 * | 2/2004 | Knoop | B60T 7/22 701/301 |
| 2004/0122578 A1 * | 6/2004 | Isaji | B60T 7/12 701/70 |
| 2004/0193374 A1 * | 9/2004 | Hac | B60K 31/0008 701/301 |
| 2005/0071071 A1 | 3/2005 | Nagata | |
| 2005/0107955 A1 * | 5/2005 | Isaji | B60R 21/0134 701/301 |
| 2005/0131646 A1 * | 6/2005 | Camus | B60R 21/013 701/301 |
| 2005/0280520 A1 * | 12/2005 | Kubo | B60Q 9/008 340/435 |
| 2006/0085131 A1 | 4/2006 | Yopp | |
| 2006/0091654 A1 * | 5/2006 | De Mersseman | B60R 21/013 280/735 |
| 2006/0109094 A1 * | 5/2006 | Prakah-Asante | B60Q 9/008 340/435 |
| 2006/0282218 A1 * | 12/2006 | Urai | G08G 1/166 701/301 |
| 2007/0080825 A1 * | 4/2007 | Shiller | B60R 21/013 340/903 |
| 2007/0112516 A1 * | 5/2007 | Taniguchi | B60R 21/0134 701/301 |
| 2007/0125588 A1 | 6/2007 | Akgun | |
| 2007/0219672 A1 * | 9/2007 | Fehr | B60W 40/08 701/1 |
| 2007/0282530 A1 * | 12/2007 | Meister | B60K 31/0008 701/301 |
| 2008/0208408 A1 * | 8/2008 | Arbitmann | B60W 10/06 701/41 |
| 2008/0300755 A1 | 12/2008 | Madau | |
| 2008/0319610 A1 * | 12/2008 | Oechsle | B60R 21/0134 701/41 |
| 2009/0018740 A1 | 1/2009 | Noda | |
| 2009/0066492 A1 * | 3/2009 | Kubota | G08G 1/161 340/436 |
| 2009/0143951 A1 | 6/2009 | JunyaTakahashi | |
| 2009/0157247 A1 | 6/2009 | Sjogren | |
| 2009/0192683 A1 * | 7/2009 | Kondou | B60W 10/18 701/53 |
| 2009/0292468 A1 * | 11/2009 | Wu | G01S 13/726 701/301 |
| 2009/0299593 A1 * | 12/2009 | Borchers | B60W 10/184 701/70 |
| 2009/0322500 A1 | 12/2009 | Chatterjee | |
| 2011/0035116 A1 * | 2/2011 | Ieda | B60R 21/0134 701/45 |
| 2011/0178710 A1 * | 7/2011 | Pilutti | B60T 7/22 701/301 |
| 2012/0083947 A1 * | 4/2012 | Anderson | B60W 30/09 701/3 |
| 2012/0101713 A1 * | 4/2012 | Moshchuk | B60W 10/184 701/301 |
| 2012/0130561 A1 | 5/2012 | Chiang | |
| 2012/0130629 A1 | 5/2012 | Kim | |
| 2012/0235853 A1 | 9/2012 | Takeuchi | |

(56) References Cited

U.S. PATENT DOCUMENTS

| | | | |
|---|---|---|---|
| 2013/0030651 A1* | 1/2013 | Moshchuk | G08G 1/166 701/41 |
| 2013/0030686 A1 | 1/2013 | Morotomi | |
| 2013/0054128 A1* | 2/2013 | Moshchuk | G08G 1/167 701/301 |
| 2013/0166150 A1* | 6/2013 | Han | B60W 10/18 701/42 |
| 2014/0039786 A1* | 2/2014 | Schleicher | B60W 30/09 701/301 |
| 2014/0156157 A1* | 6/2014 | Johnson | B60T 7/22 701/70 |
| 2015/0046078 A1 | 2/2015 | Biess | |
| 2015/0262487 A1 | 9/2015 | Cazanas | |
| 2015/0307097 A1 | 10/2015 | Steinmeyer | |
| 2015/0336574 A1 | 11/2015 | Akiyama | |
| 2015/0336579 A1 | 11/2015 | Yoshizawa | |
| 2016/0071417 A1 | 3/2016 | Lewis | |
| 2016/0103218 A1 | 4/2016 | Mandava | |
| 2016/0121887 A1 | 5/2016 | Jeon | |
| 2016/0163199 A1 | 6/2016 | Chundrlik | |
| 2016/0167671 A1 | 6/2016 | Offenhaeuser | |
| 2016/0200318 A1 | 7/2016 | Parikh | |
| 2016/0200319 A1 | 7/2016 | Nemoto | |
| 2016/0200320 A1 | 7/2016 | Nemoto | |
| 2016/0200321 A1 | 7/2016 | Yamada | |
| 2016/0288799 A1* | 10/2016 | Nguyen Van | B60W 50/029 |

OTHER PUBLICATIONS

"Emergency", OnStar, Retrieved from: https://www.onstar.com/us/en/services/emergency.html Retrieved on: Nov. 9, 2016 (4 pages total).

Emison, J. Kent, "Post-collision fuel-fed fires.", Apr. 1, 2995, The Free Library, Retrieved Nov. 9, 2016, Retrieved from: https://www.thefreelibrary.com/Post-collision+fuel-fed+fires.-a016859548 (5 pages).

* cited by examiner

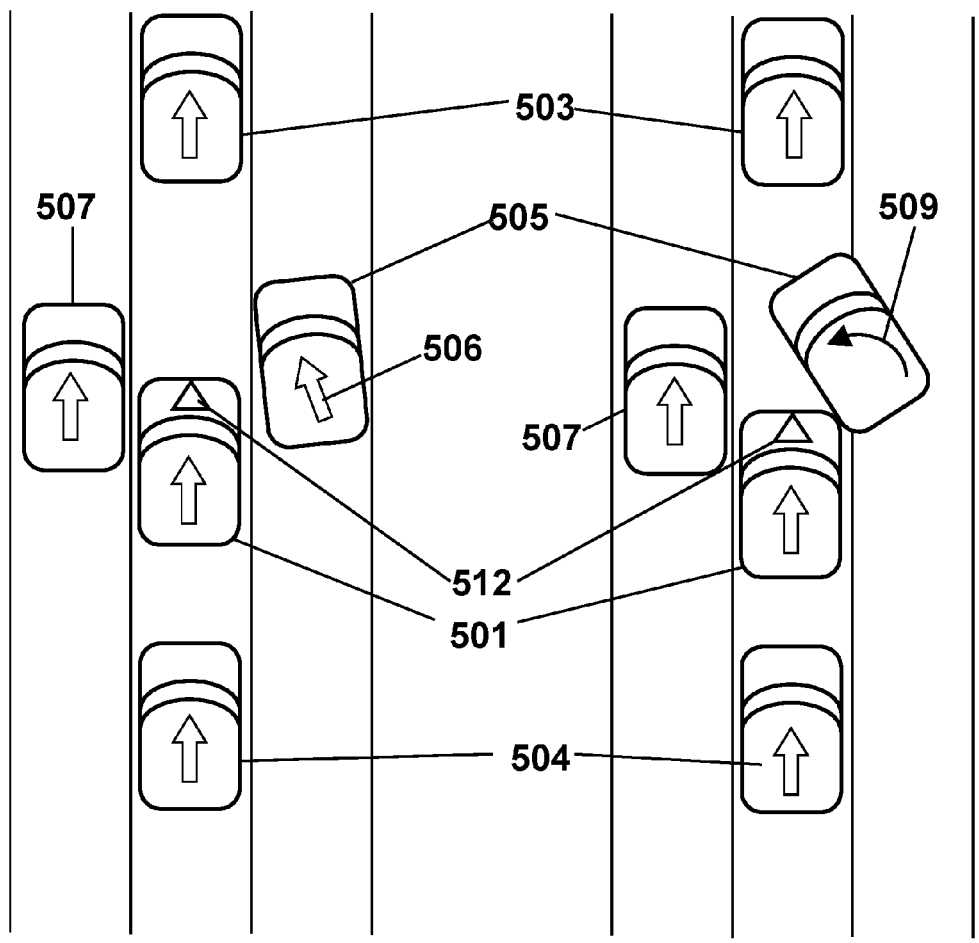

FIG. 16

EXEMPLARY STRATEGY TO AVOID A COLLISION

Scenario: The leading vehicle is slowing down, the following vehicle is accelerating, the left lane is blocked by a truck, the right lane is blocked by a car, but there is ample space behind the car.

1. Simultaneously:
    1a. Illuminate brake lights to alert the following driver.
    1b. Apply maximum braking.
    1c. Inform subject driver that intervention is started.
2. When sufficiently behind the right-side car:
    2a. Release brakes.
    2b. Steer right at 20 degrees.
3. When fully in right lane:
    3a. Steer left 20 degrees.
    3b. Apply brakes at one-half maximum.
4. When straightened in the lane:
    4a. Release brakes.
    4b. Steer to center of lane.
    4c. Turn off the brake lights.
    4d. Inform driver that intervention is over.
5. When the driver takes any action:
    5a. Relinquish all control.

FIG. 17

| ADJUSTMENT MEANS | EXEMPLARY SETTINGS |
|---|---|
| Switch | Toggle up |
| | Toggle down |
| Knob | Fully clockwise |
| | Fully counter-clockwise |
| | Halfway around |
| Button pair | Press first button |
| | Press second button |
| Slider | Slider full-left |
| | Slider full-right |
| | Slider in middle |
| Voice-controlled selector | Driver says "increase level" |
| | Driver says "decrease level" |

FIG. 18

| DEGREE OF ASSISTANCE | EXEMPLARY SETTING | TYPICAL ACTIONS |
| --- | --- | --- |
| Low assistance | Warn only | Spoken message warns diver when collision is imminent. |
| Medium assistance | Relinquish on demand | System attempts to control the vehicle in emergency, but relinquishes to driver if driver asserts control. |
| High assistance | Intervene until safe | System takes over and controls the vehicle until all hazards have cleared. |

SYSTEMS AND METHODS FOR HAZARD MITIGATION

PRIORITY CLAIMS AND RELATED APPLICATION

This application claims the benefit of the following U.S. Provisional Patent Applications: No. 62/390,847 entitled "Vehicle Collision Mitigation" and filed on Apr. 11, 2016; No. 62/391,443 entitled "Vehicle Side Collision Mitigation" and filed on Apr. 29, 2016; No. 62/392,003 entitled "Adjustable Driving Assistant" and filed on May 16, 2016; No. 62/392,010 entitled "Vehicle Post-Collision Mitigation" and filed on May 17, 2016; No. 62/493,266 entitled "Hazard Mitigation" and filed on Jun. 27, 2016; No. 62/494,750 entitled "Hazard Mitigation" and filed on Aug. 18, 2016; the entire disclosures of which are incorporated by reference as part of the specification of this application.

FIELD OF THE INVENTION

The invention relates to methods and systems for avoiding collisions involving motor vehicles, and for minimizing the destructiveness of such collisions when they are unavoidable.

BACKGROUND OF THE INVENTION

Each year 1.25 million people are killed worldwide in traffic accidents, including 35,000 in the US. Ninety percent are due to human error. For example, a common highway hazard occurs when heavy traffic suddenly slows down. The car ahead is frantically braking or has already stopped, but the approaching drivers from behind are still unaware of the slowdown. Often the lanes on both sides are blocked. In this case, a driver must apply the brakes rapidly to avoid a collision, but not so rapidly that the car skids or that the car behind cannot stop in time. The problem gets worse for each subsequent driver in the lane, since there is less time for each driver to react due to the accumulated delay times of all the drivers in front. An alert driver can usually avoid a collision by skillfully braking, but there are times when it is simply not possible to avoid a collision.

A second common hazard occurs when two cars are traveling in substantially the same direction, and one car gradually approaches the other from the side, such as may occur during lane-change maneuvers, or while merging onto a multilane highway, or from driver inattention, or while swerving to avoid an obstacle, or for many other causes. One or both drivers may be able to avoid a side-encroachment collision by braking or swerving, but sometimes a collision is unavoidable. Often one of the cars is in the "blind spot" of the other driver, and often one or both drivers are unaware of the hazard until too late to avoid it. Not uncommonly, one of the drivers makes matters worse by taking such strong evasive action that the vehicle starts to skid.

A third important hazard develops after a collision has already occurred. The immediate post-collision period is extremely dangerous because other vehicles may be rapidly approaching, their drivers not yet aware of the problem. Often the drivers of collided vehicles are disoriented and, at least temporarily, in no shape to manage the post-collision hazards. Often the scene is chaotic, with cars strewn across lanes at random angles. Especially in snow or fog, this may lead to a cascade sequence in which numerous vehicles unavoidably crash into the tangled pile. The risk of fire is extreme. Many accident victims are relatively unharmed in the initial accident, but are then seriously injured or killed during the post-collision period, due to secondary collisions or fire or for lack of timely assistance.

Prior art in this field includes numerous collision-avoidance schemes involving sensing the distance to the car in front and automatically applying the brakes. However, such schemes may not leave enough time for the next-following car to stop, resulting in a collision from behind. This situation becomes even more hazardous if the automatic system applies the brakes too aggressively so as to leave a large space in front, since this gives the following driver even less time to react. When a collision is unavoidable, prior-art systems generally adhere to an avoidance strategy despite its futility, which often results in worse damage and injuries than otherwise.

A further limitation of prior art collision-avoidance systems is a lack of accounting for each driver's abilities. Often an alert driver with good reflexes may be able to avoid a collision even better than the automatic system. If the automatic system takes control away from such a driver, clearly the system would not be providing a benefit of any kind. Moreover, the skilled driver will probably resent having the control taken away at the most critical moment, and will probably be angry knowing that he could have avoided the collision if the system had allowed him to do so. Such a driver would likely disable the automatic system in response, thereby losing automatic assistance in a future emergency in which he may need the help. Prior-art collision-avoidance systems are typically just simple on-or-off, one-size-fits-all systems, offering no user-adjustable features. Clearly, such a system would not work well for drivers having widely different skill levels.

What is needed is automatic means for recognizing traffic hazards, including in-lane hazards and side-encroachment hazards, and for avoiding collisions automatically when it is possible to do so, and for minimizing the harm or destructiveness of collisions when they are unavoidable. Preferably the system would also manage post-collision hazards in real time. Preferably the system would be adjustable by the driver to provide the level and type of intervention that the driver requires.

SUMMARY OF THE INVENTION

As noted above, prior-art systems fail to provide a strategy for minimizing the fatalities and injuries and damage in situations when a collision is unavoidable, other than stupidly following a collision-avoidance strategy that is already known to fail. Simply locking the brakes is not an effective strategy. Many of the above-noted fatalities, and innumerable injuries, would be avoided if an automatic system were available with an intelligent vehicle intervention capability.

Accordingly, systems and methods according to present principles are directed towards a system and method to avoid collisions when possible, and to minimize the harm of a collision when it is unavoidable. The systems and methods may be embodied in a non-transitory computer-readable medium, which includes instructions for causing a computing environment to perform a method for mitigating vehicle collisions. In one implementation, a method according to present principles includes analyzing sensor data, detecting a second vehicle, and calculating whether a collision with the second vehicle can be avoided by implementing a set of sequential actions (a "sequence") such as braking or steering or positively accelerating the subject vehicle. If the collision can be so avoided, the collision is termed "avoidable", and the sequence of actions is then implemented. If the collision cannot be avoided by the sequence of actions, or by any other sequence analyzed by the system, then the collision is "unavoidable", and a second sequence of actions is prepared to minimize the harm caused by the unavoidable collision, and the second sequence is implemented. The selected sequence of actions is implemented by sequentially controlling the brakes, throttle, and steering of the subject vehicle according to the second sequence. Preferably each sequence also specifies the timing, intensity, duration, and other parameters of each action in the sequence as well. The sequence may further include actions other than accelerations such as illuminating brake lights and sending a help-request message. The system preferably informs the driver that an intervention is in progress, but preferably does not attempt to inform the driver of the specific steps of the sequence, since no human could study the sequence fast enough to be of assistance. Also, the sequence may be revised multiple times during the intervention due to changing circumstances. Thus the sequence is implemented automatically and transparently to the driver.

As an alternative method, a second vehicle may be detected using sensor data, and the position and velocity of the second vehicle could be derived from the sensor data by calculation. Then, the system could project the position and velocity of the second vehicle forward in time relative to the subject vehicle, and determine whether a collision is imminent by determining if the projected path of the second vehicle and that of the subject vehicle intersect or coincide or come within a predetermined radius of each other. If a collision is imminent, the system could repeat the projection but with a set of sequential accelerations applied to the subject vehicle. The analysis may include assumptions such as constant velocity or constant acceleration of the second vehicle. If any such sequence is able to avoid the collision, that set of sequential accelerations would then be implemented. Multiple sequences may be tested in like manner. However, if none of the sequences is projected to avoid the collision, then the system could implement whichever sequence would produce the least harm. Additional sequences may be tested even while a sequence is being implemented, to further reduce the expected harm or to keep trying to find a most optimized way to avoid the collision. If one of the additional sequences is projected to avoid the collision, then the currently-implemented sequence would be stopped and the successful sequence would be implemented instead. But if all of the sequences fail to avoid the collision, then that sequence causing a minimum amount of harm would be implemented.

In another variation, the second vehicle is detected with sensor data. The future positions of the subject vehicle and the second vehicle are projected forward in time, but with the subject vehicle being accelerated according to a set of sequential actions. If the sequential actions result in the vehicles passing safely and not colliding, that sequence is implemented. If the sequence is projected to result in a collision, the harm caused by the collision is then calculated, based on the projected velocities and contact points and other parameters of the collision. The collision data and the estimated harm value are then stored along with the sequence details. Then, if the collision remains unavoidable after multiple sequences have been tested, a harm-minimization sequence is implemented instead. The harm-minimization sequence may be selected by finding which of the previously-analyzed sequences would result in the least harm. Or, additional sequences may be explored to further adjust the collision parameters and produce even less harm.

A system according to present principles comprises one or more sensors and one or more processor components configured to mitigate collisions. The sensors, mounted on the subject vehicle, detect a second vehicle proximate to the subject vehicle, and acquire sensor data related to the second vehicle. The various processor components are programmed to analyze the sensor data, thereby determining the position or velocity or acceleration of the second vehicle; to determine if a collision is imminent between the subject and second vehicles by analyzing the position, velocity, and acceleration data; and to calculate sequences of positive accelerations or decelerations or steering actions of the subject vehicle, so as to avoid the collision or minimize its harm. Further processor components are programmed to determine whether an imminent collision, according to the sequences, is avoidable or unavoidable; and to select an avoidance sequence (if avoidable) or a harm-minimization sequence (if unavoidable) according to the avoidance determination. Finally, a processor component is programmed to implement the selected sequence, for example by sending control signals to cause the subject vehicle to accelerate or decelerate or steer according to that sequence.

A system according to present principles may alternatively comprise sensors, to acquire sensor data related to a second vehicle proximate to the subject vehicle, and one or more processors programmed to perform method steps which include: analyzing the sensor data to determine the position, velocity, or acceleration of the second vehicle; determining whether a collision is imminent; and calculating one or more sequences of accelerations or decelerations or steering actions to avoid the collision or to minimize the harm of the collision. The method further includes determining whether the collision is avoidable, according to each of the sequences; and then selecting an avoidance sequence if the collision is avoidable and selecting a harm-minimizing sequence if otherwise; and then implementing that sequence by generating control signals which control the subject vehicle's acceleration, deceleration, and steering.

As yet another alternative, a system according to present principles may comprise sensors acquiring sensor data about the second vehicle, and one or more processors programmed to perform a method which includes analyzing the sensor data and determining the position or velocity or acceleration of the second vehicle. The method additionally includes calculating a plurality of sequences of acceleration, deceleration, and steering of the subject vehicle, if the sensor data indicates that a collision is imminent. Then, if the collision is avoidable, one of the sequences that avoids the collision is implemented, and if the collision is unavoidable, one of the sequences that minimizes the harm of the collision is implemented. As mentioned, implementation includes sending control signals to the means for accelerating, decelerating, and steering the subject vehicle.

A further alternative embodiment of a system according to present principles again comprises sensors to acquire sensor data regarding the second vehicle, and processors programmed to analyze the sensor data, thereby determining the position, velocity, or acceleration of the second vehicle, and thereby determining if the sensor data indicates that a collision is imminent. The processors are further programmed to determine, when a collision is imminent, whether the collision is avoidable in view of the maximum operating parameters of the subject vehicle. The maximum operating parameters comprise data stored on the subject vehicle and indicating the maximum acceleration, maximum deceleration, or maximum steering that the subject vehicle is capable of. Then, the processors calculate a collision avoidance strategy or a harm minimization strategy, depending on the avoidability of the collision according to sequences that comply with the maximum operating parameters; and that strategy is then implemented.

As used herein, two vehicles are projected to "coincide" if the projected positions of the two vehicles are substantially the same, or within a particular radius, at a particular future time. The vehicle sizes are accounted for in this calculation, so that if any portion of the subject vehicle overlaps with any portion of the second vehicle (or comes within the particular radius thereof), at a particular projected time, a collision is projected to occur.

In real time, while a sequence is being implemented, each action of the selected sequence may be revised or adjusted or "fine-tuned" in real time on the basis of further sensor data, to account for the actual motions of the vehicles which may differ from the initially projected motions. For example, an acceleration may be adjusted slightly so that the point of contact will miss the passenger compartment of the struck vehicle, thereby saving lives. During the collision and after the collision, the system continues to analyze further sensor data, thereby recognizing any unforeseen threats. The system updates the sequence according to changing conditions, while continuing with the intervention until all threats have passed. Thus the system does everything possible, and continues to do everything possible throughout the intervention, to save the people involved.

The future position projections are uncertain because they are based on sensor data which is itself uncertain. The system may account for uncertainties by assuming a nominal uncertainty value for the speed and direction of each vehicle. In that case the calculations would determine that the collision is imminent if the subject and second vehicles will collide, or pass within a predetermined radius of each other, assuming that the velocities and directions of the subject and second vehicles will remain unchanged within a nominal uncertainty value. For example, the collision would occur if the subject and second vehicles continue traveling at their current speeds and directions, to within a nominal uncertainty in velocity and a nominal uncertainty in direction. (To err on the side of safety, a near-miss counts as a projected collision for the purposes of determining imminency.) More specifically, the vehicles are projected to collide if their speeds remain constant within plus or minus 5% of their current speed values for example, and their directions remain unchanged within plus or minus 5% of one radian (which corresponds to plus or minus 3 degrees, approximately) of their current directions. The nominal 5% error estimates, although cited here as examples, are believed to be typical of the uncertainties commonly obtained with sensor systems and analysis methods known in the art. An advantage of including the uncertainty estimates in the collision calculation is added safety. An event that looks like it will be a near-miss may turn out to be a catastrophic collision, due to the projection uncertainties. Therefore, for added safety, the system may include nominal velocity and directional uncertainties in the imminency calculation.

The method may include explicitly determining whether a collision is imminent by projecting the subject vehicle's trajectory forward in time and comparing it to the second vehicle's trajectory projected forward in time; or the imminency determination may be omitted by, for example, preparing avoidance sequences for every vehicle detected or a subset of those detected. Likewise the method may include explicitly determining whether a possible collision is avoidable by finding a sequence of actions that is projected to avoid the collision, or the avoidability determination may be omitted by implementing the first sequence that is projected to avoid the collision.

The method may include determining when to abandon the search for a collision-avoidance sequence and begin implementing the harm-minimization sequence. That determination may be as soon as an "unavoidability criterion" is met. The unavoidability criterion may be a time limit, such as when the projected collision time has shrunk to 1 second; or it may be numerical such as when 10 avoidance sequences have been tested; or it may be conditional such as having explored all of the standard maneuvers or having varied all the primary variables in the sequence.

As a way to further reduce the response time, the implementation could be started with the "best" sequence found so far, without waiting for an unavoidability criterion. Additional sequences would be tested while the implementation is in progress, and if one of those sequences avoids the collision, it could be implemented instead. Or if one of the additional sequences causes less harm, the system could switch to it. The advantage is that the intervention could begin immediately rather than waiting for multiple analyses to complete. Another advantage is that the sequence could be adjusted or revised when better sequences are discovered, and would be further adjusted with updated sensor data or to handle any unforeseen changes in the scenario. Substantially greater demands are placed on the processor(s) to simultaneously analyze the avoidability of sequences and calculate the harm they would cause, all while implementing one of the sequences; but in an impending collision, time saving is life saving.

The systems and methods according to present principles may include means for adjusting how the automatic intervention is applied and under what conditions. The systems and methods may include indirect mitigation steps to signal the other drivers, secure the vehicle post-collision, facilitate passenger egress, send help-request messages, and other steps. The systems and methods may include means for recording and saving data related to the traffic, the vehicle, the collision, and the automatic intervention applied. The systems and methods can also provide emergency intervention in highway hazards other than vehicle-vehicle collisions, such as a solo spinout or debris in the road.

As used herein, "analyzing" typically involves calculating with software and a processor, such as a digital electronic computing means. "Estimating" includes calculating or analyzing based on uncertain or incomplete data, thereby obtaining an uncertain but workable value. A "collision" is any contact between the subject vehicle and another vehicle or object. In a "projected collision", the subject vehicle is projected to contact the second vehicle, or alternatively to come within a predetermined radius of the second vehicle. Thus a projected near-miss may be treated as a collision for present purposes, since all such projections include some uncertainty. A possible future collision becomes "imminent" when the likelihood of the collision rises above a predetermined value, assuming that no corrective action is taken, wherein the likelihood of a collision is calculated by projecting future positions of the subject and second vehicles from their current positions, velocities, and accelerations, and in some implementations providing such in terms of one or more distributions, recognizing that the same may be subject to small variations in short timescales, and large variations over greater timescales. Alternatively, a collision may become imminent if the calculated separation distance between future positions of the subject vehicle and the second vehicle is less than a predetermined distance limit, and that separation will occur in a time less than a predetermined time limit. Preferably the distance limit is large enough to ensure that collisions are recognized, but not so large that false alarms frequently occur. Typically the distance limit is in the range of 0.1 to 1 meter. The distance limit may be adjusted according to the velocities and other parameters. Likewise the predetermined time limit is preferably short enough to avoid false alarms on remote and improbable hazards, but long enough to allow the system to perform the intervention. Typically the predetermined time limit is within a range of 1 to 10 seconds, but may be adjusted according to current parameters. For example, if a second vehicle is far away, such as 1000 meters away, the two vehicles could collide if both vehicles remain exactly on their current trajectories for another 3 minutes. Clearly, there is plenty of time for either driver to avoid the collision, so the system would not flag the potential collision as imminent. If, on the other hand, the second vehicle is only 20 meters away and the calculated collision time is 3 seconds, then the system would immediately recognize the collision as imminent and would initiate evasive action.

A collision is "avoidable" if it can be prevented by accelerating or decelerating or steering the subject vehicle. The collision is "unavoidable" if it cannot be avoided by any combination of accelerating and decelerating and steering the subject vehicle. The sequence "avoids" the collision if the subject vehicle is projected to not collide with the second vehicle when the subject vehicle is accelerated according to the sequence. If the collision is projected to occur even when the subject vehicle is driven according to the sequence, then the sequence fails to avoid the collision. A collision which is initially avoidable may become unavoidable as the scenario unfolds, or vice versa, due to actions of the other drivers, or to other unpredictable factors. Therefore the system continually monitors the sensor data and continually updates the traffic analysis and continually re-evaluates the avoidability of the collision, adjusting the accelerations and decelerations and steering actions accordingly.

As is well known in physics, the terms "acceleration" and "accelerating" include any change in velocity, including positive, negative, and lateral changes. Although in common usage, people often treat "acceleration" as speeding up, the technically proper meaning includes all velocity changes in any possible direction. Therefore, "acceleration" as used herein includes "positive acceleration" or speeding up in which the forward speed of the subject vehicle is increased, "negative acceleration" or "deceleration" in which the forward speed of the subject vehicle is reduced, and "lateral acceleration" or "steering" in which the direction of the subject vehicle's motion is changed. In practice, positive acceleration is caused by depressing the accelerator pedal, negative acceleration or deceleration is caused by depressing the brake pedal, and lateral acceleration or steering is caused by turning the steering wheel. Thus the general term "acceleration" includes speeding up, slowing down, and changing the direction of the subject vehicle's motion.

The "subject vehicle" is a particular vehicle in which the system is installed. As used here, the vehicle in front of it is the "leading vehicle", and the vehicle behind it is the "following vehicle". A vehicle encroaching upon the subject vehicle from the side is the "encroaching vehicle". Any vehicle in the lane on the opposite side of the subject vehicle from the encroaching vehicle is the "opposite vehicle". A vehicle in the lane to the right of the subject vehicle is the "right-side" vehicle, and similarly for the left lane. The drivers of the respective vehicles are referred to in the same way, and each lane is referred to in the same way. Each vehicle may be an automobile, a truck, a bus, a motorcycle, or any other motorized conveyance that may travel on a road or highway.

A "strategy" is a plan comprising a sequence of actions in a particular order, thereby to accomplish a specific purpose, for example to avoid a collision or to minimize its harm. A "sequence" or "sequence of actions" or "set of sequential actions" comprises one or more acceleration or deceleration or steering actions in a particular order. The sequence may further include a specification of the magnitude of each action in the sequence, as well as its duration and timing. Usually the sequence of actions includes thresholds (such as "accelerate until matching the leading vehicle") and contingencies (such as "illuminate brake lights if the leading vehicle slows down"). The sequence may include branches (such as "if the following vehicle continues to accelerate, switch to the harm-minimization strategy"). The sequence of actions may be implemented by sending control signals to control the subject vehicle throttle, brakes, and steering, and optionally the lights and other controls. Preferably the control signals are adjusted by feedback, in which sensors measure the position, velocity, or acceleration of the subject vehicle, and any deviation from the expected trajectory would cause the control signals to be revised. "Direct mitigation" comprises controlling the throttle, brakes, and steering of the subject vehicle according to the selected sequence, with or without feedback from the internal sensor data. "Indirect mitigation" comprises controlling anything else, such as turning off the fuel pump, rolling down the windows, flashing the brake lights, sounding the horn, alerting the driver or occupants, sending a help-request message, and the like.

The "harm" of a collision includes all negative consequences of the collision, and may be analyzed or quantified according to a valuation scheme. Such a scheme would place high value on saving lives, a lower but still high value on preventing injuries, and also a value on any physical damage caused by the collision. Then the overall harm of the expected collision may be quantified by multiplying each type of harm, times its valuation, and then adding together all the types of harms expected for the collision. The various types of harm could also be multiplied by probability factors to account for uncertainties. Thus a high-speed collision would include an entry for possible loss of lives, whereas a low-speed collision would include mainly property damage costs. As used herein, the "minimum-harm sequence" is a particular sequence of actions that is expected to produce less harm than any of the other sequences so far analyzed.

The system according to present principles includes sensor means, computing means, direct mitigation means, and indirect mitigation means. Direct mitigation means comprise means for positively accelerating, decelerating, and steering the subject vehicle. Indirect mitigation means include means for controlling the lights, horn, windows, door locks, and other parts of the subject vehicle. Likewise, the inventive method includes steps for sensing, computing, implementing direct mitigation, and implementing indirect mitigation.

The sensor means comprises internal sensors and external sensors. The internal sensors comprise any measurement devices mounted on the subject vehicle that measure a parameter of the subject vehicle such as its position, velocity, direction, acceleration, the status of the brakes or steering wheel, or any performance problems such as a loss of traction. Accelerometers are an example, and such may include 1-axis or 2-axis or 3-axis such accelerometers. The internal sensors produce sensor data related to those measurements and convey the sensor data to the computing means. The external sensors comprise any measurement devices mounted on the subject vehicle that measure a parameter or quantity or image of another vehicle proximate to the subject vehicle, and produce sensor data related to that measurement.

The computing means comprises a computing environment and non-transitory computer-readable media. The computing environment comprises a computer, CPU, GPU, microprocessor, microcontroller, digital signal processor, ASIC, or other digital electronic device capable of analyzing data from sensors and preparing a collision-avoidance or a harm-minimization sequence of actions, which includes controlling the acceleration or deceleration or steering of the subject vehicle according to the sequence. The computing means may comprise one or more processors, each processor being configured to perform one or more of the computing tasks, including such tasks as analyzing sensor data, calculating future positions of vehicles, estimating harm associated with a possible collision, and transmitting control signals. The non-transitory computer-readable media comprise any digital data storage media, capable of storing instructions such as software instructions that, when executed, cause the computing environment to perform a method for mitigating vehicle collisions. Examples of such media include rotating media such as disk drives and CD's, solid-state drives, permanently configured ROM, detachable memories such as "jump" drives and micro-SD memories, and the like, in contrast to transitory media such as a computer's working memory (RAM, DRAM, cache RAM, buffers, and the like).

The means for positive acceleration, deceleration, and steering include any electronic or mechanical or hydraulic interconnects operationally connected to the brakes or engine or steerable wheels of the subject vehicle. The braking or deceleration means may include standard uniform braking on all of the wheels together, or it may include differential braking on each of the wheels of the subject vehicle. Differential braking, while not essential for implementation of the present principles, would provide maximum agility in an emergency. The systems and methods according to present principles preferably provide a rapid and finely adjustable response, so that the acceleration or deceleration may be precisely timed and adjusted by the computing means. Precision is crucial; there is a big difference between stopping 10 centimeters before reaching another car's bumper, and stopping 10 centimeters after it.

The computing means may include a processor configured or programmed to calculate vehicle trajectories over time using a predictive kinetic model. The kinetic model may comprise software and processor means configured to calculate the positions and velocities and accelerations of vehicles proximate to the subject vehicle in real time, and to "project" or calculate future positions of those vehicles. The processor component also calculates future positions of the subject vehicle based on data from the internal sensors such as the velocity and acceleration of the subject vehicle. The system includes a processor component configured to detect imminent collisions, for example by calculating future positions of vehicles, thereby detecting that one of the vehicles will contact the subject vehicle, or will come within a predetermined distance limit, if no corrective action is taken. For example, the processor component may project the position of a vehicle forward in time over short time intervals by integrating the acceleration of the vehicle with respect to time, and adding the current velocity of the vehicle, thereby obtaining future velocity values for the vehicle. Over longer time intervals, the acceleration may be assumed to subside as the vehicle reaches a velocity that the driver intends, in which case a declining acceleration would be integrated to obtain the future velocities. The processor component may further integrate the velocity of the vehicle with respect to time, and add the current position of the vehicle, thereby obtaining future positions of the vehicle. These positions comprise the calculated "trajectory" of the vehicle.

The processor component may detect possible collisions between the subject vehicle and a second vehicle by comparing the subject vehicle's future positions and a second vehicle's future positions at particular times. If the future position of the subject vehicle and the future position of the second vehicle coincide, or come within a predetermined distance limit of each other, a collision is possible. The processor component may alternatively be configured to calculate the distance between the subject vehicle and the second vehicle, and the relative velocity between the two vehicles, and the relative acceleration between the two vehicles, and then to calculate the separation distance between the vehicles at future times by integrating the relative acceleration and relative velocity as described above. As is well known in physics, all motion is relative; hence it is immaterial whether the positions of the two vehicles are compared at future times, or the distance between them is projected forward in time. Future collisions would be detected equally by either calculation method.

The processor component calculating the kinetic model also calculates a collision time which is an estimate of how much time remains before the vehicles will collide. If the collision time is less than a predetermined threshold, the processor indicates that the collision is imminent.

The computing means may further be configured to use artificial intelligence and learning algorithms, thereby to predict future positions of the subject vehicle and other vehicles under a wider range of circumstances. The computing means so configured may also improve the calculations that determine if a collision is imminent or unavoidable, and may also enable better avoidance strategies to be devised. For example, if a second vehicle in an adjacent lane is drifting slowly toward the subject vehicle but has not yet approached the lane marker line, then the model may conclude that the drifting vehicle is not yet a threat since the second vehicle's driver may easily correct the situation. Possibly the system may sound the horn to alert the approaching driver. If the second vehicle then touches the lane line, the model may increase the threat level and determine that a side collision is imminent, and may responsively initiate evasive action.

As another example of the processor analyzing traffic using artificial intelligence, the external sensors may determine from the lane lines, or other indicators of the roadway ahead, that the roadway is about to curve. When the roadway curves, drivers begin to turn into the curve at the start of the curve, but different drivers may perceive the start of the curve slightly differently. Therefore each vehicle may drift laterally to a limited extent while entering or exiting a curve, and each driver then compensates by steering. The processor is preferably configured to anticipate that the vehicles will follow the curve generally but not perfectly, and will anticipate a certain amount of lateral motion. If a second vehicle, positioned in the lane beside the subject vehicle, drifts laterally to a minor degree at the beginning of a curve, the processor would not count this as an imminent collision. But if the second vehicle crosses the lane line or otherwise encroaches upon the subject vehicle, then the kinetic model would quickly recognize that evasive action is needed.

The processor may be further configured to monitor the rate of change of acceleration of the subject vehicle, or of the second vehicle, or both. The rate of change of acceleration is a valuable indicator of the driver's intent. When the rate of change of acceleration is low, the future velocity and positions of a vehicle may be calculated straightforwardly by assuming the acceleration will subside when a desired velocity is obtained. If the acceleration suddenly changes, however, this is usually an indication that the driver has decided to do something different such as changing lanes or braking, in which case the future positions of the vehicle are difficult to calculate since there is no way to know how the driver is going to change the acceleration, among other unknowns. Nevertheless, if the processor includes artificial intelligence, it may be able to correlate the change in acceleration to a particular intent of the driver. Such a deduction may enable future projections of the vehicle's position and velocity to be calculated with some accuracy even as the acceleration is variable. For example, if the leading vehicle happens to drift right to a lane line and then suddenly accelerates left toward the center of the lane, the model may interpret that change as indicating that the leading driver suddenly realized he was over the line and took corrective action, rather than assuming that the leading vehicle was about to change to the left lane or something else. Furthermore, the processor may conclude that the leading driver is distracted, and in response may open a little extra space between vehicles, just as a human would.

The processor, configured with artificial intelligence, may enable the kinetic model to identify potential collisions and determine that they are imminent or unavoidable or harmless. The artificial intelligence system performs faster and better than any human could because the system receives data from multiple sensors in real time, which a human could not possibly integrate while driving. In addition, the system includes advanced multi-core computing power capable of analyzing multiple scenarios simultaneously, all at electronic speeds. In addition, the kinetic model may be updated or revised, for example by wireless updating, on a periodic basis, thereby ensuring that the most advanced traffic analysis procedures are employed. Furthermore, the model may include a learning capability based on observation. For example the system could note instances in which one of the traffic vehicles did not move as predicted by the model, and the processor could then adjust certain model parameters accordingly to provide better predictions in the future. In addition, the processor configured to learn from experience could monitor the subject driver's habits and then take them into account. Thus if a particular driver likes to drive fast and furious, the kinetic model may account for this by lowering the threshold for declaring a possible collision as imminent, or other parameter adjustments, thereby providing optimal safety despite the particular driver's bad habits.

In analyzing traffic, the processor is preferably configured to calculate the entire evolving traffic scenario rather than simply extrapolating current velocities in a linear fashion. For example, there may be enough room at the present moment for the subject vehicle to pass a bus, but looking ahead there is a narrowing of the lane or there is another car preparing to change lanes, and consequently the safety window will close before the pass can be completed. The processor is preferably able to carry forward the entire maneuver all the way to completion, thereby discovering that it will become unsafe halfway through. In a similar way, the processor may be programmed to keep an escape route open at all times. Collisions are rare, and they almost always start out benign, but then evolve into imminent threats, and then into unavoidable threats, as the scenario unfolds.

The system further includes a processor configured to analyze a large number of possible sequences of actions, each sequence comprising periods of positive acceleration and deceleration and steering of the subject vehicle in a particular order. Preferably each sequence further specifies the intensity, duration, and timing of each action. The sequences may also specify conditional steps or branches whereby alternative actions may be carried out according to an observed event or parameter. The processor is configured to analyze how the imminent collision would proceed if positive accelerations and decelerations and steering were applied to the subject vehicle according to one of the sequences, and thus to determine if any of the sequences would cause the subject vehicle to avoid the collision. These calculations may be performed using the kinetic model, or they may use a separate processor and software.

Preferably the processor includes certain capability-data about the subject vehicle including the maximum positive acceleration, the maximum deceleration, and the maximum rate of steering that the subject vehicle is capable of, and preferably each action in the sequence would be no greater than those maximum values. If the analysis indicates that the subject vehicle would avoid the collision if driven according to any one of the sequences, then the collision is avoidable. If none of the sequences enables the subject vehicle to avoid the collision, the collision is unavoidable. For example, the capability-data may be provided by the vehicle manufacturer, stored on non-transient memory such as a solid-state disk, and transferred to the working memory or RAM as soon as the vehicle's engine is started. Thus the capability-data will be available instantly when needed as the sequences are developed.

The processor may be further configured to first consider "often used" evasive maneuvers, depending on the type of hazard. Such maneuvers may be stored as a sequence of accelerations in non-transient memory until needed, and may be periodically updated using, for example, wireless technology to provide the most successful and well-tested evasive maneuvers known. Thus the processor would select one of the standard maneuvers according to the type of threat detected, and would use that maneuver as a basis for planning the intervention, and would adjust parameters in the standard maneuver by, for example, varying the timing or amplitude of the various accelerations in the standard maneuver to avoid the particular collision at hand. The advantage of first considering the previously-successful strategies is that they may save precious time in deciding on a course of action. Also these well-tested maneuvers may enhance the probability of avoiding the collision, as opposed to starting over by exploring a wide range of possible mitigation steps for each new threat.

A processor is configured to select, if the collision is avoidable, the best sequence of actions according to a criterion, such as applying the least amount of acceleration necessary to avoid the collision. A processor is configured to prepare a collision-avoidance sequence. The collision-avoidance sequence includes control signals that, when sent to the acceleration means (such as the throttle, brakes, and steering), are sufficient to cause the subject vehicle to change velocity according to the selected sequence of actions. The collision-avoidance sequence may also include indirect mitigation steps such as flashing the brake lights strategically. A processor is further configured to implement the sequence by sending those control signals to the acceleration, deceleration, and steering means. The processor is further configured to adjust the control signals according to the actual position, velocity, and acceleration of the subject vehicle, as determined by internal sensors, thereby causing the subject vehicle to more closely follow the selected trajectory. A processor is configured to continue monitoring the subject vehicle and the other vehicles, updating the strategy, and adapting as needed in response to any unexpected changes. As mentioned, all of the listed processors or processor components may comprise a single multi-purpose computing means, which may be embodied as a single electronic computing circuit, or they may comprise an array of separate computing means with data interconnects.

A processor is configured to prepare, if the collision is unavoidable, a harm-minimization strategy comprising a sequence of actions to control the collision process so as to minimize the overall harm caused by the collision. In many if not most traffic collisions, the best harm-minimization sequence is quite different from a collision-avoidance sequence. First of all, none of the collision-avoidance sequences will work since the collision is known to be unavoidable. Secondly, the goals of collision-avoidance are different from harm-minimization. The goal of the harm-minimization strategy is to manage the inevitable collision in real time, so that ideally everyone involved can ride through the collision or collisions and then walk away afterwards, even if the cars are destroyed. For example, a collision may be softened by deliberately causing two glancing collisions rather than one penetrating strike. In an imminent collision from the rear, the peak acceleration can be lowered by positioning the subject vehicle midway between the leading and following vehicles as they come together. A freeway spinout from a side-encroachment collision can be avoided by steering slightly into the encroaching vehicle at the moment of impact, rather than away from it as most drivers would do. In heavy traffic, a direct front-end collision can be turned into a series of non-lethal fender-benders by aiming the subject vehicle between lanes, thereby grinding between two rows of cars. In each case when a collision is unavoidable, the harm-minimization strategy promotes one or more controlled collisions, rather than the ballistic smashup that would occur without intervention, thereby minimizing the net harm when it is all over.

A processor is configured to prepare the harm-minimization strategy in cooperation with the kinetic model and the dynamic collision model. The dynamic collision model takes as input the positions and velocities of the colliding vehicles at the time of contact, as predicted by the kinetic model. The dynamic collision model then analyzes the expected collision, and calculates the physical distortions that will be imposed on each vehicle, and calculates the peak accelerations expected to be experienced by the occupants. The dynamic model may also predict whether the drivers will likely maintain control of their vehicles after a collision, and whether a vehicle will go into a spin, and whether the airbags will deploy, depending on where and how hard the vehicle is predicted to be hit.

For each sequence of actions considered, a processor is configured to calculate the expected harm resulting from the collision as it would occur if those actions were implemented. The processor may use the collision predictions of the dynamic collision model as a starting point. In particular, the processor calculates, or at least estimates by analysis, how many fatalities, how many injuries, and how much property damage would likely result from a collision according to each of the sequences. The processor may multiply each estimate by a coefficient, such as a fatality coefficient and an injury coefficient and a property damage coefficient. The processor may further multiply each estimate by a probability associated with the fatality, injury, and damage estimates. The processor may further estimate multiple levels of injury, for example treating major crippling injuries with more priority than minor bruises. Then the processor calculates the estimated overall harm of the collision by adding up the various products, each product being the predicted quantity of each type of harm, multiplied by its probability, times the associated coefficient. It should be understood that quantification of harm is a difficult problem, and the example calculations provided herein are minimal. Developers may devise other harm analysis schemes, with more detailed parsing of harm types and more detailed resolution of uncertainties, without departing from the scope of the invention.

After analyzing the various predicted harm values resulting from a large number of sequences, the processor is configured to select the particular sequence that results in the lowest expected harm. Alternatively, the best sequence may be selected as soon as a time limit is reached such as when the time to contact has shrunk to two seconds, or after a harm threshold is reached such as when a sequence produces no deaths and no serious injuries, or by another criterion, e.g., when a harm threshold is calculated for a sequence of actions that is less than the amount of harm calculated for the present situation in the absence of intervention. The harm-minimization sequence determines the control signals that cause the acceleration means, deceleration means, and steering means of the subject vehicle to produce the positive accelerations and decelerations and steering as specified, and may include indirect mitigation steps such as turning off the fuel pump and alerting the occupants that a collision is about to occur and sending a help request message. A processor is further configured to implement the strategy by sending the control signals to the throttle and brakes and steering mechanism accordingly, as well as triggering the indirect mitigation steps.

The processor is further configured to continually monitor the sensor data, and continually update the kinetic model, and continually reassess the imminency and avoidability of the collision, and continually adapt the sequence as the scenario unfolds. By tracking the positions and velocities of the various vehicles, including the subject vehicle, the processor can reassess the threat level periodically or whenever conditions change significantly. If the intervention is successful, the threat level may be reduced from "imminent" to "benign", in which case the intervention may cease (although the monitoring of the various vehicles and scanning for emerging hazards will continue as usual). On the other hand if the situation deteriorates and the threat level is raised to "unavoidable", the processor is configured to recognize this by updating the kinetic model with updated vehicle data, and to implement the harm-minimization strategy.

The method comprises sensing other vehicles proximate to the subject vehicle, using the external sensors; analyzing data from the external and internal sensors to project the various vehicle positions forward in time; detecting an imminent collision between the subject vehicle and a second vehicle; further analyzing to determine that the collision is avoidable if it would be avoided by positively or negatively or laterally accelerating the subject vehicle according to a particular sequence, and that the collision is unavoidable otherwise. The method further includes preparing a collision-avoidance strategy comprising accelerating or decelerating or steering the subject vehicle to avoid the collision if it is avoidable, or preparing a harm-minimization strategy comprising accelerating or decelerating or steering the subject vehicle to minimize the harm caused by the collision if it is unavoidable; and then implementing the selected strategy by sending control signals to cause the subject vehicle to positively accelerate or decelerate or steer according to the selected strategy. The strategy may comprise a data block specifying the sequence of actions, and possibly their amplitudes and durations, such as applying the brakes for 3 seconds at one-half the maximum deceleration limit. The strategy may include conditionals and branches, such as "apply brakes until the subject vehicle matches the leading vehicle's velocity", or "increase braking pressure if the leading vehicle slows down". Typically the data block comprises instructions in the working memory of a processor such as RAM, although it may also be copied to non-transient storage means such as a solid-state drive.

Typically an imminent collision is detected by measuring the positions and velocities, and preferably the accelerations, of vehicles proximate to the subject vehicle; then calculating their future trajectories; then determining if any of the vehicles will contact the subject vehicle, and if so, when. If the collision will occur in a time less than a predetermined time limit, the collision is imminent and further mitigation steps are then triggered. The time limit may be dependent on the relative velocity of the vehicles and on other factors, the intent being to provide enough time to avoid the collision if possible. Calculating the vehicle trajectories includes projecting the positions and velocities of the vehicles forward in time. Typically a numerical model such as kinetic traffic model is used for this analysis. The analysis may further include factors such as the rate of change of acceleration of the other vehicles, status of their brake lights or turn signals, and any other factors that may influence the likelihood that the vehicle will collide with the subject vehicle.

The imminent collision is then analyzed to determine whether it is avoidable or unavoidable. The analysis proceeds by considering a large number of sequences, each sequence including a set of accelerations and decelerations and steering of the subject vehicle in a particular order. Preferably the magnitudes and durations and timing of these steps are also specified in the sequence. Each sequence is then analyzed, preferably using the kinetic model, to determine if the collision will still occur if the subject vehicle's trajectory is changed according to the sequence. If the collision will be avoided by accelerating and decelerating and steering the subject vehicle according to at least one of the sequences, then the collision is avoidable. And if none of the sequences is able to avoid the collision, it is unavoidable. The collision-avoidance sequence is then implemented by sending the specific vehicle control signals to cause the throttle, brakes, and steering of the subject vehicle to perform the desired actions, and optionally indirect mitigation steps such as strategically illuminating the brake lights.

The determination that a collision is unavoidable may be prompted by an unavoidability criterion, such as a time limit or a number of sequences tested. The criterion may be that the remaining collision time has shrunk to a predetermined limit such as 2 seconds without finding a successful avoidance sequence. Or the criterion may involve having tested all of the standard maneuvers, or having varied all of the sequence parameters without finding a way to avoid the collision. When the unavoidability criterion is met, the search for a sequence causing the least harm would be initiated (if it is not already ongoing in parallel with the avoidance search). Preferably, further variations of the collision-avoidance sequences would continue to be explored as fresh sensor data becomes available, even after the collision appears to be unavoidable, since many unknowns influence the trajectories of vehicles in a hazard situation. Not uncommonly, an unanticipated escape window may open briefly before the actual contact, in which case the automatic system could accelerate accordingly, guide the subject vehicle past the second vehicle, and thereby reduce a direct impact into a grazing swipe that saves lives.

The harm-minimization sequence of actions is typically prepared by calculating the harm that will be caused by the imminent collision. The relative velocity of the colliding vehicles is calculated at the projected time of the collision, preferably using the kinetic model, and including all the accelerations specified in each of the sequence actions. The kinetic model should also indicate where on each vehicle the contact will occur. Based on those parameters, the dynamic model analyzes the collision and calculates the physical distortions of each vehicle due to the forces of the collision, including frame compression, penetration into the passenger compartment, and the like. Also, the peak acceleration experienced by each vehicle is computed, along with the durations and directions of the peak accelerations, and possibly the rate-of-change of the accelerations as well since this can affect injuries. If the vehicle weights are known, or can be estimated from the sensor data, or other source, then they can be used in the calculation; otherwise typical vehicle weights can be assumed. Also the number of occupants in the subject vehicle can be obtained by seat sensors, and the number of occupants in the other vehicle may be assumed a standard value such as 1.5 persons, unless otherwise known. Then, with these collision parameters and assumptions, the number of fatalities and injuries can be estimated, and the amount of property damage can be estimated. Empirical formulas may be useful in evaluating these numbers.

The harm is then calculated for the analyzed collision. A large number of such sequences are then considered and the corresponding collisions are analyzed and the resulting harm values are calculated. Previously-prepared templates, or often-used maneuvers, may be explored first, since these have been tested and shown to be effective in prior emergency scenarios. To save time, the strategies analyzed in the harm analysis may be the same as those used previously in the collision-avoidance calculation, since the resulting trajectory projections have already been calculated. Or, a new set of accelerations and trajectories may be considered for the harm minimization step. In either case, the amount of harm that would be caused by a collision according to each of the sequences is computed, and the sequence that would result in the least amount of harm is selected.

That sequence of actions expected to produce the least harm is then implemented by sending control signals to the throttle, brakes, and steering of the subject vehicle so as to produce the accelerations, decelerations, and steering which are specified in the selected sequence. The control signals are continually adjusted by feedback from sensors that detect any deviation of the subject vehicle from the selected strategy. The harm-minimization sequence of actions preferably also includes indirect mitigation steps, a post-collision strategy, and other steps as needed to save lives and minimize injuries.

Often the number of fatalities and injuries and amount of damage caused by an imminent collision are incompletely known from the analysis, but can be estimated with some uncertainty. In that case each of the harm terms can be multiplied by a probability factor that reflects the uncertainty, to further refine the overall harm value. As a further option, multiple injury types may be analyzed in a similar fashion, separately accounting for serious and minor injuries for example.

Selection of which harm-minimization sequence to implement may be prompted by a criterion such as a time limit or a number of sequences analyzed. For example, when the time-to-impact has shrunk by one-half, or when all of the standard maneuvers have been evaluated for expected harm, then it may be time to start implementing the best harm-minimization sequence discovered so far.

For a faster response, the first harm-minimization sequence that is tested may start to be implemented immediately. At the same time, further sequences continue to be tested for expected harm and, as soon as a sequence with a lower estimated harm is found, the better sequence can then be implemented instead. Usually the better sequence will be a variation of the already-in-progress sequence so that the change from one to the other can be done smoothly. But even if the switch between sequences is not smooth, it is still generally better than delaying the evasive action. Preferably the search for even better sequences continues up until the moment of contact, always basing the analysis on the latest actual trajectory data of the vehicles.

For an even faster intervention, the method may include calculating the expected harm of every collision-avoidance sequence tested, and storing that harm value along with the sequence data. Then, if all the collision-avoidance attempts fail, the best harm minimization sequence can be identified very quickly from the stored values, without having to repeat the kinetic analyses. Preferably the harm calculation would not retard the search for an avoidance sequence, using for example a multi-core processor that can calculate the harm of each projected collision while simultaneously analyzing the next collision-avoidance sequence. If the collision turns out to be unavoidable, the time saved in selecting the least-harm sequence may be crucial.

As soon as a collision becomes unavoidable, or more preferably as soon as it becomes imminent, the systems and methods according to present principles may prepare a post-collision strategy or sequence of actions. Then, after the collision is over, the systems and methods according to present principles may implement the post-collision strategy to avoid a secondary collision and other post-collision hazards. Preferably the systems and methods update the post-collision strategy based on sensor data acquired during the collision and after the collision.

The post-collision strategy may include checking the status of the sensors and the processors and other parts of the subject vehicle. The strategy may include checking for secondary collision threats such as vehicles approaching from the rear, or from any direction, and then may arrange to avoid them by driving to the side of the road, or by other evasions. The post-collision strategy may also include checking for a fire and providing warnings if detected. A help-request message may be sent, or if one has already been sent, then a more detailed follow-up message would be sent, specifying the types of injuries likely to have occurred in the collision so that responders can be prepared. If the driver is responsive, the strategy may include connecting the driver with a first responder directly.

The post-collision strategy may include determining whether the driver is responsive or nonresponsive, for example by monitoring the brake pedal, the accelerator pedal, and the steering wheel, and possibly other controls. If the driver uses any of these controls after a collision, the driver is responsive. The automatic system may be configured to halt the intervention if the driver is responsive, thus deferring to human intelligence in an unpredictable situation. However if the driver fails to use any of the controls, the driver would be deemed nonresponsive, and the post-collision strategy would be implemented as planned.

The systems and methods according to present principles may include transmitting, when the collision becomes imminent, a help-request message that includes information on the nature and location of the collision, and a conditional activation time. Then, a cancellation message is transmitted if the collision is avoided, thus relieving first responders from unnecessary false alarms.

The strategy may include indirect mitigation steps including turning off the fuel pump, unlocking the doors to prevent being trapped inside, disabling child-proof lockout features, rolling down the windows to permit escape, detecting a fire, informing the driver and other occupants that a collision is imminent, informing the driver that the system is taking over control of the vehicle, and sending a help-request message. Indirect mitigation may further include illuminating the brake lights at any time, regardless of whether the brakes are actually engaged. For example the brake lights may be lit up upon determining that a collision is imminent, thereby giving the following driver a little extra time to avoid hitting the subject vehicle, or at least to collide with less velocity. The system may also keep the brake lights on even after the subject driver has released the brake pedal. For example, it may be advantageous to cause other drivers to think that the subject vehicle is still slowing down, and therefore to slow down themselves.

The system preferably includes adjustment means to allow the driver to determine when and how the automatic system intervenes. Some drivers would prefer that the system intervenes only in an emergency, while other drivers would appreciate automatic assistance for minor operations such as maintaining a distance to the vehicle in front, or staying centered in lane. When a collision becomes imminent, some drivers want the automatic system to override the driver's actions completely, while others want to maintain some control. Drivers may also want the automatic system to wait for a brief interval before intervening, to allow the driver to handle the situation first.

In addition, the system may include means for the driver to override the intervention entirely. For example a dash-mounted disabling button may be pressed by the driver to cease all automatic emergency control signals and allow the driver to maintain direct control of the vehicle. Alternatively, a particular signal such as two quick taps of the brake pedal may cause the emergency system to relinquish control. The manual override may be temporary, expiring after a brief time such as a few seconds or a minute; or the automatic system may remain disabled until the driver takes some other action such as pressing a button. Preferably the system would revert to the enabled state each time the vehicle is started up.

The system may include means to ensure that the driver is not unduly depending on automatic interventions, for example a driver who is watching a video while the vehicle drives itself. Such over-dependence on the system for continuous hazard avoidance would be dangerous. To detect such an over-dependence situation, the system may require that the driver take some action periodically, such as turning the steering wheel or adjusting the throttle at least once every 10 or 20 seconds. If the driver fails to do so, the system may issue a sonic or visual alert, giving the driver another period, perhaps 2 to 5 seconds, to take some detectable action. If the driver again fails to do so, the system may deduce that the driver is incapacitated or at least distracted, and may pull to the side of the road, send a help message, or other action.

In addition, the system may detect when the driver is driving so dangerously that the emergency intervention is invoked frequently. For example a "dare-devil" driver may deliberately drive recklessly, knowing that the system will keep him safe by intervening at the last second. In that case the system may send a message to the local police, or may begin refusing to exceed the current speed limit for some period of time, or may pull to the side of the road until the engine is stopped and re-started, or other action.

The system includes means for recording data in non-transient media for future reference, including detailed data from the internal sensors, summary data from the external sensors, and a complete record of the interventions implemented by the system. The recorded data should be sufficient to allow the causes of the collision to be reliably determined, even if there are no survivors. The recorded data are also intended to enable any errors in the automatic responses to be uncovered and repaired, so that the reliability of the system may be improved steadily with experience. The recorded data may also be useful in legal cases both criminal and civil. Insurance companies may use the data to gauge a driver's level of risk and adjust premiums accordingly. Parents of young drivers may review the recorded data to ensure that unnecessary risks are not being taken. The data may enhance the quality of national highway safety by revealing unforeseen risks.

In addition to mitigating collisions between vehicles, the systems and methods according to present principles may also provide automatic assistance to avoid or reduce the harm of other highway hazards. In the case of potential collisions with objects other than vehicles—such as debris, pedestrians, animals, and fallen rocks or trees—the system may in some implementations recognize and avoid them in the same way as it does for vehicles. This capability generally requires merely that non-vehicle types of objects be added to the recognition templates of the image analysis software, a straightforward modification. In addition, the systems and methods may provide instantaneous assistance in emergencies other than potential collisions, for example emergencies such as a loss-of-control event, a solo spinout, a rollover, exiting the pavement, a tire blowout, and any other emergency situation that the system can recognize as dangerous on the basis of the internal sensors. Although it is probably not feasible to eliminate every possible hazard that could occur, nevertheless the majority of highway hazards, including all those listed in this paragraph, can be detected and mitigated effectively using the system hardware and methods as disclosed, with a few straightforward additions.

BRIEF DESCRIPTION OF THE DRAWINGS

FIG. 5A is a sketch showing five cars on a multilane highway in which the opposite lane is blocked. In this case a prior-art system is in use, which unfortunately fails to avoid the collision. FIG. 5B shows how a serious collision could occur with the prior-art system.

FIG. 16 is a table showing the steps of a strategy according to the present principles to avoid a collision by changing lanes.

FIG. 17 is a table showing exemplary adjustment means according to the present principles and their associated settings.

FIG. 18 is a table showing various degrees of automatic assistance, and the associated settings and actions, according to the present principles.

DETAILED DESCRIPTION

Figure 1:
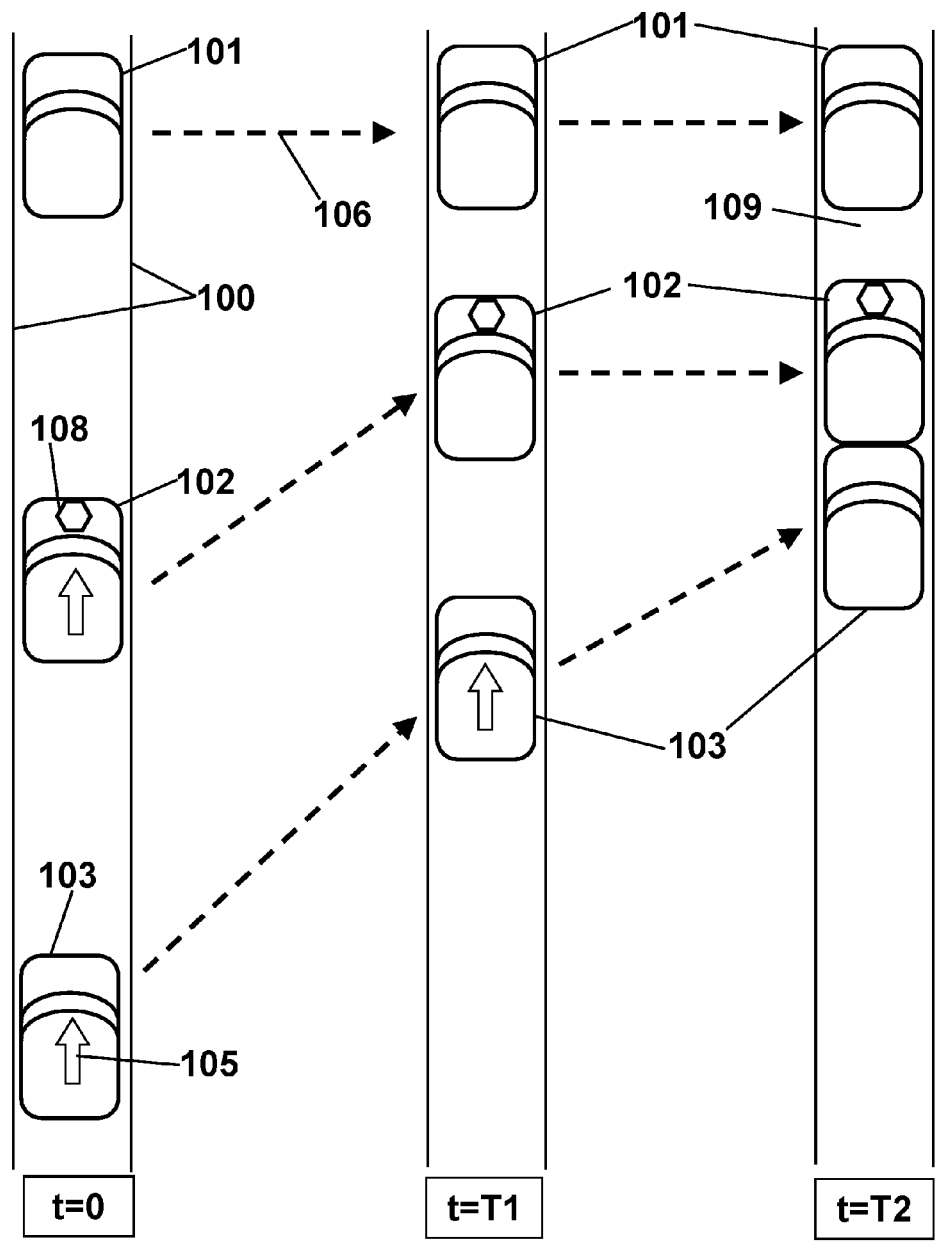
FIG. 1 is a sketch showing sequential positions of three cars in a traffic lane at successive times, according to a prior-art automatic braking scheme. In this case, due to the limitations of the prior art, a collision occurs needlessly.

A collision mitigation system according to the present principles comprises sensor means, computing means, acceleration and deceleration means, steering means, and optionally indirect mitigation means and adjustment means. The sensor means includes internal sensors and external sensors, all mounted on the subject vehicle and all providing sensor data. The computing means may comprise a single computing device such as a multi-core CPU, or it may include any number of separate digital processors interconnected by data buses. The acceleration means comprises the throttle if the subject vehicle has an internal-combustion engine, or whatever regulates the power output if the engine is electric. The deceleration means comprises the brakes along with electrical-hydraulic-mechanical controls for the brakes. If the vehicle has regenerative braking, this system too is included in the braking means. Optionally, and preferably, the deceleration means includes separate braking controls for each wheel. The steering means comprises the steerable wheels, usually the front wheels, of the subject vehicle, along with sufficient mechanical controls to adjust the steerable wheel direction.

The sensor means includes internal sensors that monitor the velocity and acceleration and deceleration and lateral accelerations of the subject vehicle, as well as the status of the brakes and steering of the subject vehicle. Internal sensors may also monitor the number and locations of occupants using seat sensors, and may detect fire or other internal hazard conditions. Internal sensors may also monitor the status of the external sensors, for example to detect when an external sensor is not operational.

The sensor means includes external sensors configured to measure information about vehicles around the subject vehicle, such as the position, distance, velocity, and acceleration of the other vehicles, and the yaw or direction of each vehicle, as well as the brake lights and turn signals of the vehicles. The external sensors may be configured to measure this information of the encroaching, opposite, leading, and following vehicles or other vehicles in the traffic. The distances and velocities of the various vehicles may be measured relative to the subject vehicle, or relative to the ground, or other reference. Each sensor means may use a different reference. The external sensors may acquire imaging data to evaluate the types of vehicles involved, thereby enabling an estimation of their stopping capabilities, for example differentiating a dump truck versus a sports car. If one of the vehicles is a motorcycle, then special consideration for the vulnerability of its riders may influence the choice of mitigation strategy. In case of a pedestrian in the roadway, every possible effort will be expended to avoid hitting the pedestrian. In case of an obstruction that does not involve people, such as a rockfall, then the priority will be upon the occupants of the subject vehicle. The external sensors may acquire data on the road condition and other information that is not directly related to the traffic, such as weather conditions.

The external sensors may include means for detecting other vehicles proximate to the subject vehicle, and for measuring the distance from the subject vehicle to the other vehicles (for example, radar or lidar or sonar or parallax or other distance measuring systems); means for measuring the velocity of the other vehicles relative to the subject vehicle or relative to the ground (such as Doppler or timing or other velocity detecting means); means for measuring the acceleration or deceleration of the other vehicles; means for detecting the illumination of brake lights of the leading vehicle or of any other vehicles farther forward; acoustical sensors to detect horn/siren/alarm/tire-screech sounds; or any other measurement means related to traffic safety.

The external sensors may comprise cameras which may be visible-light cameras or infrared (IR) cameras or both; active distance-measuring devices such as radar, lidar, and sonar; GPS; and other sensors. The sensor means acquires sufficient data to enable the computing means to determine when a collision is imminent. For example a dual-camera imaging system comprises a front camera and a rear camera, each of which is capable of a large field of view, such as at least 270 degrees of view, and is configured to record or transmit images of the leading and following vehicles as well as vehicles on both sides of the subject vehicle. The distance to each vehicle may then be calculated by comparing the observed vehicle image size to a previously calibrated image size for similar types of vehicles. Or, more preferably, a quad-camera imaging system may comprise four cameras mounted on the corners of the subject vehicle, with each camera having a wide field of view to image vehicles in front, behind, and on both sides of the subject vehicle. The wide field of view is necessary to ensure that at least two cameras can see each of the other vehicles simultaneously, so as to gauge the distance by parallax or triangulation. Parallax or triangulation involves comparing two images from two separated points of view, and thereby measuring the distance to the imaged vehicle based on differences between the two images. Each vehicle's velocity relative to the subject vehicle can then be obtained from the rate of change of the distance values, and their accelerations can be obtained from the rate of change of the velocities. An advantage of the parallax method is that it provides accurate distance measurements even when the leading vehicle is not directly in front, for example when going around a curve. Also the parallax method does not depend on assumptions about the type and properties of the other vehicles; it is objective and absolute.

The parallax method performs poorly in fog, falling snow, or heavy rain with visible cameras, although IR may partially compensate for such problems. Therefore the sensor means preferably includes an active distance measuring sensor such as radar or lidar or sonar. Lidar is the optical version of radar, in which a brief pulse of IR is directed forward, bounces off one of the vehicles, and is detected by a detector at the subject vehicle. The distance is then found from the time between emission and detection of the pulse. Of course an IR pulse must be eye-safe, and a sonar pulse must be ultrasonic. To avoid detecting scattered signal from other vehicles, the pulse is sufficiently collimated, and/or the detector is sufficiently collimated, to view only one vehicle at a time. Alternatively, the system could scan multiple vehicles simultaneously if the transmitter and the receiver are configured as a phased array, in which case the direction and distance of each vehicle can be deduced by analysis of the reflected waveforms. In the case of lidar, the system can scan multiple vehicles simultaneously by imaging the reflected signal and analyzing the resulting data to determine both the distance and bearing for each vehicle relative to the subject vehicle. The relative velocity between the subject vehicle and another vehicle can also be derived from the Doppler shift of the reflected signal, which can be measured by interferometry for example. Alternatively, a separate low-power CW (continuous-wave) transmitter-receiver may be used to measure the Doppler shift, and thus the relative velocity, of the other vehicle.

The external sensors, by combining data from multiple sensors based on different physical principles, provide greater ability to detect vehicles than prior art systems. For example, a prior art system based on simple image analysis of optical images could fail to detect an obstruction if it is large and featureless, such as a truck trailer crossing in front of the subject vehicle. The likelihood that the prior art system would miss the hazard is even greater if the trailer is painted a uniform white, has an albedo similar to a clear sky, and provides little visual contrast by which the prior art image analysis system could detect it. On the other hand, a system according the present principles would quickly and reliably detect the obstruction, by using non-optical sensor data such as the IR signature of the obstruction, or the sonar reflected signal, or the short-range radar signal for example. Alternatively, the obstruction could be detected using IR image analysis since objects generally have high infrared contrast relative to the sky. The need for such a capability is illustrated by a recent horrific accident. A vehicle with a prior art system failed to detect a trailer crossing in front of the vehicle, and resulted in the vehicle driving under the trailer without slowing down, killing the driver instantly. A system according to the present principles would have certainly detected the trailer, and would have stopped the subject vehicle in time, and would have prevented the accident and saved a life.

An embodiment of the computing means comprises one or more computer or microcontroller or ASIC or CPU or GPU or other digital electronic calculating means, configured to take as input the sensor data, and optionally to determine when a collision is imminent, and optionally to determine if the collision is avoidable, and to prepare and implement a mitigation strategy. The computing means also includes transient memory such as RAM or working memory, and non-transient storage media such as solid-state drives. The computing means further includes instructions stored on the non-transient media specifying how collisions should be mitigated, such as software instructions. The instructions may be copied to the transient media when the system starts, or at other times, so that the instructions will be instantly available to the processor when needed.

As mentioned, the calculation method must be carried out extremely fast so that the mitigation strategy can be applied in time to do some good. The method must be able to react much faster than any human. Also the method must be able to track the vehicles while the selected strategy is being implemented, and to test if the strategy is working as desired, and to change the strategy if a better option emerges. Prior-art emergency braking systems cannot meet this requirement due to lack of suitable processors, lack of a predictive kinetic model, lack of a dynamic collision model, lack of means for estimating harm, and other deficiencies.

The inventive computing means exploits modern, multi-core processors with fast memory and fast input bus, to perform the necessary image analysis and other tasks needed to select and carry out the mitigation strategy quickly. Fortunately, such processors are readily available, and at very low cost, as a result of mobile phone development and other recent advances. For example, multi-core 64-bit multi-GHz processors are available at modest prices which could perform the necessary processing in milliseconds. Also the processor must be able to survive a collision, even a major collision. With proper shock mounting, hardened enclosure, internal battery, and ruggedized connections it would not be difficult to arrange such a survivable processor.

Some of the steps of a method according to present principles are extremely computer-intensive, and also extremely repetitive, such as image processing and trajectory prediction. Also the data busses required to convey high resolution sensor data to a central location would be rather demanding although well within the art. As an alternative, the computing means may comprise a plurality of individual processors, each connected to a part of the system and configured to process just one kind of data. For example, a dedicated image analysis processor may be provided for each camera, which would reduce each frame to a few salient data items in real time, and then transmit the highly reduced data rather than the whole detailed image. Separate preprogrammed processors could be provided for executing the kinetic model and the dynamic model, with yet another processor for comparing the results of those models and selecting the best strategy. Or, three cores of a multicore processor may perform the modeling and selection tasks in parallel by running three codes in parallel.

A separate implementation processor may prepare and transmit the vehicle control signals to directly control the throttle, brakes, and steering of the subject vehicle. These signals probably are quite different from the other data signals, and in addition will be vehicle-type dependent. Therefore it may be advantageous for the upstream processors to deliver the desired acceleration-deceleration-steering sequence to the implementation processor, and let the implementation processor figure out what amplitudes, timing, and durations of control signals will be needed to cause the vehicle to accelerate, decelerate, and steer accordingly. Also, a dedicated implementation processor could receive realtime feedback by monitoring the actual speed, acceleration or deceleration, and yaw or direction changes of the vehicle, which would be monitored by the internal sensors. Using this realtime feedback, based on the actual motions of the vehicle, the implementation processor could adjust the control signals to cause the vehicle to more accurately match the selected sequence of actions, and would instantly correct any deviations that may occur.

Developers may arrange multiple processors in different ways to handle the various compute tasks, using more or fewer separate processing devices, without departing from the present principles.

A processor may use a realtime predictive kinetic traffic model which includes, at minimum, a catalog of the locations and velocities of all the other vehicles around the subject vehicle. The kinetic model calculates the trajectories of the other vehicles and projects their trajectories forward in time. The kinetic model thus detects imminent collisions, for example by determining that one of the vehicles will contact the subject vehicle within a predetermined number of seconds if no corrective action is taken. The kinetic model may include preprogrammed or default values for parameters such as the minimum braking distance of vehicles as a function of their actual velocity, the reaction times of normal drivers, and other values related to traffic safety. The kinetic model may include environmental factors such as the presence of rain or ice on the roadway, the type of road surface, and the like. The invention may include sensors to detect those conditions, or may employ an external data source such as the weather service to obtain the environmental data. In addition the kinetic model may determine the types of vehicles by image analysis, so as to discriminate for example between a semi-trailer versus a sports car, and then employ separate values or ranges of values for the presumed deceleration and other values accordingly.

The processor particularly notes any sudden changes in velocity or acceleration of the other vehicles. If configured with artificial intelligence or other advanced analysis software, the processor may interpret such changes as an indication of the intent of the other drivers, thereby enabling a more accurate projection forward in time. As an example, if a vehicle in a lane beside the subject vehicle suddenly turns toward the subject vehicle, the kinetic model may interpret this motion as the other driver planning to change lanes into the subject lane. Unless there is plenty of room, the kinetic model would elevate the threat level even before the other vehicle begins to encroach upon the subject vehicle's lane. Without such analysis, the threat would become apparent only after the other vehicle crossed the lane line. Thus the advantage of artificial intelligence is that it provides earlier warning of an emerging hazard by correlating observed changes in acceleration with driver intent, thereby resulting in improved anticipation of subsequent threat situations.

When the collision is unavoidable, a processor analyzes the collision and calculates the expected harm of the collision. This analysis may employ the dynamic collision model which analyzes the energy delivered to the colliding vehicles, calculates the mechanical effects on the vehicles, their peak acceleration, the peak rate of change of acceleration, and other parameters related to collision dynamics. The processor may further evaluate the likelihood that each of the vehicles may lose control by spinning or skidding for example, or the likelihood that one of the drivers may become incapacitated in the collision, which could modify the expected outcome further. The processor performs this analysis using as input each of a plurality of possible sequences of actions of the subject vehicle such as braking, accelerating, and steering. The processor then calculates the expected harm for each collision according to each sequence of actions. The processor then selects the sequence with the least expected harm, prepares a corresponding strategy including control signals and indirect mitigation steps, and implements the strategy.

The deceleration means include electronic, mechanical, hydraulic, or other linkages to control the brakes of the subject vehicle. Optionally, but preferably, the vehicle includes differential braking means with separately-controllable linkages to the wheels on the left and right of the subject vehicle, or to all four wheels, so that the brakes on each wheel may be activated individually. A maneuver such as a quick swerve could be performed more rapidly using the differential braking than with steering alone, because the latency is shorter for braking, and also the achievable forces are generally higher for braking. Additionally, the differential braking means and the steering means may be operated cooperatively to carry out such a maneuver more quickly or with more control or with more safety, for example to prevent a spin-out. The acceleration means and the differential braking means, activated simultaneously on different wheels, would enhance the speed and control and safety of many fast emergency maneuvers.

The system is configured to detect a collision when it occurs, using multiple distinct means. In most cases, a collision would be anticipated before it occurs since the system continuously tracks the positions of other vehicles in real time, and thus would have determined that the collision is unavoidable before it occurs. If however a collision occurs unanticipated, for example from a falling object, the system is quite capable of detecting that the collision has occurred, for example from the internal acceleration sensors. A sudden impulse not related to braking would indicate that some sort of collision had likely taken place. Or, a very loud sound consistent with a collision sound may be detected, or the airbags may have deployed, or a major internal failure such as an engine seizure has occurred. In each of these cases, a system according to present principles would detect the collision and begin post-collision mitigation steps immediately. Notably, the system would overcome a serious defect in prior-art systems. Specifically, a particular prior-art automatic emergency system failed to detect even a massive, vehicle-destroying collision when it occurred; indeed the prior-art system simply continued driving the vehicle as if nothing had happened. A system according to present principles would certainly have detected the collision when it occurred, and would have pulled to the side of the road and radioed for medical assistance. Indeed, a system according to present principles would have detected the hazard in advance, and would have prevented the collision from occurring in the first place.

The system according to present principles may generate a particular signal such as a collision-detect signal that indicates when a collision has occurred. The collision-detect signal may include an electronic signal such as a voltage or a digital signal that indicates that a collision or suspected collision has occurred. In addition, the collision-detect signal may include much more information such as a time and GPS location at which the collision occurred, information about the type or direction of strike, and other information. The collision-detect signal may be derived from the external sensors, wherein a collision is detected when the external sensors indicate that the distance between the subject vehicle and another vehicle shrinks to effectively zero. The collision-detect signal may also be derived from the internal sensors such as the accelerometers, which would register a sudden large acceleration not explicable by the action of the accelerator or brakes or steering wheel. The collision-detect signal may include input from sound sensors, since most collisions are accompanied by a loud sudden impact sound. The collision-detect signal may be generated as a result of a massive system failure such as an engine seizure. If the airbags deploy, the collision-detect signal would likely follow. However, the collision-detect signal would preferably not be generated by minor events such as running over a pothole, notwithstanding that this can generate sudden inexplicable accelerations. Most preferably, the system incorporates all of the above factors into an analysis that evaluates if a collision has occurred, and then issues the collision-detect signal accordingly.

While the collision is in progress, the system and method according to present principles continues to analyze the ongoing dynamics of the collision using further sensor data, continually explores alternative mitigation strategies, continually updates the selected strategy according to the particular way the collision proceeds, and immediately revises the strategy if a better option emerges. This ongoing cycle—reanalysis of the collision and readjustment of the strategy—continues at full speed as long as new sensor data is available, finishing only after the collision is complete and all post-collision hazards have passed.

After the collision is complete, a processor implements the post-collision strategy. The post-collision strategy is a sequence of actions that may include, first, verifying that the processor is still operational after the collision, for example with a self-test. If the processor fails such a self-test, it may drop to a predetermined holding state or shut down altogether. The predetermined holding state may include turning off the ignition and fuel pump, applying the brakes, and unlocking the doors; or the holding state may involve taking no action at all. If, on the other hand, the processor is still operational after the collision, then the next step is to poll the sensors to determine which ones are still operational. If the internal sensors are still operational, then the condition of the subject vehicle is updated according to the internal sensor data. If the external sensors are still operational, the surrounding traffic is monitored, especially checking for secondary collision threats. If a secondary collision threat is detected, a processor prepares a collision-avoidance strategy or a harm-minimization strategy depending on whether the secondary collision is found to be avoidable or unavoidable, and then implements the strategy. The strategy may include backing away from the collided vehicle, or driving to the side of the road, or accelerating to change lanes, or other action to avoid being struck again.

When the processor finds that the threat of a secondary collision has passed, the processor then applies steps to minimize any potential harms other than a secondary collision. Such steps may include turning off the fuel pump, unlocking the doors, and possibly rolling down the windows. Steps to alert other drivers of the hazard may also be applied, such as turning on the emergency flashers or sounding the horn in a particular pattern. If the vehicle has a seatbelt-release capability, the seatbelts are released at that time. If the vehicle has sensors to detect a fire or a gas leak, the vehicle's sound system or any other speaker may be used to alert the occupants, for example saying "Fire! Fire! Get out now!"

The post-collision steps then include sending a help request message. The help request message preferably is machine-generated so as to not depend on the driver who may be incapacitated. The help request message preferably includes both speech sounds and digital data so that both a human operator as well as an automated response system can understand the message. The digital portion may include more detail such as the GPS coordinates or the speed at the time of collision or injury types if determinable. Preferably the system allows the driver to add spoken information to the message, or better yet to speak directly with a first responder. Preferably the subject vehicle includes a mapping capability to relate the GPS coordinates to street names. The help request message could be, for example, "High-speed collision on northbound route 5, one kilometer south of Maple Road. Driver incapacitated. Multiple injuries suspected. Send ambulance immediately. GPS coordinates and more data follow:" after which a frequency-encoded machine-readable data block would follow. The intent is that either human or machine recipients can respond to the message.

In one version, a help request message is sent even before the collision occurs, along with a contingency and an activation time, such as "Send emergency help to GPS xxx-yyy unless canceled within 10 seconds." Then, if the collision is avoided, a cancellation message is sent, preferably within the 10-second limit. The emergency response station must be set up to accept and hold such contingent messages until the stated activation time is reached, to avoid burdening the staff with false alarms. The help request would then be passed to a human operator only after the activation time, and only if no cancellation message is received. While it is desirable to be able to send the help request message before the collision occurs, it is also important not to clog up the emergency response system with false alarms. Therefore the emergency response station would have to be able to automatically recognize that the message is contingent with an activation time, and to store the help request message for that time, and only then pass the message to a human. This feature may require some upgrading of the emergency response station.

Simultaneously, and throughout the post-collision period, the invention monitors whether the driver is incapacitated. If the airbags have deployed (and if the internal sensors are able to detect that fact) then it is safe to assume that the driver will be extremely disoriented by the airbag for at least a certain amount of time, such as 1-2 seconds, and often longer. If the peak acceleration has exceeded a predetermined human tolerance limit, then the driver may be assumed to be disabled. However, if the driver manages to apply the accelerator or brakes or steering at any time post-collision, then the driver is assumed to be responsive. In one version of the invention, the system would simply relinquish control to the driver if responsive, after informing the driver that the system is ready to do so. In another version, the system continues to control the vehicle until all threats have passed. Alternatively, the system may take a middle path and compromise between the driver's intent and the selected strategy. It is hard to know whether to trust the automatic system or the driver's instincts in a post-collision emergency because they are both fallible, and the post-collision scenario is notoriously unpredictable. The science of automatic vehicle operation is still developmental at the time of writing, and so caution would dictate that the automatic system should relinquish control to the driver if responsive. However, the reliability of automatic intervention systems is rapidly improving, and it is likely that soon it will be safer to let the automatic system dominate during any emergency, including post-collision.

The invention optionally includes indirect mitigation means which comprise any means other than vehicle velocity control. For example the indirect mitigation means may be configured to turn on the brake lights or emergency flashers as soon as the collision becomes imminent, so as to alert the following driver. Or, the brake lights could be turned on at some other moment when the invention deems it beneficial. For example, suppose the following vehicle is approaching too fast and a collision is imminent. The invention will probably cause the subject vehicle to positively accelerate in that case rather than decelerate, since the attack is from behind; however it would also be beneficial to simultaneously turn on the brake lights to cause the following driver to think that the subject vehicle is slowing down and thus prompting the following driver to hit the brakes. The ability to illuminate the brake lights while coasting or accelerating forward is a valuable safety option.

Activating the emergency flashers or the backup lights may further alert the following driver, thereby prompting the following driver to take avoidance action sooner or more aggressively than otherwise. The inventive system may also sound the horn or flash the headlights to alert the leading driver, perhaps causing the leading driver to release his brakes and move forward, thereby avoiding or at least softening the subsequent collision. It would also allow the occupants of the leading vehicle to brace themselves or otherwise prepare for a collision, reducing overall harm.

Indirect mitigation may include unconventional means for signaling other drivers that an emergency is occurring. It is often difficult to determine how rapidly another vehicle is stopping, and the brake lights provide no quantitative information. The following driver has no way to know that the vehicle ahead is indeed braking very hard until it becomes visually apparent that the separation distance is closing too fast, at which point it may be too late to avoid a collision. To make matters worse, the brake lights often cannot be distinguished from the running lights at night or at dusk or in fog. Therefore the indirect mitigation steps may include sending a visual signal indicating that the subject vehicle is indeed braking very hard. Such signaling means may include, for example, causing the brake lights to illuminate extra brightly, or to flash bright-dim-bright rapidly, or to alternate left-right-left, or other distinctive signal using the brake lights. The signaling may include turning on other lights in addition to the brake lights, such as the emergency flashers, or causing the turn signals to rapidly alternate between left and right, or turning on the white backup lights, or turning on various lights according to how strongly the subject vehicle is decelerating. For example the normal brake lights could be turned on for a regular slowing, then adding the emergency flashers for a more aggressive deceleration, and then adding the backup lights flashing left-right in a panic-stop situation.

Indirect mitigation also includes keeping the driver of the subject vehicle informed throughout the analysis and implementation process. The indirect mitigation includes providing a visual or acoustical or haptic alarm to let the driver know when a collision is imminent, and preferably the alarm includes an indication of the direction of the threat so that the driver can take corrective action before the collision becomes unavoidable. For example the imminent collision alarm may be a characteristic sound generated by a speaker or solid-state beeper or other sound generator. Or, more preferably, a plurality of small beepers could be mounted in the subject vehicle to indicate the direction of the threat. Also, the pattern of sound could be varied according to the rate of approach, a rapidly modulated sound indicating a rapidly approaching threat for example. Preferably, the vehicle sound system would be silenced as soon as a collision became imminent, to avoid distractions and to enable the driver to interpret the acoustical alarm more readily. The occupants could use this warning to brace themselves or hang on in anticipation of a crash, thereby preventing many injuries.

Alternatively, a voice-like message may be generated such as "Slow down, blockage ahead!" or other information that the driver could use to avoid the hazard before it became necessary for the automatic system to intervene.

As a further alternative, visual indicators may be illuminated indicating that a hazard is developing, such as a flashing indicator on the dashboard, an icon reflected in the windshield or other heads-up display, or flashing lights arranged around the periphery of the ceiling as described for beepers. Such flashing lights could be combined with the sound generators to provide a modulated visual alarm synchronized with the modulated sonic alarm, to further inform the driver of the hazard direction and proximity. Drivers who may be hard of hearing would appreciate the visual alarms, especially those who have limited ability to discern direction from sound. Preferably the light flashes would be dimmed at night to avoid flash-blinding the driver, and made brighter in direct sunshine to ensure visibility.

The indirect mitigation means further includes informing the driver when the automatic system takes over control of the vehicle. Every driver will find it disconcerting to suddenly lose control even as a threat is rapidly evolving. The inventive system minimizes this, and enlists driver cooperation, by clearly indicating that it is taking over and implementing emergency mitigation steps. The indication may be acoustical, such as a tone or sound different from that used to indicate an approaching threat, or a voice-like message, or a sound coordinated with a visual indicator. In addition, a haptic indicator may be used to inform the driver that the brakes or steering are being controlled by the system, for example with a vibrating or other easily discernible haptic being generated right on the brake pedal or the steering wheel, whenever the system forces braking or steering actions. Or, a haptic vibe could be delivered to the steering wheel whenever the automatic system takes over regardless of which controls are actually being exercised, since sometimes the driver is not in contact with the brake pedal for example.

Indirect mitigation further includes informing the driver when the intervention is complete and control of the vehicle is being returned to the driver. Prior-art system generally neglect this important step. The driver needs to know when to resume controlling the vehicle, or else another emergency is likely to occur in the very near future. Therefore the system provides a message, such as computer-generated speech or a pre-recorded announcement, stating that control is being turned over to the driver. In addition, the system may continue to control the vehicle after such a message until the driver actually takes control. For example the system would continue to drive the vehicle until the driver asserts control by operating the steering wheel or brakes or accelerator or other control. In the excitement and noise of a post-collision transition, the driver might not hear a message that the system is ready to relinquish control. Or the driver may be disoriented from air-bag deployment, or may be otherwise incapacitated. In all cases the system guides the vehicle safely until the driver takes over. However, if the driver fails to assert control after repeated messages, the system may drive to the side of the road and stop, and send a help-request message or other strategy to help the driver.

The indirect mitigation may in some implementations further include alerting all the occupants when a collision is about to occur, such as "Hang on, we're being hit from behind!" immediately before impact. It is believed that such preparatory information would greatly reduce the period of disorientation from airbag deployment, thereby enabling the driver to quickly recover post-collision, and also enabling the occupants to be prepared to exit the vehicle or whatever is required after the collision. A simple message would not stop the collision, of course, but it could save many lives nevertheless through these indirect means.

The system may include adjustment means whereby the driver can select when and how the invention provides automatic assistance. The adjustment means is any user-variable electrical or mechanical or software interface or control, which the driver can adjust to a particular setting, and which the processor can read or evaluate, thereby allowing the user to adjust a parameter in the processor such as an intervention threshold. The adjustment means may be a knob or switch or button, or a selector widget, or slider displayed on a touchscreen, or a voice-activated parameter adjustable by voice commands, or any other means for a human to set a parameter that a processor can read. The adjustment means may be continuously adjustable or have discrete steps. It may be adjustable only at certain times, such as after the engine has started but before the transmission is engaged, or it may be adjustable only under certain circumstances, such when a driver password is entered. Further examples of adjustment means are provided in FIG. 15. The adjustment means may include insignia or lights or other display means showing the selected adjustment setting, or it may be blind. The adjustment means may be automatically self-resetting, for example by returning to a default setting each time the engine is turned off, so that the driver must reaffirm a preferred setting each time the car is started. Multiple adjustment means may be provided, with each adjustment controlling a different operational parameter of the automatic system.

The setting, to which the driver has set the adjustment means, influences the strategy that the system implements. For example, the adjustment means may determine a delay interval, such that the automatic system would delay any intervention for the selected delay interval. Typically the system first detects that a collision is imminent, then waits for the selected delay interval, thereby giving the driver an opportunity to resolve the problem, then checks if the threat persists, and only then implements the intervention strategy. Alternatively, the adjustment setting may determine a hazard threshold, such that the automatic system would intervene only if the threat level exceeded that threshold. Thus the automatic system would not respond to an imminent collision at low speeds, but would intervene fully for a threat at highway speeds. As a further alternative, the adjustment means may set an amount of assistance, so that the intervention would range from a minimal to maximal assistance. Thus a minimal assistance setting would cause the system to modify the driver's actions only slightly, whereas a maximal assistance setting would enable the automatic system to take over completely. At intermediate settings, the intervention may be a compromise between the driver's actions and the planned strategy.

In a first version of the adjustment means, the setting controls the hazard intervention threshold. The adjustment means is a multiposition switch mounted on the dashboard. The switch positions may be labeled according to several increasing degrees of hazard, ranging from low-hazard to high-hazard. For example the highest position could be labeled "Extreme Emergencies Only", meaning that with this setting the system would intervene only when a collision is likely to be a serious collision; hence the setting is associated with a high intervention threshold. The next switch position could be labeled "Imminent Hazards", then "Possible Threats", and finally "Routine Adjustments" at successive switch positions, each such setting being associated with a lower intervention threshold.

The driver could thereby adjust the degree of hazard at which the system would intervene, and then the system would provide automatic assistance only if the evaluated degree of hazard of the imminent collision exceeds the intervention threshold associated with that setting. Thus a skilled and confident driver may select Extreme Emergencies Only, while a less-skilled driver might select the lowest threshold level to obtain automatic assistance under more routine circumstances (that is, a less-skilled driver may appreciate and employ the automatic assistance not only in an emergency, but also in routine situations such as keeping centered in the lane or regulating the distance from the car in front). As a further option, the lowest intervention threshold setting may be a fully driverless operation, such that the automatic system drives the car 100% of the time unless the driver takes over. Thus the adjustment means allows the driver to select between a driverless (processor-driven) mode and a regular (human-driven) mode, depending on whether the driver desires to drive the car or not.

Table 1 lists a different intervention threshold scheme, based on evaluating the degree of hazard according to the collision time and the probability of collision. Many other intervention thresholds are possible, reflecting different ways of evaluating a degree of hazard.

TABLE 1

Intervention Thresholds

Immediate, high-probability threats
Impending, medium-probability threats
Delayed, lower-probability threats
Long-term, low-probability threats In a second version of the adjustment means, the setting controls a degree of assistance, such that the automatic system will exert more or less control over the vehicle depending on the setting. For example, the automatic system may adjust the prepared strategy according to the setting, which would modify the brake control signals to be a compromise between the amount of braking that the strategy calls for and the amount that the driver imposes with the brake pedal. Likewise the throttle control signals and the steering control signals could be modified according to the setting of the adjustment means. In one version, the driver may turn a knob which determines whether the system will completely take over the operation of the car in an emergency, or at a different setting would revise the driver's actions only slightly. In that case the degree of assistance is a weighting parameter ranging from 0% to 100%, where 0% corresponds to no assistance even in an emergency, 10% means that the system would provide only gentle or slight variations upon the driver's actions, 50% corresponds to averaging the inputs from the driver and the automatic analysis with equal weights, and 100% corresponds to the automatic system completely taking over in an emergency regardless of any driver actions. Thus a low setting of the degree of assistance would allow the automatic system to provide only small adjustments to the driver's braking or steering actions, whereas a driver who wishes to retain some level of control in an emergency can set the adjustment means to an intermediate position, and yet a third driver may decide to allow the automatic system to fully operate the vehicle in an emergency. Of course the system relinquishes control back to the driver as soon as the emergency is past (unless the driver has requested full-time fully-autonomous driving).

A different example of the degree of assistance is shown in FIG. 18. Here the three levels of assistance are Low, Medium, and High Assistance, with the corresponding settings of, respectively, "Warn only", "Relinquish on demand", and "Intervene until safe". With the Low Assistance selection, the system issues a machine-generated speech warning that a collision is imminent. It may further provide an indication of the type or direction of the threat, such as "Right side encroachment!", or an estimated collision time, or other helpful information. However with Low Assistance the system would not intervene, other than issuing the warning. With the Medium Assistance selection, the system would issue the same warning, and also would take over control of the vehicle when a collision is imminent. However, the system would then relinquish all control back to the driver if the driver asserted control by, for example, forcefully operating the steering wheel or brake or accelerator in conflict with the system control. With the High Assistance selection, the system would again issue the warning message, and would take over control, but would not release control until all imminent hazards have cleared.

In a third version of the adjustment means, the setting corresponds to a delay interval. The driver can set the delay interval from zero (no delay) to as long as 1-3 seconds for example. When the automatic system detects an imminent collision, the system would then wait for a time equal to the selected delay interval and then, if the collision is still imminent at that time, would begin the selected mitigation strategy. This would give the driver time to react and perhaps avoid the collision. The delay interval setting makes sense if the driver believes that the automatic system would not be able to handle emergency situations as well as the driver, and therefore the driver wants to make the first avoidance attempt. However the automatic system would then take over if the driver's strategy does not work within the selected time limit. There are probably many situations where a skilled human could do better than the machine, but a less-skilled driver would probably not do as well as the automatic system. Therefore the adjustment means allows the driver to select the amount of delay that would be appropriate.

A system according to present principles may further include means for recording data on each event that requires an emergency intervention. The system would also record data on each collision, and on other traffic events of significance. The recorded data preferably includes sufficient detail to enable each intervention event to be reconstructed and its causes identified with high certainty. At minimum the recorded data should include detailed data from the internal sensors indicating the velocity and acceleration of the subject vehicle for a period of time, 10 minutes for example, leading up to the collision or intervention, as well as real-time data on the status of the accelerator and brakes and steering, and possibly other internal sensor data such as whether the radio was being fiddled with, or other potential distractions. Such real-time data may comprise data accumulated every millisecond, or every second, or at other time intervals depending on the measurement speed of the sensor and other factors. The recorded data should further include summaries of the external sensor data such as distances and velocities and locations of various vehicles around the subject vehicle during the pre-collision period, plus representative images.

The recorded data should also include the type of automatic intervention provided, including detailed timing of events leading up to the intervention, and whether the collision was found to be avoidable or unavoidable, and the exact sequence and strategy selected, and whether that strategy was successfully implemented. The settings of any adjustment means should also be recorded.

If a collision occurred, a complete record of the sensor data during the collision period should be recorded, as well as detailed traffic and internal data during the post-collision period. If any indirect mitigation was attempted, this should be recorded. Any help-request or other transmitted messages should be recorded.

The recorded data should be updated continuously into a shielded, password-protected, non-volatile, hardened memory. Then, shortly after a collision or intervention, the last 10 minutes (or other period) of the record would be sealed so as to protect it from being overwritten, and a new record would be started in a different region of the memory. In this way multiple collisions or interventions can be fully documented including the period leading up to the collision or intervention, whereas all the non-emergency data would be overwritten in due course. Ample hardened memory should be provided for at least several such events to be recorded and preserved.

Alternatively, the data may be stored in regular volatile memory, being updated continuously and older data overwritten continuously until a collision becomes imminent. Then, the most recent 10 minutes (or other interval) of data would be quickly copied from the regular memory into the special hardened non-erasable memory for protection. Also, after a collision, the collision data would be copied into the non-erasable memory as well. Automatic uploads to a cloud or other server may also be configured, such that collision data is automatically stored in a location of the user's choosing.

The recorded data may be reviewed by any authorized person, such as the driver, the police, and insurance companies for example. Passwords may be used for restricting access. In one version, an insurance company offers discounts to customers who permit them to review the stored data, and further discounts if the data indicates that the driver had few or no interventions, in the same way that drivers with no tickets get better rates. A good driver should never, or almost never, require automatic emergency intervention.

Turning now to the drawings, FIG. 1 shows how a collision scenario may proceed when a prior-art automatic braking system is employed. The scenario involves successive views of three cars at three successive times. The scenario ends in a needless collision, primarily because the prior-art system failed to account for the velocity of the following vehicle.

At time t=0, in a lane of traffic demarked by lines 100, there are shown three automobile icons representing a leading vehicle 101, the subject vehicle 102, and a following vehicle 103. A block arrow such as 105 indicates when each vehicle is moving; and when the vehicle is stopped, there is no arrow.

The subject vehicle 102 includes a prior-art automatic braking system represented as an open hexagon 108. The prior-art system 108 does not monitor traffic to the rear and thus cannot detect the following vehicle 103.

The traffic lane is repeated at three sequential times indicated as t=0, t=T1, and t=T2. For example, T1 may be 1 second and T2 may be 2 seconds. Dashed arrows such as 106 show how each vehicle's position shifts at each time. Thus the figure shows how each car moves during the scenario.

Initially, at t=0, the leading vehicle 101 has suddenly stopped. The subject vehicle 102 and the following vehicle 103 are travelling forward because their drivers have not yet realized that the leading vehicle 101 has stopped.

At time T1, the prior-art automatic braking system 108 on the subject vehicle 102 has detected that the leading vehicle 101 has stopped, and has brought the subject vehicle 102 to a stop as rapidly as possible. Meanwhile, the following vehicle 103 is still traveling forward, but now the following driver sees that the subject vehicle 102 has stopped and applies his own brakes in panic.

At time T2, the following vehicle 103 has collided with the subject vehicle 102 because there was insufficient time for the following vehicle 103 to stop. The source of the problem was the prior-art braking system 108, which stopped the subject vehicle 102 too rapidly, leaving a large space 109 between the subject vehicle 102 and the leading vehicle 101, thus depriving the following vehicle 103 sufficient time to stop.

Figure 2:
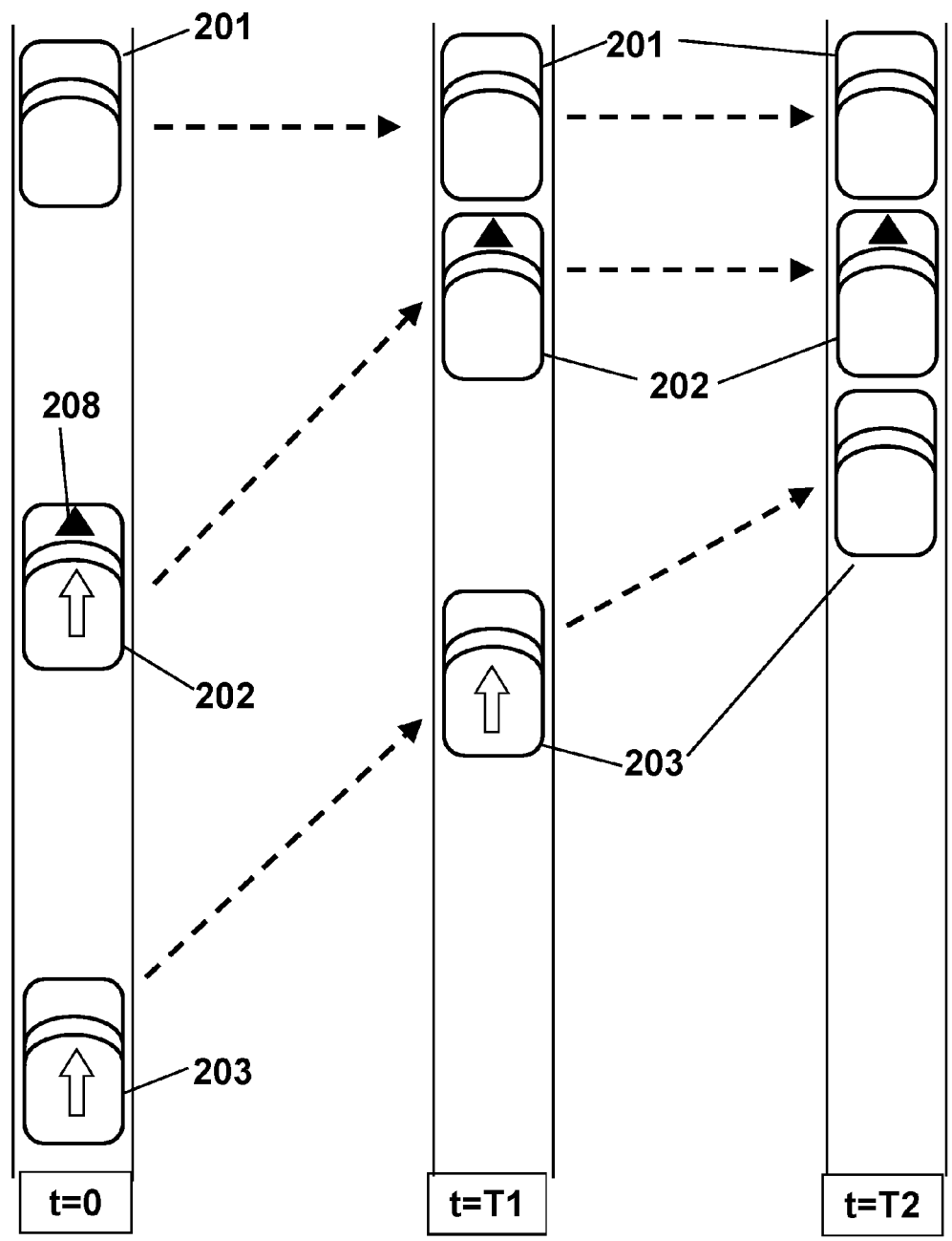
FIG. 2 is a sketch showing sequential positions of three cars in a traffic lane at successive times, according to a collision-avoidance strategy according to an implementation of present principles. By controlling the braking with a sensor-based predictive traffic model according to the present principles, a collision is narrowly avoided.

FIG. 2 shows a similar scenario, but now guided by the inventive collision mitigation system. The invention detects that a collision is imminent but avoidable, and applies a collision-avoidance strategy. The outcome is a near-miss but no collision.

At time t=0 the leading vehicle 201, the subject vehicle 202, and the following vehicle 203 are in a travel lane, but the leading vehicle 201 has suddenly stopped. Fortunately, the subject vehicle 202 now includes a collision mitigation system according to present principles, represented as a filled triangle 208. The collision mitigation system 208 detects that the leading vehicle 201 has stopped, and also that the following vehicle 203 is approaching, and measures their velocities and accelerations, and updates the kinetic traffic model, determines that a collision is imminent, determines that the collision is avoidable with a particular sequence of positive accelerations or decelerations or steering, and applies a collision-avoidance strategy accordingly. In this case the collision-avoidance strategy comprises applying the brakes but not too hard, thereby bringing the subject vehicle 202 close to, but not in contact with, the leading vehicle 201. Alternatively, and preferably, the system 208 arranges to apply the brakes very hard at first to alarm the following driver, and then with precision timing to ease up on the brakes so that the subject vehicle 102 will coast in very close to the leading vehicle 101. This latter sequence gets the following driver's attention early in the scenario, as desired. It also ensures that any unintended contact between the subject vehicle 102 and the leading vehicle 101 will be very light because of the very low speed of the subject vehicle 102 as it draws closer.

Then at time T1 the subject vehicle 202 has stopped, mere centimeters from the leading vehicle 201, while the following vehicle 203 is still traveling forward but is braking because the driver of the following vehicle 203 has seen that the subject vehicle 202 was slowing down, or saw the brake lights of the subject vehicle 202.

At time T2 all three vehicles 201, 202, 203 are stopped close to, but not contacting, each other. The following vehicle 203 was able to stop in time because the subject vehicle 202, guided by the collision mitigation system 208, allowed sufficient distance for the following vehicle 203 to stop.

Most human drivers would have extreme difficulty performing this maneuver because it is too difficult to know exactly when to ease up on the brakes; but the collision mitigation system 208 with its 64-bit precision should be able to make it work, every single time.

Figure 3:
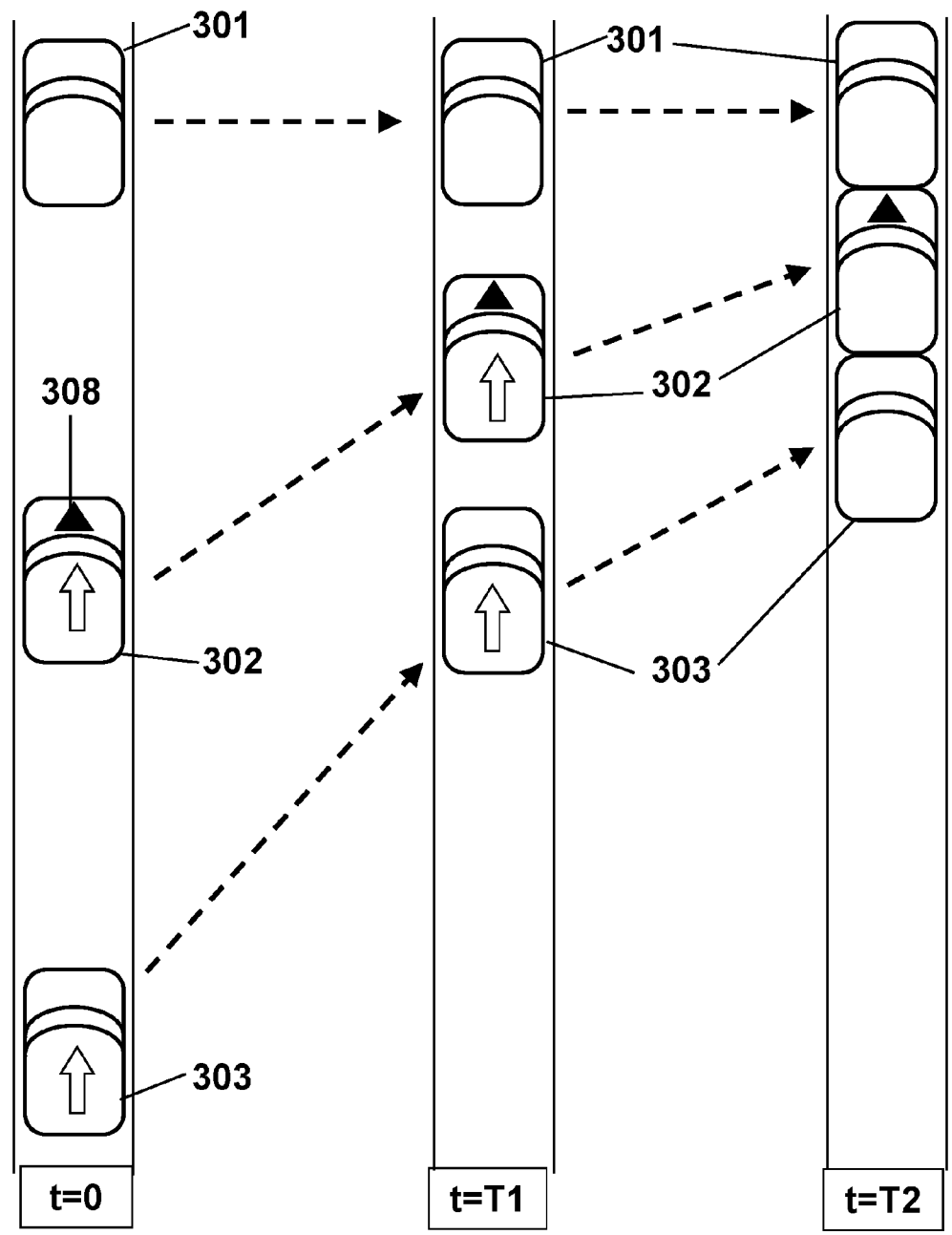
FIG. 3 is a sketch showing sequential positions of three cars in a traffic lane at successive times, guided by a minimum-harm strategy according to present principles. By adjusting the acceleration or deceleration of the subject car to remain centered between the other cars, the collision energy and acceleration are minimized.

FIG. 3 shows another scenario with three cars, but here the collision is unavoidable. A system according to present principles applies a minimum-harm strategy and manages to protect the occupants of all three vehicles from life-threatening injuries.

At time t=0, the leading vehicle 301 has stopped, the subject vehicle 302 is travelling, and the following vehicle 303 is travelling. The adjacent lanes are blocked by other cars (not shown). The collision mitigation system 308 in the subject vehicle 302 detects that the leading vehicle 301 has stopped, and also that the following vehicle 303 is rapidly approaching, and also that lateral motion would be extremely harmful. The collision mitigation system 308 analyzes the situation using its predictive traffic model and determines that a collision is imminent and unavoidable, given the speed and distance of the following vehicle 303.

The collision mitigation system 308 selects a harm-minimization strategy that prioritizes saving lives over hardware damage. The harm-minimization strategy in this case comprises applying positive accelerations and decelerations to the subject vehicle 302 so as to keep the subject vehicle 302 centered between the other two vehicles as they come together. This strategy also ensures that the velocity of the subject vehicle 302 approaches one-half the velocity of the following vehicle 303 (since the leading vehicle 301 velocity is zero). The three vehicles are seen at time T1 coming closer together while the subject vehicle 302, guided by the collision mitigation system 308, remains centered between the other two vehicles.

At time T2 the vehicles simultaneously collide. The harm in this type of collision is minimized for several reasons. By arranging to have a velocity midway between the leading and following vehicles 301 and 303, the subject vehicle 302 ensures that the peak acceleration experienced by any of the vehicles is minimized. Secondly, the strategy minimizes the amount of kinetic energy liberated in the collision. This can be seen from the fact that the kinetic energy available to any collision between two vehicles is proportional to their relative velocity squared. Reducing the relative velocity by a factor of 2 thus reduces the kinetic energy of that collision by a factor of 4. With two simultaneous collisions, each having one-fourth the energy, it is equivalent to a single collision with one-half of the energy that a full-velocity impact would deliver. Any other velocity of the subject vehicle 302 would result in a more energetic collision, and hence more damage and injury. Although the subject vehicle 302 would likely be totaled under this strategy, since it experiences collisions to both front and rear, the strategy maximizes the likelihood that everyone could walk away.

A further advantage of the selected strategy is that it preserves the option of switching to a collision-avoidance strategy in case the following vehicle 303 manages to slow down sooner than expected, for example if it happened to have superior tires freshly installed or if the driver had great reflexes. The collision mitigation system 308 watches for that possibility throughout the scenario, by measuring the actual deceleration of the following vehicle 303, and by updating the kinetic traffic model to see if the prediction has changed to an avoidable collision. And, if the collision did indeed become avoidable at the last moment, then the collision mitigation system 308 would instantly switch to an already-calculated collision-avoidance strategy instead. In this case that would mean detecting that the following vehicle 303 has safely slowed down, then applying the brakes hard enough to stop before hitting the leading vehicle 301. By dynamically adapting the mitigation strategy to exploit any improvements in the conditions, the collision mitigation system 308 may thus be able to prevent the collision entirely.

As a further option, the collision mitigation system 308 may apply other actions besides acceleration and deceleration to minimize the harm. For example, the collision mitigation system 308 may illuminate the subject vehicle's brake lights immediately upon determining that a collision is imminent, and not waiting for the mechanical braking system to turn on the brake lights some milliseconds later. This would prompt the following vehicle 303 to begin slowing down a little sooner, potentially making a big difference in the outcome. In addition, the collision mitigation system 308 may do things to prompt the leading vehicle 301 to move forward, such as flashing the headlights and sounding the horn. Even a small forward velocity in the leading vehicle 301 would make a big improvement in the collision energy and peak acceleration, even if it meant that the leading vehicle 301 might contact the car in front of it. In general when lives are at stake, it is better to distribute the collision energy among as many vehicles as possible even if all of the vehicles end up damaged; however if injury is unlikely and total damage is the main issue, then it is usually better to contain the collision to few vehicles.

Figure 4:
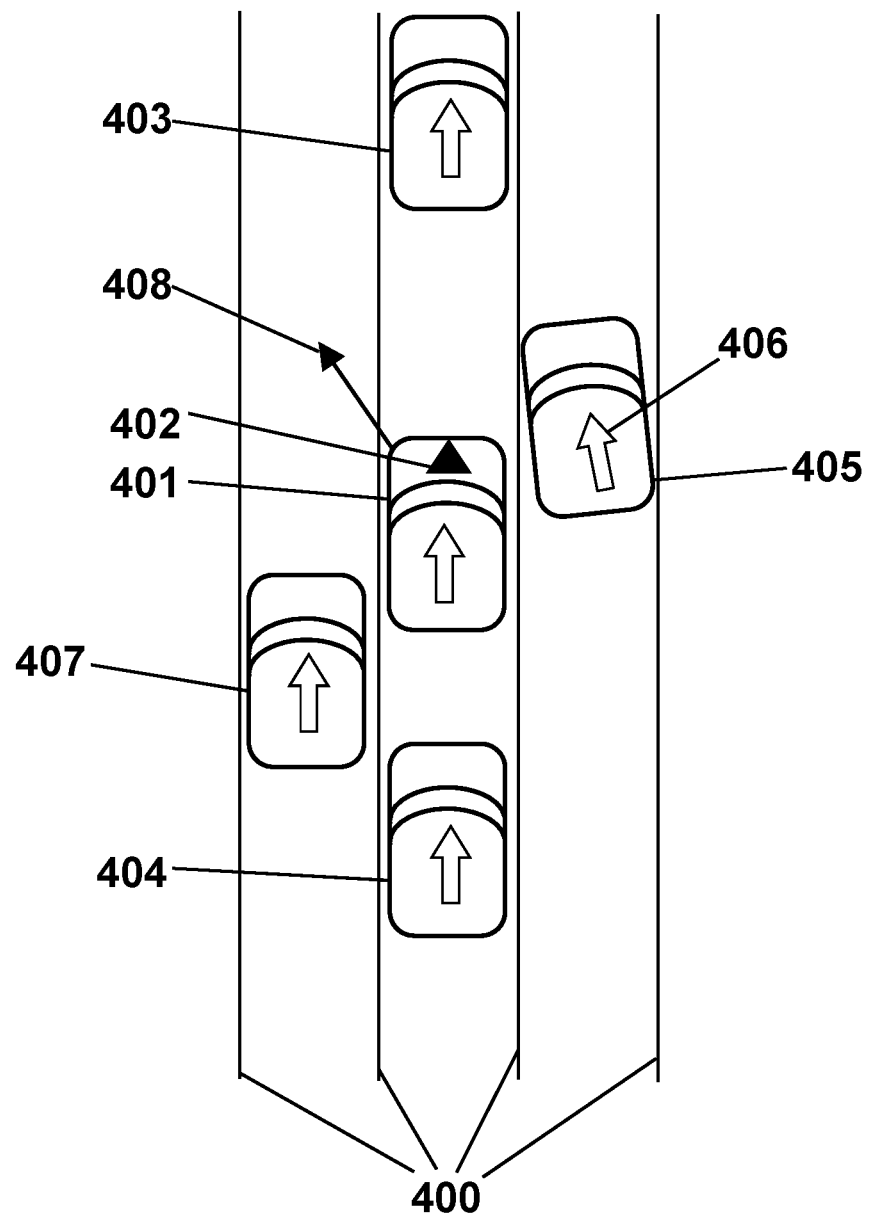
FIG. 4 is a sketch showing five cars on a multilane highway in which a side-encroachment collision is narrowly avoided by a system according to the present principles.

FIG. 4 shows how a side-encroachment collision may be avoided according to a system according to present principles. The figure shows traffic in three lanes of a multilane highway, each lane demarked by lane lines 400, each vehicle indicated by an icon, and all vehicles traveling in substantially the same direction, and with any lateral motions specifically indicated. The subject vehicle 401 includes an emergency response system 402 according to present principles, as indicated by a triangle. The leading vehicle 403 and the following vehicle 404 are in the same lane as the subject vehicle 401, while an encroaching vehicle 405 is in the lane to the right side of the subject vehicle 401, and an opposite vehicle 407 is in the lane to the left of the subject vehicle 401. The encroaching vehicle 405 is approaching the subject vehicle 401, as indicated by the arrow 406 which indicates the encroaching vehicle's velocity and direction. Responsively, the system 402 senses the encroaching vehicle 405, analyzes the encroaching vehicle's velocity 406, determines that a collision is imminent, analyzes the position of the following vehicle 404, and determines that a strategy of applying the brakes would cause a collision with the following vehicle 404 which is too close. Instead, the system 402 considers another strategy by analyzing the position of the opposite vehicle 407 along with the acceleration capabilities of the subject vehicle 401, and determines that the collision can be avoided by accelerating and steering simultaneously so as to enter the opposite lane without hitting the opposite vehicle 407. The system 402 then causes the acceleration means and steering means to carry out that strategy. The solid arrow 408 then indicates the subject vehicle's acceleration during this maneuver.

It is important to note that, generally, human drivers would not attempt such an acceleration-swerve maneuver because most human drivers cannot account for the positions and velocities and accelerations of the various vehicles quickly enough, nor control the maneuver precisely enough, to guarantee success. Most human drivers would simply hit the brakes to avoid being side-swiped by the encroaching vehicle 405. Most human drivers would not be able to tell visually that the following vehicle 404 is too close, and if they did know that, they still would not have time to figure out a better strategy. The system 402, on the other hand, operates much faster than the human mind since it includes a high-speed computing means, and further has the advantage of sensors that provide precise real-time data on the other vehicles' positions and velocities. In addition, the system 402 is able to control the acceleration means and steering means more precisely than any human driver could, since the system 402 includes electrical linkages (not shown) which may be controlled by feedback from on-board sensors (not shown). In summary, most human drivers would either slam on the brakes, leading to a collision with the following vehicle 104, or swerve to the left, leading to a collision with the opposite vehicle 407; however the system 402 successfully navigates a safe path and avoids all collisions with all the other vehicles.

FIG. 5A shows a similar scenario, with the encroaching vehicle 505 trending to the left as indicated by arrow 506, but now with the opposite vehicle 507 farther forward than in FIG. 4, thus preventing the subject vehicle 501 from accelerating to the left. Also, the subject vehicle 501 now contains a prior-art collision-avoidance system 512 shown as a hollow triangle. The prior-art system 512, like most prior-art collision-avoidance systems, would do exactly what a human driver would do, which is to apply the brakes and hope for the best. In this case that option is not very good. The resulting collision is sketched in FIG. 5B which shows the encroaching vehicle 505 colliding with the subject vehicle 501 as expected. Since the subject vehicle 501 has partially decelerated, the subject vehicle 501 strikes the encroaching vehicle 505 in the rear quarter of the encroaching vehicle 505. Such a collision often results in deep penetration of the passenger compartment of the encroaching vehicle 505, thereby causing grave injury to the passengers of the encroaching vehicle 505. In addition, the rear-quarter collision would likely cause the encroaching vehicle 505 to spin out, as indicated by the curved arrow 509, because the torque delivered to the encroaching vehicle 505 by the collision force would likely cause the rear wheels of the encroaching vehicle 505 to slip sideways, thus forcing the encroaching vehicle 505 to rotate counter-clockwise violently. A spin-out at freeway speeds is one of the most dangerous types of collisions. In such a spin-out, the encroaching vehicle 505 would likely proceed around to the left, dragging across the front of the subject vehicle 501, and then slam into the opposite vehicle 507. An instant later, the following vehicle 504 would then plow into the tangle of cars. Numerous serious injuries would likely result, especially for the occupants of the encroaching vehicle 505.

Figures 6A, 6B:
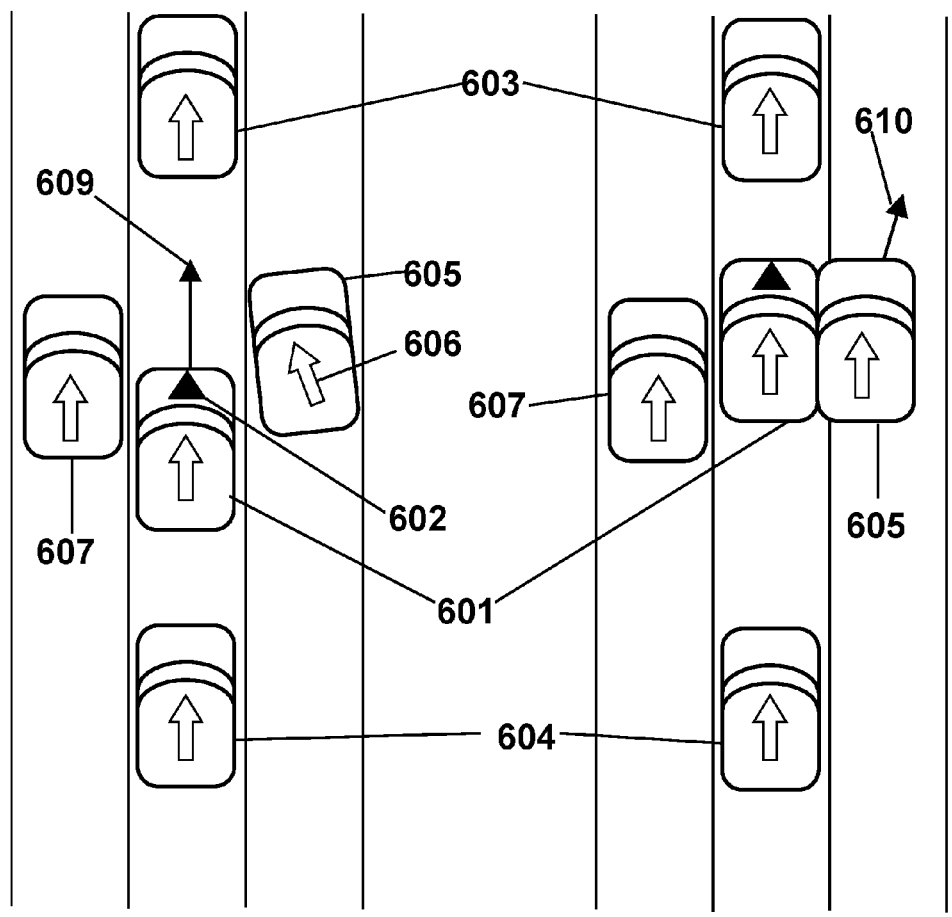
FIG. 6A is a sketch showing the same traffic arrangement as FIG. 5A, but now using a system according to present principles to devise an effective mitigation strategy.
FIG. 6B shows the resulting collision, which thankfully is a relatively mild fender-bender.

FIG. 6A shows the same initial scenario as FIG. 5A, with the opposite vehicle 607 still blocking the subject vehicle 601, and with the encroaching vehicle 605 rapidly closing in. But now in this case the subject vehicle 601 contains a system 602 according to present principles, which manages the collision much better. The system 602 quickly assesses the kinetics of the other vehicles, concludes that a collision is unavoidable, evaluates a wide range of mitigation strategies, and selects the mitigation strategy with the minimum estimated harm. In this case, the minimum-harm strategy is to accelerate forward, as indicated by the solid arrow 609, so as to move the subject vehicle 601 essentially even with the encroaching vehicle 605. This strategy accomplishes several desirable things. First, it makes the subject vehicle 601 more visible to the driver of the encroaching vehicle 605, which might prompt the encroaching driver to turn away and avoid the collision altogether. But here we assume that the encroaching driver still does not or cannot take evasive action, and so the collision proceeds as shown in FIG. 6B. As can be seen in FIG. 6B, and unlike the case of FIG. 5B, the collision now occurs at the front quarter of the encroaching vehicle 605, and then becomes spread out along the whole sides of the two vehicles. This is a softer and far less dangerous collision, because (a) the front-quarter collision would tend to straighten the encroaching vehicle 605, and (b) the collision is softer and spread out, thus limiting the peak acceleration, and (c) the collision forces would tend to bounce the encroaching vehicle 605 back into the right lane rather than across to the left. The arrow 610 shows the acceleration of the encroaching vehicle from such a collisional deflection. The encroaching vehicle 605 is thus deflected back toward the right lane and away from the other vehicles. The encroaching vehicle 605 is much less likely to go into a spin in this case because it has not received much torque from the flat collision; but if it did spin, it would tend to spin to the right and away from the other cars, probably ending up in the shoulder.

Another advantage of the selected strategy is that the collision is relatively soft, distributed across the whole side body of the encroaching and subject vehicles 605 and 601, rather than concentrated in one panel, and therefore the passenger compartments would tend to remain intact. Indeed, the side airbags might not even be triggered in this mild collision scenario.

Another advantage is that by accelerating, the subject vehicle 601 has opened up extra space for the following vehicle 604 to stop, thereby preventing a possible secondary collision with the following vehicle 604. No prior-art system, and probably no human drivers, would dare select a forward acceleration as the minimum-harm strategy in such a scenario. But with the aid of the system 602, an imminent collision that could have expanded into a very serious pileup was mitigated optimally, and indeed turned out to be just a minor fender-bender.

The system 602 may also apply indirect mitigation steps to further minimize the expected harm. For example, the system 602 may cause the subject vehicle brake lights (not shown) to be illuminated as soon as the collision became imminent, and then to keep the brake lights illuminated even while the subject vehicle 601 accelerated forward, even though the brakes were not applied at all during that time. The effect of the brake lights is to cause the following vehicle 604 to immediately slow down, which further helps avoid a collision with the subject vehicle 601.

The inventive system 602 may also cause other secondary mitigation actions such as sounding the horn. This would alert the opposite vehicle 607, possibly causing the opposite vehicle 607 to brake, which would open up valuable space around the colliding vehicles. The horn may also prompt the leading vehicle 603 to speed up and pull away from the collision site. Other vehicles farther back would also be alerted that something hazardous is occurring in the highway.

One concern with the scenario of FIG. 6B is that the collision may deflect the subject vehicle 601 to the left, which might cause the subject vehicle 601 to hit the opposite vehicle 607 or go into a spin or other loss of control. To avoid such an outcome, the system 602 includes means for analyzing the collision dynamically both before it occurs and while as the collision proceeds, adapting the strategy as needed. In this case, the system 602 may apply the right rear brake only, for a moment after the initial contact, to counteract any torque delivered to the subject vehicle 601 from the collision, thereby ensuring that the subject vehicle 601 exits the collision still traveling straight in the center lane. If however the collision resulted in a larger deflection or skid of the subject vehicle 601, the system 602 would detect the motion and would quickly devise a corrective strategy to bring the subject vehicle 601 back under the driver's control.

While it is not possible to pre-program specific responses to every hazard situation, the system is configured to explore a wide range of interventions, preferably starting with certain well-established maneuvers but adapting them to the current situation by varying all parameters to obtain optimal results in any unforeseen circumstance. The system uses multiple sensors to detect hazards sooner and more perceptively than any human driver could, and to quickly recognize when a collision is avoidable by use of competent computing power, and to develop a better harm-minimization strategy than any human could since the processor is unaffected by panic or fatigue or distraction or fear for its own life. In addition, if a novel strategy turns out well, the system may record the sequence of actions in a file, so that it can be added to the library of maneuvers that other vehicles could consider in similar situations. Likewise the system may record the steps of a strategy that failed to work as expected, so that on reanalysis the deficiency may be uncovered and corrected.

Although not shown in the figure, the system 602 includes means for informing the driver and occupants of the subject vehicle 601 that the collision is imminent. In this case the alerting system comprises eight sound generators with built-in light flashers, distributed around the ceiling of the subject vehicle 601, plus a computer-generated voice provided over the regular sound system. As soon as the collision became imminent, the vehicle sound system was interrupted, the right-side beeper and flasher were activated with a medium-frequency modulation indicating that the encroaching vehicle 605 was approaching from the right but still not too fast. Then as the system began implementing the harm-minimization strategy by taking over the acceleration, deceleration, and steering means of the subject vehicle 601, a haptic vibe device in the steering wheel informed the driver that the system had taken over control of the vehicle. Then, just before the collision, the sound system was turned back on with the message "Collision! Right now!". The driver and occupants would have a brief but sufficient moment to prepare for the impact, resist the strong lateral forces when they occur, and anticipate airbag deployment as expected. As a result, lives would be saved and injuries lessened in what otherwise would be a very serious accident.

Figure 7:
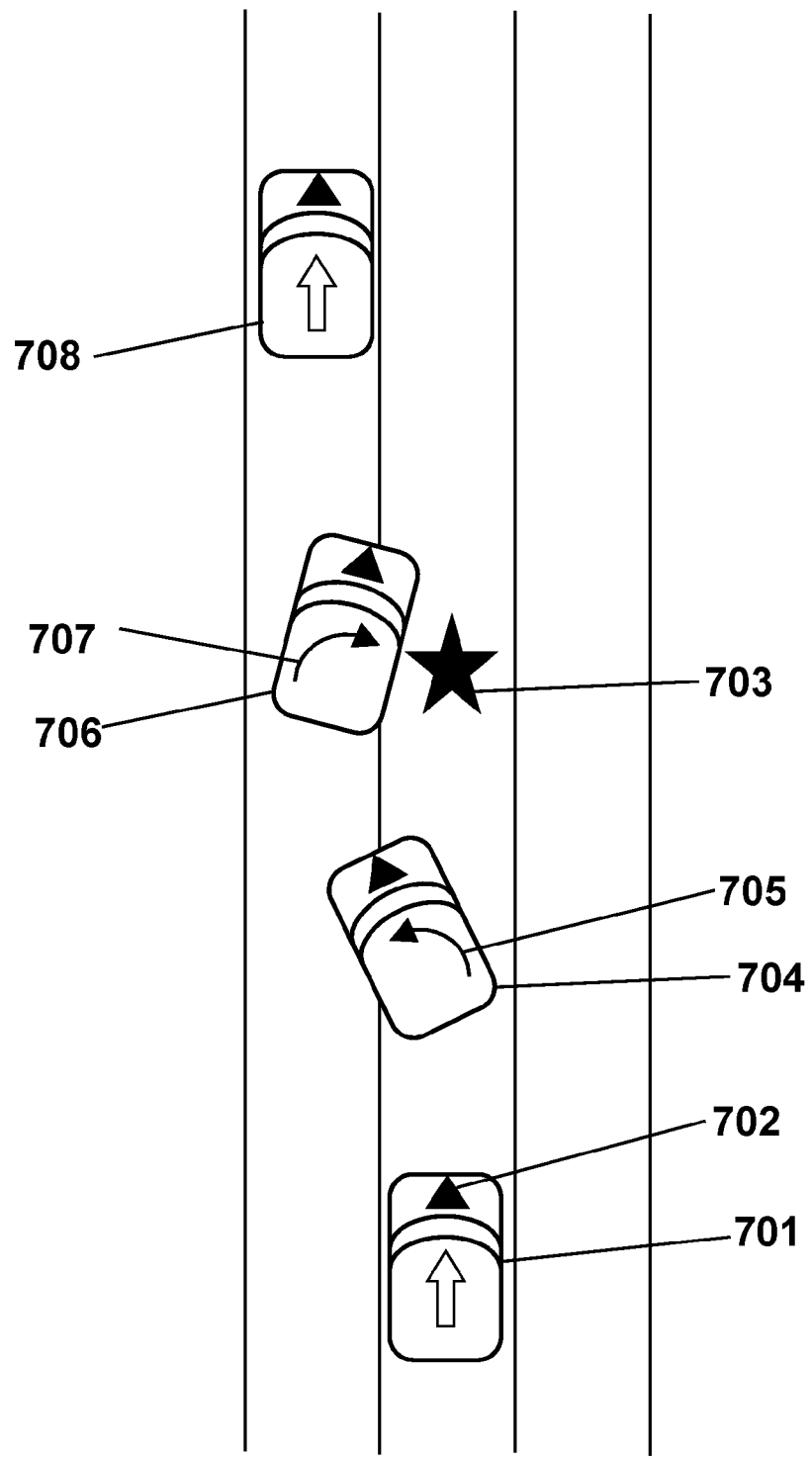
FIG. 7 is a sketch showing successive positions of a vehicle, demonstrating how a system according to the present principles avoids a highway hazard other than a vehicle collision, in this case by avoiding a pedestrian.

FIG. 7 shows an emergency situation not involving vehicle-vehicle collisions, but requiring automatic assistance nevertheless. Here the subject vehicle is indicated by icons 701, 704, 706, and 708 at successive moments. The system 702 according to present principles is indicated by a filled triangle. A pedestrian 703, or other obstacle, is indicated by a star. Due to fog or other issue, there is insufficient time for the driver of the subject vehicle 701 to steer away and avoid killing the pedestrian 703. The inventive system 702 detects the pedestrian 703, recognizes within one millisecond that maximal and immediate intervention is needed, with no time for warnings or other delays, and implements a strong avoidance strategy. The strategy begins by locking the left rear brake (not shown) and steering to the left so as to rotate the subject vehicle, now shown at position 704, and rotating as indicated by a curved arrow 705. Then, in order to slide the subject vehicle 704 to the left, the right front brake (not shown) is activated while the other brakes are released. Also, the throttle may be pulsed at this moment, thereby causing the rear wheels to lose traction, and thereby further enabling the vehicle to slide to the left. This causes the subject vehicle, now at position 706, to pivot around the front right corner, effectively rotating around the pedestrian 703 as indicated by arrow 707. The subject vehicle 706 barely misses the pedestrian 703, but is now in a high speed spin-out and is sliding leftward. To restore control, the system 702 again steers to the left while applying both rear brakes, but not the front brakes, until the front wheels again have traction. Finally the subject vehicle at position 708 is traveling straight, and the system 702 returns control back to the driver. Thus the system 702 recognizes a non-vehicle collision hazard, and implements an avoidance strategy, and saves a life using a maneuver that prior art systems and most human drivers would not be able to perform.

Figure 8:
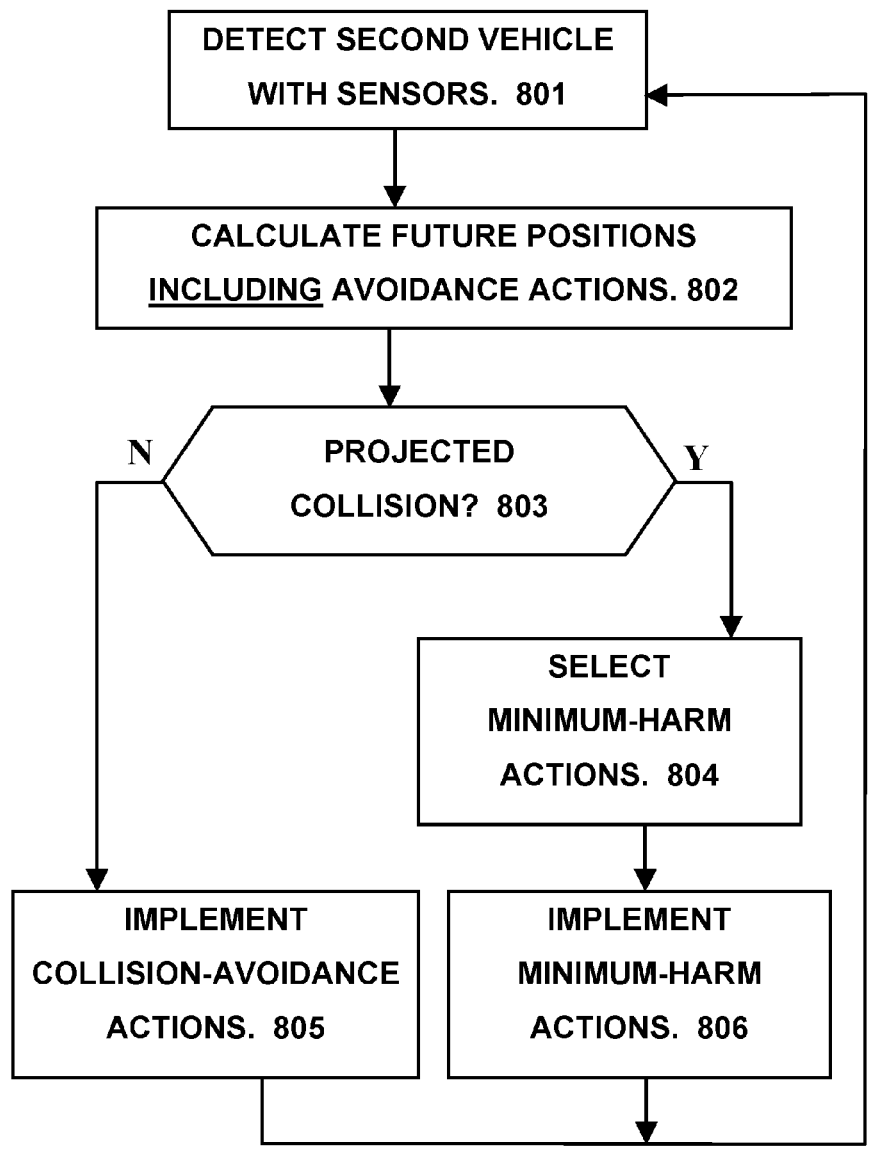
FIG. 8 is a flowchart showing how a possible collision with a second vehicle can be avoided or, if unavoidable, how the minimum-harm actions can be implemented.

Turning now to FIG. 8, a flowchart shows a method according to present principles, in minimal form. Using data from the external sensors, a second vehicle is detected (801). Future positions of the second vehicle are projected forward in time. Future positions of the subject vehicle are also projected forward in time, assuming that a specific collision-avoidance sequence of actions is implemented on the subject vehicle, thereby causing the subject vehicle to accelerate in various ways (802). If the vehicles are projected (803) to avoid a collision according the sequence of actions, then that sequence of actions is implemented as the "collision-avoidance actions" (805). If however the vehicles are projected to collide for every specified collision-avoidance sequence of actions, then a minimum-harm sequence of actions is selected (804), by choosing the already-analyzed sequence with the least predicted harm, and possibly by analyzing further sequences. Then, the selected "minimum-harm actions" are implemented (806). These steps are repeated as further sensor data becomes available, thereby adapting to the changing scenario in real time.

In most cases, in regular driving, the second vehicle is found not to be on a collision course with the subject vehicle, and therefore no collision-avoidance actions are needed. Preferably, then, the first sequence to be tested (802) is to simply do nothing (the "null sequence"). In that case there is no projected collision if the subject vehicle is driven according to the null sequence, and so the null sequence becomes the collision-avoidance sequence (805), with no further searching. The task is finished.

Of more interest is a case where the second vehicle is on a collision course with the subject vehicle. The null sequence would result in a collision, so evasive action is needed. Although not detailed in the flowchart, the method includes testing multiple sequences of actions comprising different types, magnitudes, durations, and timing of various accelerations of the subject vehicle. For each such sequence, the position of the subject vehicle is again projected forward in time to determine if the collision can be avoided thereby. If so, the successful sequence becomes the collision-avoidance sequence which is then implemented (805). If all of the sequences fail to avoid the collision, then a sequence that results in a collision with the least harm is selected as the minimum-harm sequence (804), and it is implemented (806).

Optionally, selection of the minimum-harm sequence (804) may include reanalyzing the various sequences considered during the collision-avoidance stage (802) as well as other sequences not previously analyzed, and calculating the harm expected based on the collision parameters (such as the relative velocities and point of contact of the two vehicles). This obtains the minimum-harm sequence of actions (804), but it takes extra time for the harm minimization projections and analyses (803). Alternatively, the system may store in memory the collision parameters that are derived for each sequence analyzed during the collision-avoidance analysis stage (802), so that these results can easily be recalled if they are needed to select the minimum-harm sequence (804). The stored collision parameters for each of the unsuccessful collision-avoidance sequences would be used to estimate the harm for that sequence, and the sequence with the least harm would be implemented (806). This is much faster than reconstructing the vehicle trajectories again if the collision turns out to be unavoidable, and may be useful in addition when like situations are encountered. As a further time-saving option, the harm associated with each of the sequences may be calculated during the collision-avoidance stage (802), and the estimated harm value may be stored along with the sequence. Then the least harm sequence may be selected (804) almost instantly when needed, by selecting the stored sequence that has the least harm. The collision analysis and harm calculations are preferably carried out using separate processors or separate cores of a processor, so as not to slow down the parallel tasks.

Figure 9:
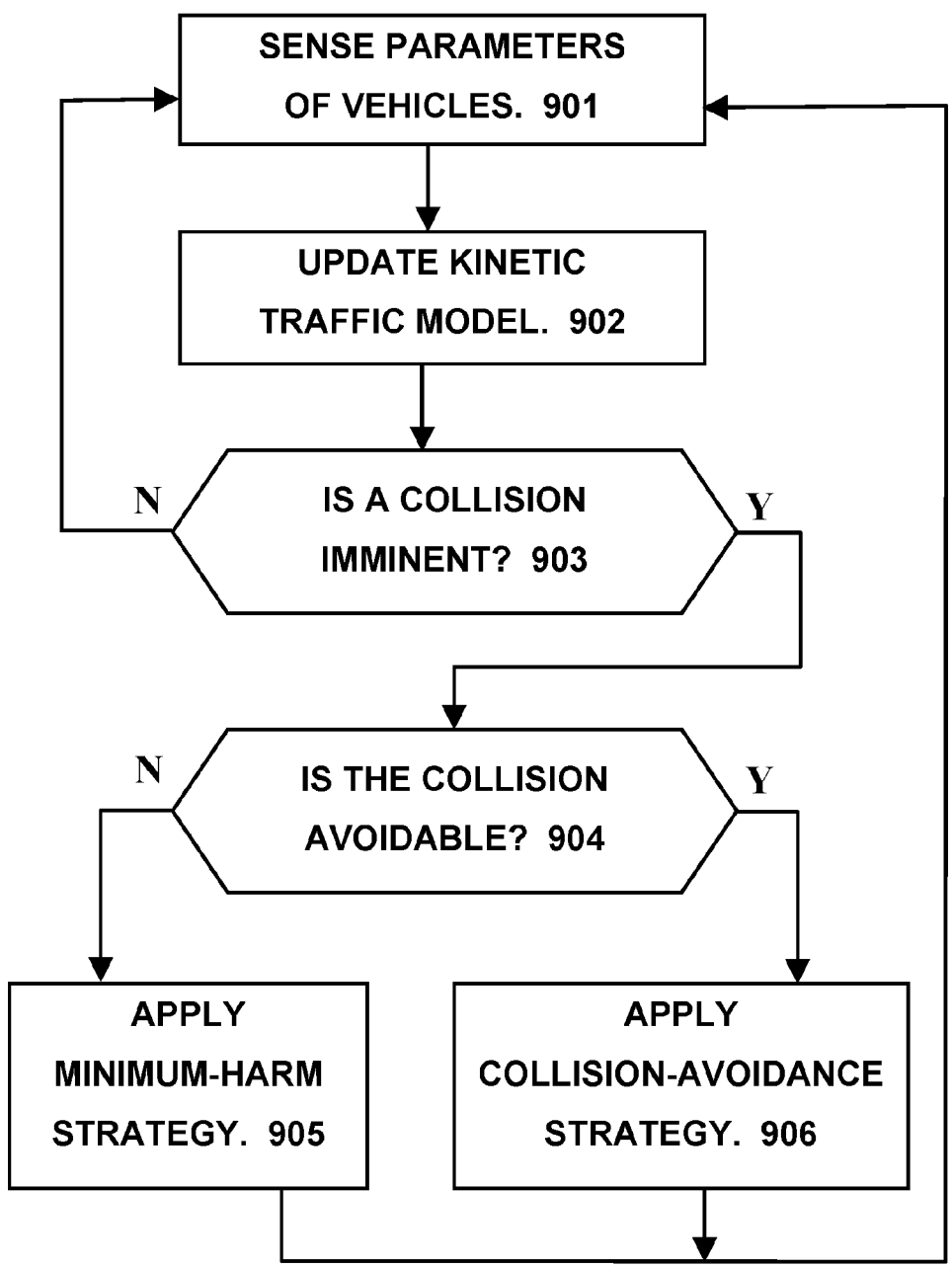
FIG. 9 is a flowchart showing the steps of a method according to the present principles including a step of explicit determination that a collision is imminent or avoidable or unavoidable.

FIG. 9 shows an alternative method according to present principles including specific determination that a possible collision is imminent and is either avoidable or unavoidable. First, the velocity and position and other parameters of the other vehicles are measured by the external sensors (901). Then data from the sensors is used to update (902) a predictive kinetic traffic model that tracks the positions of the other vehicles. The model then projects the vehicle positions forward in time and determines (903), within certain preprogrammed assumptions, whether a collision is imminent. If so, the model then determines (904) if the collision is avoidable. If so, then a collision-avoidance strategy is selected and implemented (906), for example by positively accelerating or decelerating. But if the collision is not avoidable, then a minimum-harm strategy is selected to minimize loss of life or injury, and secondarily to reduce the damage of the collision (905). While the scenario is ongoing, all the steps in the flowchart are continuously repeated, thereby enabling the kinetic model to be updated and the strategy to be revised according to the new sensor data. Any change in the avoidability of the collision or anything else in the scenario, would automatically result in a revision of the strategy.

The inventive method further includes calculating the expected harm of an imminent collision, thereby enabling selection of the best mitigation strategy. The harm may be calculated by assigning values to various consequences, multiplying by the likelihood, and adding them up for each mitigation strategy. For example, a predicted death may be assigned a value V1 such as 1,000,000 points, a crippling injury a smaller but still substantial value V2 such as 100,000 points, a non-crippling injury would be V3 such as 10,000 points, and so forth for other personal harms. The model could use the actual number of people in the subject vehicle as determined by seat-loading or seatbelt monitors which most cars already have, and the occupation of the other cars may be estimated as 1.5 per vehicle for example. The estimated number of occupants may be modified by a determination of the character of the other vehicle, for example a truck vs. a minivan. In addition, the expected damage may be estimated as a dollar figure or other value, for each vehicle involved in the collision, which would be a function of the relative velocities of the vehicles primarily. Then the total harm may be calculated by multiplying V1 times the number of deaths times the probability, plus V2 times the number of crippling injuries times that probability, and so forth, finally adding the vehicle damages at the end. The predictive model could test various mitigation strategies by calculating the overall harm for each strategy in this way, and select the strategy with the least expected harm. Alternatively, if at least one fatality is predicted, then the calculation may drop the property damage term entirely since it would be improper to allow damage concerns to modify, even slightly, a life-saving endeavor.

As an alternative, the method could comprise detecting a second vehicle, then preparing an avoidance strategy comprising a sequence of actions to avoid a collision with the second vehicle, but without ever explicitly calculating the imminency or avoidability of the collision. Normally, the first avoidance sequence tested would be to simply do nothing (the null sequence), and in most cases the vehicles would pass harmlessly by each other. In that case the avoidance sequence is the null sequence and the task is done. If however the null sequence fails to avoid a collision, then a wider range of sequences would be explored, and if one of them avoids the collision, that sequence is selected as the avoidance sequence. And, if none of them is able to avoid the collision, then the collision is unavoidable, and a harm-minimization sequence is selected instead.

Further variations of the collision-avoidance sequences may be tested in the same way, continuing until an unavoidability criterion is met. The unavoidability criterion may be that a predetermined time has expired, or until a certain number of sequences or acceleration parameters have been tested, or other criterion. Then, if multiple sequences are successful in avoiding the collision, the best one may be selected, for example the sequence involving the least amount of acceleration necessary to avoid the collision.

However if none of those sequences avoids the collision, then the collision is unavoidable and the harm-minimization stage would begin.

In similar fashion, the sequences considered for minimizing the harm of the unavoidable collision may be analyzed until another criterion is met, which may be termed a "time-is-up criterion". The time-is-up criterion may be a time limit, or a time to impact, or a number of sequences explored, or other criterion. When the time-is-up criterion is met, whichever sequence has the least expected harm would be implemented.

As a further option, the system could record in memory the collision details predicted for each avoidance sequence that failed to avoid the collision. The stored data would include the relative velocity, point of contact, and other collision information associated with each sequence. If the collision turns out to be avoidable, this data may be discarded. But if it is unavoidable, the system can rapidly evaluate the harm caused by each of those collisions, without having to reconstruct each collision scenario all over again. Thus the projected collision data from the various collision-avoidance sequences would help the system to rapidly select the least-harm sequence of actions.

As a further time-saving measure, the harm associated with each unsuccessful avoidance sequence may be calculated using a second core of a multi-core processor, even as another avoidance sequence is being developed. If and when the system concludes that the collision is unavoidable, the least-harm sequence would be available instantaneously. The system would not have to wait for the harm-minimization analysis since it would already be done. As a further option, the best harm-minimization sequence obtained to date may be implemented as soon as it is analyzed, while further avoidance sequences continue to be explored in parallel. Then, if a new sequence is subsequently discovered that could avoid the collision, the system could switch to it immediately.

Figure 10:
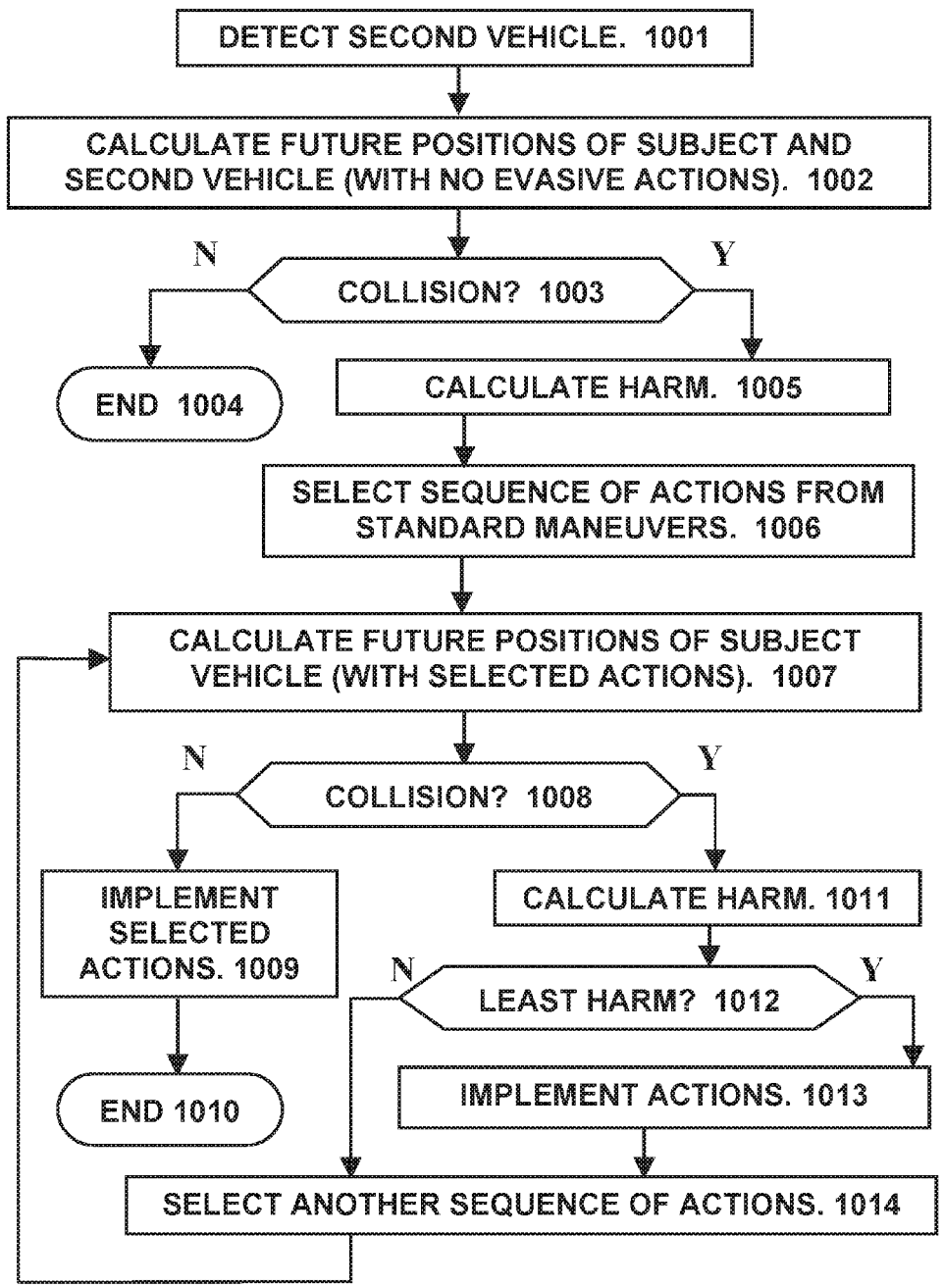
FIG. 10 is a flowchart showing the steps of a method according to the present principles in which the collision avoidance and harm minimization proceed concurrently.

FIG. 10 shows a flowchart of a method according to present principles wherein the collision avoidance and harm minimization calculations proceed concurrently. As soon as a second vehicle is detected with sensor data (1001), the future positions of the subject vehicle and the second vehicle are calculated (1002), initially assuming no evasive actions are taken. Then, in interrogator 1003, a collision is detected if the trajectories intersect. If there is no collision, the process ends (1004) with no further actions. But if a collision is projected to occur at interrogator 1003, then the harm of the collision is calculated (1005), and a set of sequential actions is selected (1006) from standard maneuvers already known. The future positions of the subject vehicle are then re-calculated (1007) assuming the selected actions are applied to the subject vehicle. In interrogator 1008 a collision is again tested for, and if the sequence avoids the collision (that is, if there is no projected collision when the selected actions are applied to the subject vehicle), then the selected actions are implemented (1009) and the process ends (1010) with the collision being avoided. But if the collision is still projected to occur (the sequence fails to avoid the collision), then the harm is calculated (1011) of the collision as it would transpire assuming that the subject vehicle is accelerated according to the selected sequence. In interrogator 1012, the harm is compared to the harm of the other sequences. If the selected sequence produces the least harm, it is then implemented (1013). Then another sequence is tested (1014), for example by varying parameters of one of the standard maneuvers, or by varying a parameter in the selected sequence, or by starting over with a different unrelated sequence of actions. The trajectory is again re-calculated (1007) and the resulting projected collision analyzed (1008) for avoidability and expected harm, and continuing likewise in a loop. The loop continues for both outcomes of interrogator 1012, the intent being to keep searching for a sequence of actions that avoids the collision, or at least a sequence that minimizes the harm of the collision, even while an intervention is in progress. As soon as a better sequence is found, the method of FIG. 10 automatically switches to it.

Figure 11:
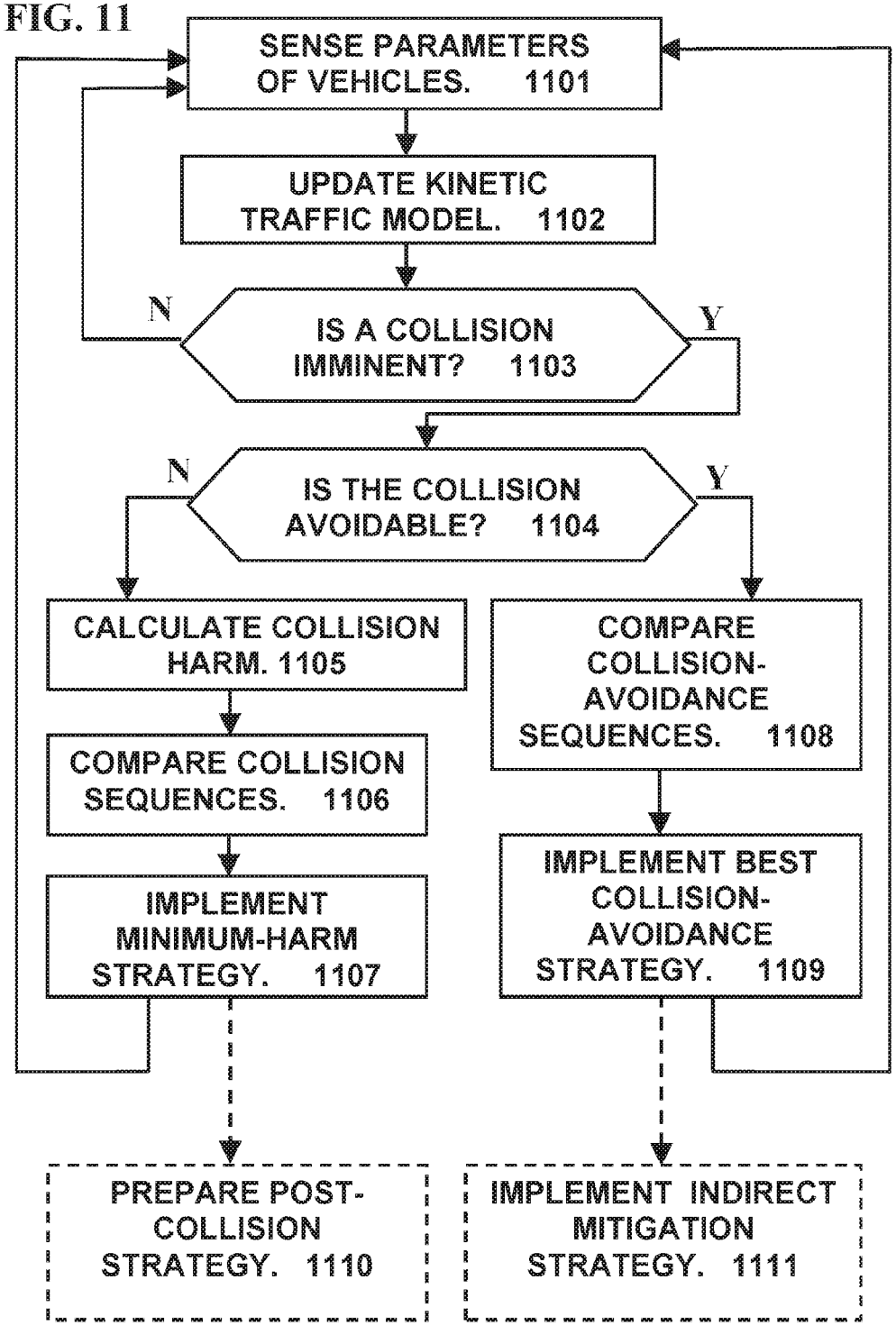
FIG. 11 a flowchart showing the steps of a method according to the present principles including calculation steps, post-collision intervention, and indirect mitigation steps.

FIG. 11 shows a more nuanced flowchart of a method according to present principles, including calculation steps, post-collision strategy, and indirect mitigation. First, (1101) the velocity and position and other parameters of the leading and following and other vehicles are measured by sensors. Then (1102) data from the sensors is used to update a predictive kinetic traffic model that tracks the positions of the vehicles. The kinetic model then projects the vehicle positions forward in time and determines, within certain preprogrammed assumptions, whether a collision is imminent (1103). If so, the kinetic model then (1104) determines if the collision is avoidable. If so, then a collision-avoidance strategy is selected (1108) and implemented (1109), for example by steering or decelerating or otherwise accelerating. But if the collision is not avoidable, then the dynamic collision model is invoked (1105) using as input the trajectory and relative velocity results of the kinetic model. The dynamic collision model then analyzes the collisions according to a large number of possible acceleration-deceleration-steering sequences, calculating the expected harm of each (1106). Then, (1107) a minimum-harm strategy is selected to minimize loss of life or injury, and also to reduce the damage of the collision. While the collision is ongoing, this cycle is repeated and the model is updated and the strategy is revised according to the new sensor data, and any change in the avoidability of the collision or anything else in the scenario, would automatically result in a revision of the strategy accordingly. Optionally, a post-collision strategy is also prepared (1110) to enable further actions after the collision has occurred, and to minimize any further damage or injury, for example by maneuvering to avoid a domino pileup. Also optionally, a series of indirect mitigation actions are implemented (1111) such as strategically flashing the brake lights.

Figure 12:
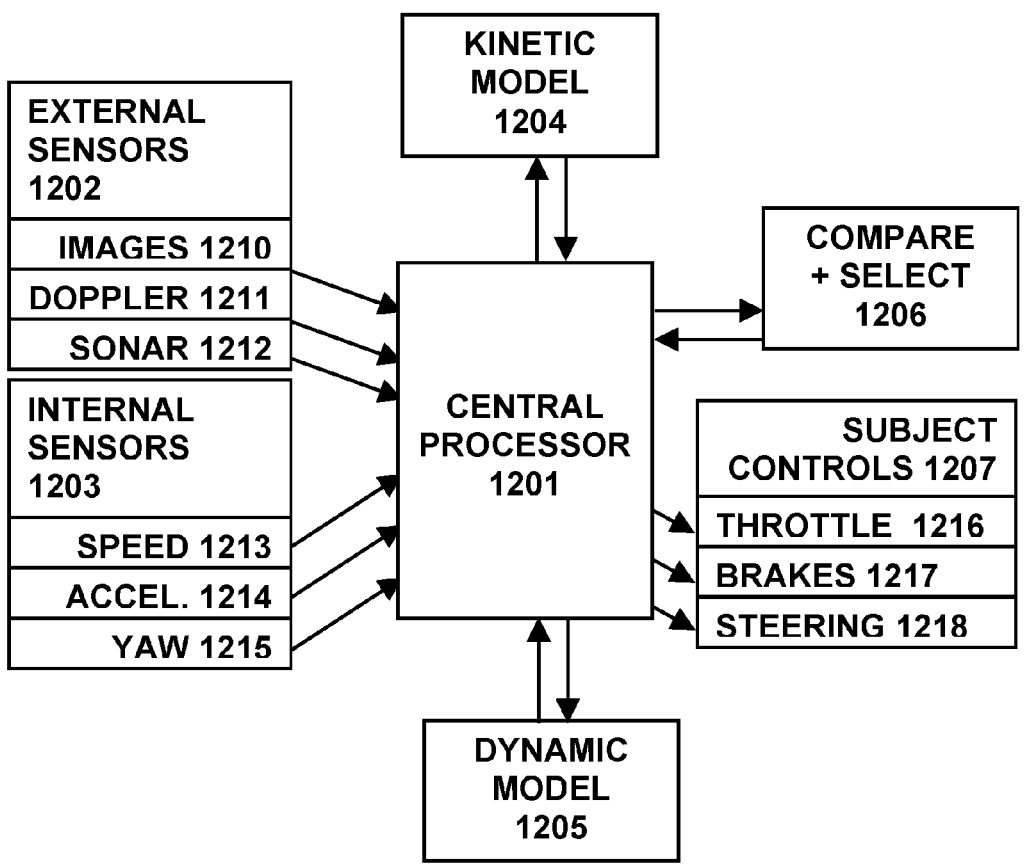
FIG. 12 is a schematic of a system according to the present principles wherein the computing means is a central processor which processes all the sensor data, performs all the analyses, and directly generates the vehicle control signals.

Turning to FIG. 12, a schematic shows the layout of an embodiment of a system according to present principles, wherein a single multi-purpose computing means performs all of the data processing and analysis functions with a single computing device 1201 (preferably a fast multi-core device), typically using several separate software routines to perform the various computing tasks. Here the computing means 1201 is labeled "central processor". Data from the external sensors 1202, comprising image data 1210, Doppler signal data 1211, and sonar data 1212, are delivered to the central processor 1201, presumably by coaxial cables or optical cables or well-shielded high speed parallel busses (not shown but indicated by various arrows). Wireless communications may also be employed. Likewise realtime data from the internal sensors 1203 includes data on the speed 1213, acceleration 1214 (positive as well as negative), and yaw 1215 or direction changes of the subject vehicle, which are delivered to the central processor 1201. The central processor 1201 analyzes all this data in parallel, thereby deducing the positions and velocities and accelerations of the other vehicles, and their separation distances from the subject vehicle.

The central processor 1201 simultaneously runs the kinetic model 1204 which takes the vehicle position-velocity-acceleration data and projects future vehicle positions, including any changes in the subject vehicle velocity or direction, and projects the future separation distances between the subject vehicle and each of the other vehicles. The central processor 1201 reviews the kinetic model results and detects if and when collisions are likely to occur. The central processor then runs the dynamic collision model 1205 using these results, thereby calculating the expected harm. The central processor 1201 then performs comparisons 1206 to select the best sequence of accelerations for collision avoidance or harm minimization, depending on whether the collision is avoidable or not. The central processor 1201 then prepares an appropriate strategy to implement that sequence, generates control signals, and sends the control signals to the subject vehicle controls 1207 including the throttle 1216, brakes 1217, and steering 1218. Although the figure shows the kinetic 1204 and dynamic 1205 models and the compare-select 1206 tasks as extended from the central processor 1201 for clarity, in this example they are all performed within the central processor 1201 as parallel computing tasks.

Although the arrangement is quite demanding of the central processor 1201, current processors are capable of performing as required. Future computing means are expected to greatly surpass current devices, and cost less, so the arrangement is expected to become even more attractive in the future.

Figure 13:
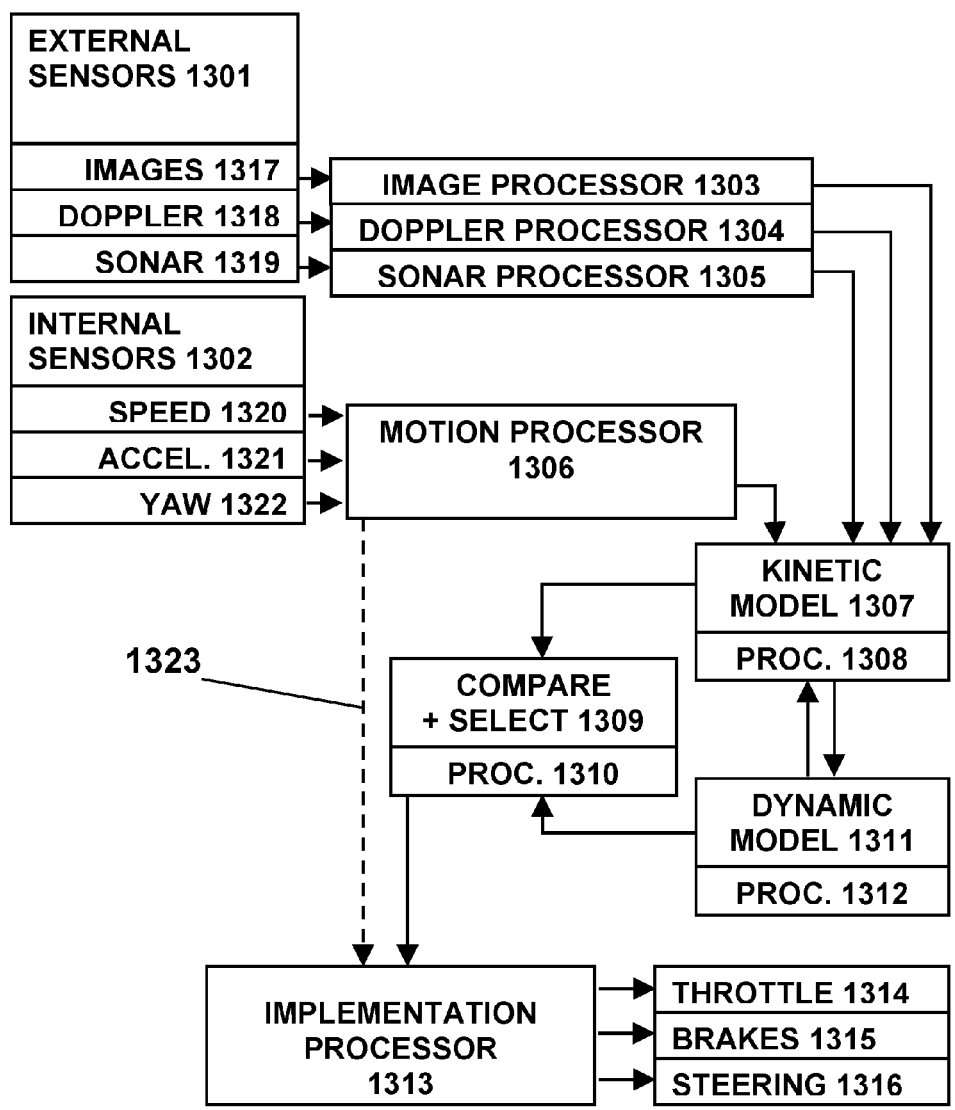
FIG. 13 is a schematic of a system according to the present principles wherein distributed separate processors perform image analysis, calculations, strategy implementation, and other tasks.

FIG. 13 shows an alternative system layout with a large number of separate processors or processor components, specialized for each computing task, and interconnected by data lines such as serial ports. There is no central processor, although it would be easy to incorporate one to keep track of the other processors or to act as a human interface for example. In the arrangement of FIG. 13, data are provided by external sensors 1301 and internal sensors 1302. Image data 1317 are analyzed continuously by a dedicated image processor 1303, and Doppler data 1318 is analyzed by a Doppler processor 1304, and sonar data 1319 is analyzed by a sonar processor 1305. These processors perform the initial analysis and data reduction, thereby generating just a minimal amount of processed data comprising for example the directions and velocities of the observed vehicles, and little else. That processed data stream is easily conveyed by a serial port with shielded twisted pair or other low-cost technology. Likewise the internal sensor data 1302, from speed sensors 1320, acceleration sensors 1321, and direction sensors 1322, is analyzed by a single vehicle-motion processor 1306, thereby generating a minimal processed data stream output.

The distributed layout of FIG. 13 includes a kinetic model 1307 which is running on a dedicated processor or processor component ("Proc.") 1308, and a dynamic collision model 1311 running on its dedicated processor 1312. In the figure, these items are shown as connected boxes. Processed sensor data goes to the kinetic model processor 1308, which analyzes vehicle trajectories forward in time and then passes the results to a select-and-compare module 1309 with its dedicated processor 1310, and also passes the results to the dynamic model's processor 1312.

The select-and-compare processor 1310 then determines if a collision is imminent, avoidable, and unavoidable. If unavoidable, the select-and-compare processor 1310 then compares the estimated harm from the dynamic model 1311. In either case, the select-and-compare processor 1310 selects the best sequence and informs an implementation processor 1313, which translates the sequence into a strategy including control signals and indirect mitigation steps. The implementation processor 1313 then sends control signals to the vehicle throttle 1314, brakes 1315, and steering 1316 to cause the vehicle to move in accordance with the selected sequence of accelerations, decelerations, and steering.

The figure also shows feedback signals 1323 (dashed arrow) from the vehicle motion processor 1306 to the implementation processor 1313. Whenever the actual measured motion deviates from the motion called for in the selected sequence, the implementation processor 1313 detects this deviation using the sensor data and sends the feedback signals 1323 to the implementation processor 1313, thereby adjusting the control signals to correct the vehicle motion. Such feedback from the internal sensors 1302 to the vehicle control system 1314, 1315, and 1316 ensures that the vehicle actually performs the motions which are specified in the selected sequence, and performs them quite precisely. With the feedback 1323, the implementation processor 1313 instantly corrects any unforeseen problems arising while the strategy is being carried out. The feedback 1323 also ensures that the vehicle control can follow the strategy precisely even after a collision and even when some of the vehicle properties have changed, as long as the internal velocity, direction, and acceleration sensors 1320, 1322, and 1321 are still operational. Although there is no way to know ahead of time if the brakes 1315, for example, have been compromised by the collision, the implementation processor 1313 in cooperation with the motion processor 1306 uses the feedback 1323 to adjust the vehicle controls 1314, 1315, and 1316 in real time to compensate for any such changes. In this way the system according to present principles does everything possible to keep the vehicle on track with the selected mitigation strategy throughout the collision event and thereafter.

The various processors in the distributed computing layout of FIG. 13 are preferably all different, since they perform very different functions. The motion processor 1306, for example, could probably be an inexpensive microcontroller, which may already come with a 3-dimensional accelerometer 1321 built-in, as well as voltage comparators, programmable logic, and a serial port, all for mere pennies typically. The image processor 1303, on the other hand, may be a custom ASIC or fast GPU capable of analyzing fast-frame image data 1317 to extract vehicle features in real time. The kinetic model processor 1308, dynamic model processor 1312, and compare-and-select processor 1310 probably are included in a single multi-core CPU since there is no reason to separate them, and any decent unit can run all three simultaneously. The implementation processor 1313 is more difficult to specify because the control signals will depend on the vehicle properties, and it will probably have to generate different output voltages than the other processors. Nevertheless, numerous custom and general purpose controller modules, plus a few microcontrollers, would be potentially capable of producing the needed signals. Developers will have to adapt the implementation processor 1313 to each type of vehicle, using design engineering well known in the art.

Figure 14:
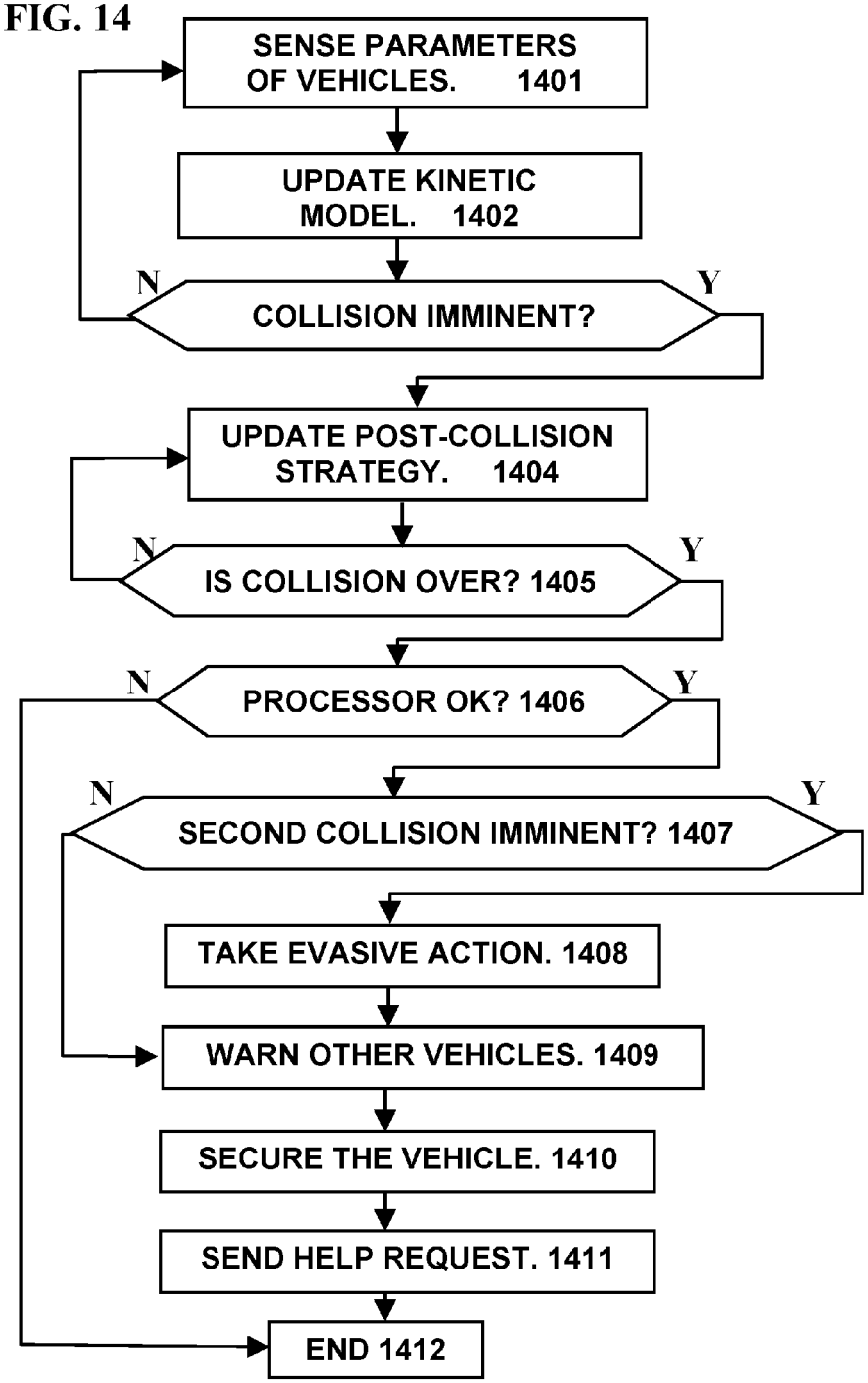
FIG. 14 is a flowchart showing the steps of a post-collision strategy according to present principles.

Turning now to FIG. 14, a flowchart shows the steps of a post-collision mitigation method according to present principles. In box 1401, the internal and external sensors measure the condition of the subject vehicle and sense the positions and velocities of other vehicles, generating data and sending it to the computing means for analysis.

In box 1402, the computing means uses the sensor data to update the kinetic traffic model, and detects when a collision is imminent. If there is no current hazard at interrogator 1403, the process returns to box 1401. But if a collision is imminent, the processor prepares (or updates) a post-collision strategy in box 1404, while also predicting the type of collision that is imminent. The computing means continues to update the kinetic model 1402 during the collision.

When the collision is over (1405), the computing means first does a self-check (1406) if it is able. In the version shown, the computing means terminates its activity (1412) if it fails the self-check. In other versions, the processor may attempt to secure the vehicle by turning off the fuel pump and unlocking the doors.

If the computing means is still operational, and assuming the sensors are also still operational, the system checks the recent sensor data to see if there is oncoming traffic and if a second collision is imminent (1407). If the sensors are not operational, the processor may use pre-collision traffic data to predict if a secondary collision is likely. If so, it initiates the planned evasive action (1408) such as proceeding to the side of the road. If a secondary collision is not imminent, the flow proceeds to box 1409, warning other vehicles of the danger, for example by flashing lights and sounding the horn. Also at this point, or earlier in the sequence, the system interrogates the internal fire-detection sensors, if any, and issues an urgent alarm if fire is detected.

The computing means then takes steps to secure the subject vehicle (1410), for example by turning off the ignition, setting the parking brake, unlocking the doors, rolling down the windows.

A difficult situation may arise when multiple threats are detected at the same time, such as a fire threat and an imminent second collision. In that case, the computing means would implement evasive action first, but would select as brief an evasion as possible, and then immediately stop and evacuate the occupants without taking the extra time to drive to the side of the road or anything else. The step of warning other vehicles 1409 and all other actions would be delayed until after the fire alarm step, but would proceed thereafter.

Then, after the immediate life-saving actions are completed, the system then proceeds to transmit a help request message (1411), assuming it had not already done so when the collision became imminent.

After that, the process would terminate (1412). Alternatively, any further steps may be added in various implementations of the invention.

Although not shown in the figure, the computing means may monitor the internal sensors to ascertain the driver's responsiveness after the collision, for example using the internal sensors to see if the driver uses the steering or brake or accelerator. In this version, the system would relinquish complete control to the driver as soon as the driver takes any such action. This choice is preferable if the state of technology is not yet able to predict the chaotic aftermath of a multicar collision. Thus if the driver is still able to take control, the system will let the driver do so. However, if the driver takes no action at all after the collision, then the system would assume that the driver is incapacitated, and would proceed with the post-collision strategy as planned. In this way a system according to present principles would do everything possible to save the occupants, whatever happens.

Figure 15:
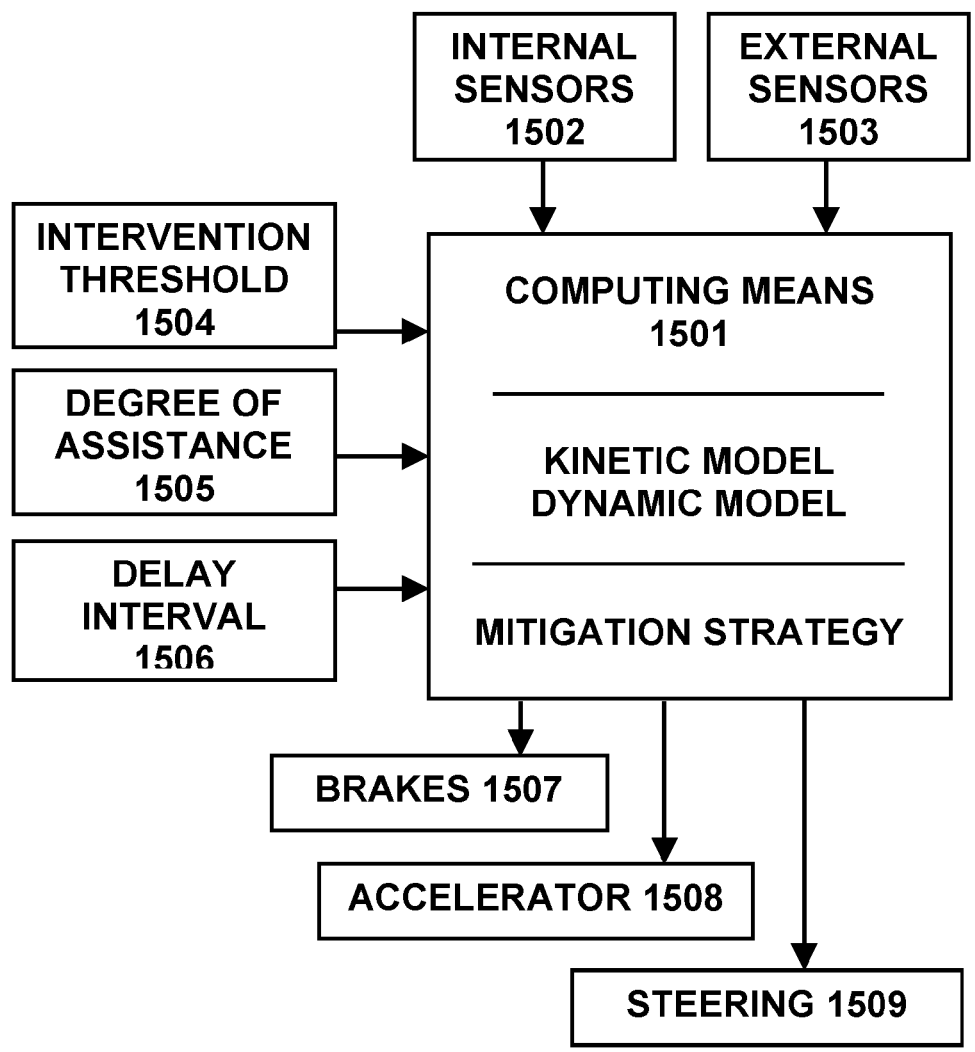
FIG. 15 is a schematic of an adjustment means according to the present principles with three operational modes.

FIG. 15 is a schematic of a system according to present principles, including adjustment means. The schematic is centered on computing means 1501 which maintains a kinetic traffic model and a dynamic collision model, evaluates emerging threats, and selects a mitigation strategy to avoid or minimize any collision. The computing means 1501 takes as input, data from the internal 1502 and external 1503 sensors. The computing means 1501 also takes as input the user-selected settings of the adjustment means, which in this case includes three different adjustment means. A first adjustment means is a stop-position slider which the driver can set from a high threshold position labeled "Max Hazard" down to a low threshold labeled "Min Hazard" to control the intervention threshold 1504. In the high position, the processor activates the brakes and other devices only when the collision hazard has risen to a high level of certainty or severity, and takes no action if the hazard level is low. In the low-hazard position, the processor intervenes under both minor and major emergency situations.

The second adjustment means is a set of radio-buttons on a display screen, by which the driver can select a high or low degree of assistance 1505 from the automatic system. The setting is used by the processor to adjust how much pressure to apply to the brakes or other controls, in opposition to the driver's actions; that is, how much to allow the automatic system to override the driver's actions. For example if the processor decides that the collision can be avoided by steering 20 degrees to the left, while the driver is turning the steering wheel 30 degrees to the left, then the amount of steering delivered to the wheels would be a compromise depending on the degree of assistance setting. With a low setting, the vehicle would be steered according to the driver's intent of 30 degrees, while a high setting would give precedence to the automatic system and steer at 20 degrees. A midrange setting would correspond to an average of the two inputs, resulting in a 25 degree steering outcome.

A third adjustment means is a thumbwheel labeled in milliseconds of delay which determines a delay interval 1506. For example, by setting the delay interval 1506 to 500 milliseconds, the processor will wait for that time after detecting a hazard before taking any action. Then, if the hazard is still present, the processor will actuate the brakes and steering and accelerator according to the mitigation strategy.

The three adjustments are interrelated. The delay interval 1506 begins when the threat level exceeds the intervention threshold 1504. Then, when the delay interval 1506 expires, the system provides only that amount of intervention permitted by the selected degree of assistance 1505. All three adjustable parameters are set by the driver in the version shown. In this way each driver can choose the type and amount of assistance desired, based on the driver's assessment of the reliability of the automatic system and the driver's own skill level.

If the driver is a beginner or someone with limited judgment, but otherwise an adequate driver, then the invention may include means for constraining one or more of the adjustments, such as limiting the range of the adjustment. For example, the parents of a teenage driver may limit the range of the delay interval adjustment 1506 to no more than 100 milliseconds (in recognition of the great reflexes of a teenager) but also limit the intervention threshold 1504 to no lower than a midrange position (since the young driver tends to underestimate the hazard potential in a variety of situations).

FIG. 16 is a table showing the sequence of actions to avoid a collision. In this scenario, the leading vehicle has slowed down or its brake lights are illuminated, yet the following vehicle is accelerating and unaware of the growing hazard. In analyzing options, the system notes that the left lane is blocked by a large truck, and the right lane is blocked by a car (the "right-side car"), however there is ample space in the right lane behind the right-side car if the subject vehicle can get there. The system first consults the "often used" maneuvers for this type of hazard, and finds a maneuver to change lanes while avoiding traffic there. With the kinetic model, the system varies and adjusts a sequence of accelerations to enable a quick lane change, and adds indirect mitigation steps. A harm-minimization strategy is not prepared because the kinetic model indicated that the strategy of FIG. 16 would succeed in avoiding a collision.

As listed in the figure, the steps of the strategy are first to, essentially simultaneously, (1a) illuminate the brake lights of the subject vehicle to alert the following driver and hopefully prompt the following driver to stop gaining on the subject vehicle, (1b) apply braking at the maximum level consistent with the vehicle capability-data, and (1c) inform the subject vehicle driver that an emergency intervention has begun, perhaps with a computer-spoken message or other signal. The horn is not sounded because doing so might cause the right-side car driver to slow down in response, which is exactly not what is wanted at that time. Instead, the external sensors continue to monitor the position of the right-side car while the subject vehicle rapidly decelerates, and as soon as the subject vehicle is sufficiently behind the right-side car, (2a) the brakes are released for best steering control, and (2b) the subject vehicle is steered to the right at 20 degrees.

As soon as the subject vehicle has fully entered the right lane, the strategy continues to (3a) steer left at 20 degrees, thereby executing an "S-turn" into the lane, and (3b) apply the brakes but not too hard, just to straighten out in the lane and also open up some space between the subject vehicle and the right-side car. Then, when the subject vehicle has become straightened in the lane, (4a) the brakes are fully released, (4b) the subject vehicle steering is adjusted for lane centering, (4c) the brake lights are turned off, and (4d) the subject vehicle driver is informed that the intervention is complete and the driver may resume control. However, the system continues to drive the subject vehicle, straight and steady, until the driver takes an action such as tapping the accelerator, thereby indicating to the system that the driver is ready to take over. At that point the system (5a) stops controlling the vehicle and resumes monitoring traffic for future hazards.

FIG. 17 is a table showing a variety of adjustment means according to present principles, and exemplary settings associated with each adjustment means. For example the adjustment means may be a toggle switch, in which case there are usually just two settings: toggle up and toggle down. However, some toggle switches have three positions, and thus three settings.

The adjustment means may be a knob which may be turned, may have click-stop positions or may be continuously adjustable, may be a single-turn or multi-turn knob, may control a parameter in a linear or logarithmic or other relationship, and may have further features such as pull-to-turn or push-to-set for example. The exemplary settings may be fully clockwise, corresponding to a maximum value for the parameter that the adjustment means control; or fully counter-clockwise for a minimum value, or half-way around for an intermediate value.

A simple adjustment means may be a pair of buttons. Perhaps the buttons turn a feature on and off, the first button causing the feature to be turned on and the second button to turn it off. Alternatively, a parameter may have a wide range of values such that the first button increases the value while the second button decreases the value.

A slider adjustment provides continuous settings or click-stop settings depending on its construction. The slider may select how long the system waits after detecting an imminent collision, before applying an intervention. For example the slider may be set full-left, thereby causing the system to intervene with zero delay; or full-right, for a delayed intervention of, say, 3 seconds; or an intermediate position to select a pre-set time delay preferred by the driver.

The adjustment means may be a voice-controlled selector which the driver adjusts by speaking. Probably the driver has to say particular words that the system understands. For example the driver could say "increase level" to increase a particular setting such as a threshold for detecting an imminent collision, or "decrease level" to lower that threshold. Developers employing the present principles will arrange many other adjustment means and associated settings without departing from the claimed matter.

FIG. 18 is a table showing how different degrees of assistance may be related to exemplary settings of an adjustment means, with typical actions according to present principles. First, a low degree of assistance may be selected by setting an adjustment means at a position marked "Warn only", in which case the system would warn the driver if a collision is imminent but would not intervene. A skilled and alert driver who does not want the automatic system to take over in an emergency may select that setting.

Second, a medium degree of assistance, labeled "Relinquish on demand", causes the system to provide the imminent-collision warning, and also to assume control of the vehicle. However, the system would relinquish control back to the driver if the driver asserts control by, for example, forcefully operating the steering wheel or accelerator or brakes in contravention to the system control. Or, the driver could assert control by pressing a button on the steering wheel, or by speaking a phrase that the processor could interpret such as "Relinquish control!".

Third, a high degree of assistance with the setting "Intervene until safe" would provide the warning message and system takeover, but would not relinquish control until the strategy has been implemented and all hazards have been cleared.

Figure 19:
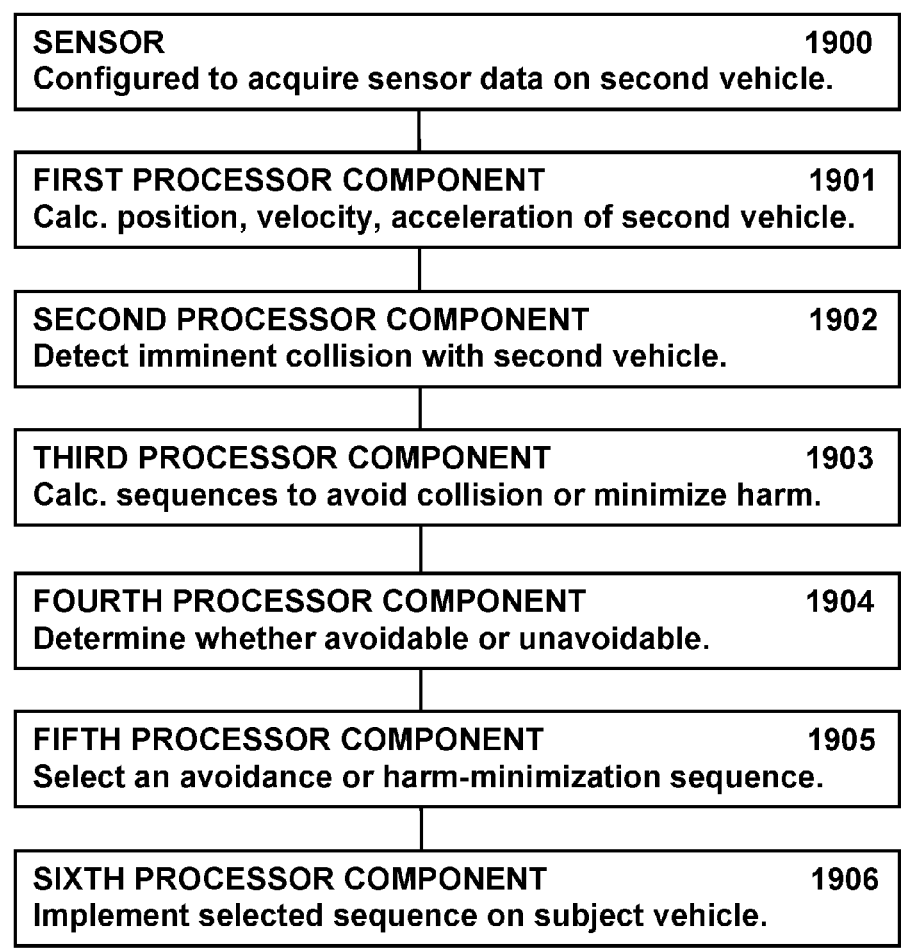
FIG. 19 is a schematic showing a system according to the present principles comprising sensors and processor components, with each processor component performing a specific function.

FIG. 19 is a schematic of a system according to present principles comprising one or more sensor 1900 and one or more processor components 1901-1906. The sensor(s) 1900 acquire sensor data on a second vehicle proximate to the subject vehicle, and transmit the sensor data to a first processor component 1901, which calculates ("calc.") the position or velocity or acceleration of the second vehicle. The second processor component 1902 analyzes the position, velocity, or acceleration data, thereby detecting an imminent collision. The third processor component 1903 then calculates one or more sequences, comprising periods of positive acceleration or deceleration or steering of the subject vehicle, to avoid the collision and/or to minimize its harm. The fourth processor component 1904 then determines if the collision can be avoided according to each of the sequences, and a fifth processor component 1905 selects an avoidance sequence or a harm-minimization sequence accordingly. Finally, a sixth processor component implements the sequence by sending control signals to the subject vehicle's means for acceleration, deceleration, and steering.

Figure 20:
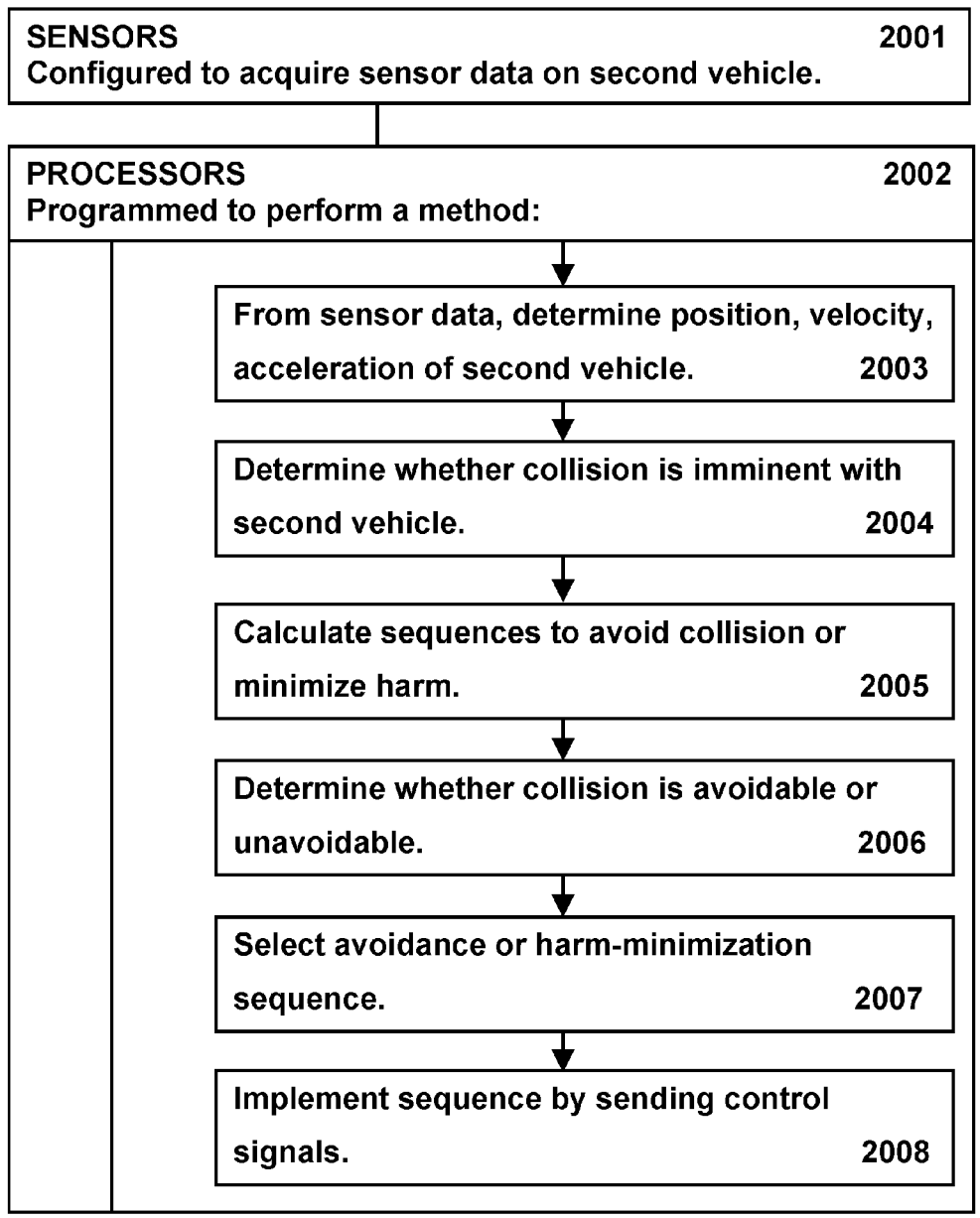
FIG. 20 is a schematic with embedded flowchart, showing how a system according to present principles mitigates collisions by analyzing sensor data, determining if a collision is imminent, determining if it is avoidable, and then implementing an appropriate mitigation sequence.

FIG. 20 is a schematic of an alternative system according to present principles. As before, sensors 2001 acquire sensor data on the second vehicle. In addition, processors 2002 are programmed to perform a method comprising: determining (2003) the position, velocity, or acceleration of the second vehicle from the sensor data; then determining (2004) whether a collision is imminent; then calculating (2005) sequences of accelerations, decelerations, and/or steering of the subject vehicle to avoid the collision or to minimize its harm; then determining (2006) whether the collision is avoidable if the subject vehicle is accelerated according to any of the sequences; then selecting (2007) either a collision-avoidance sequence or a harm-minimization sequence accordingly; and finally implementing (2008) the selected sequence by sending control signals to the subject vehicle throttle or brakes or steering.

Figure 21:
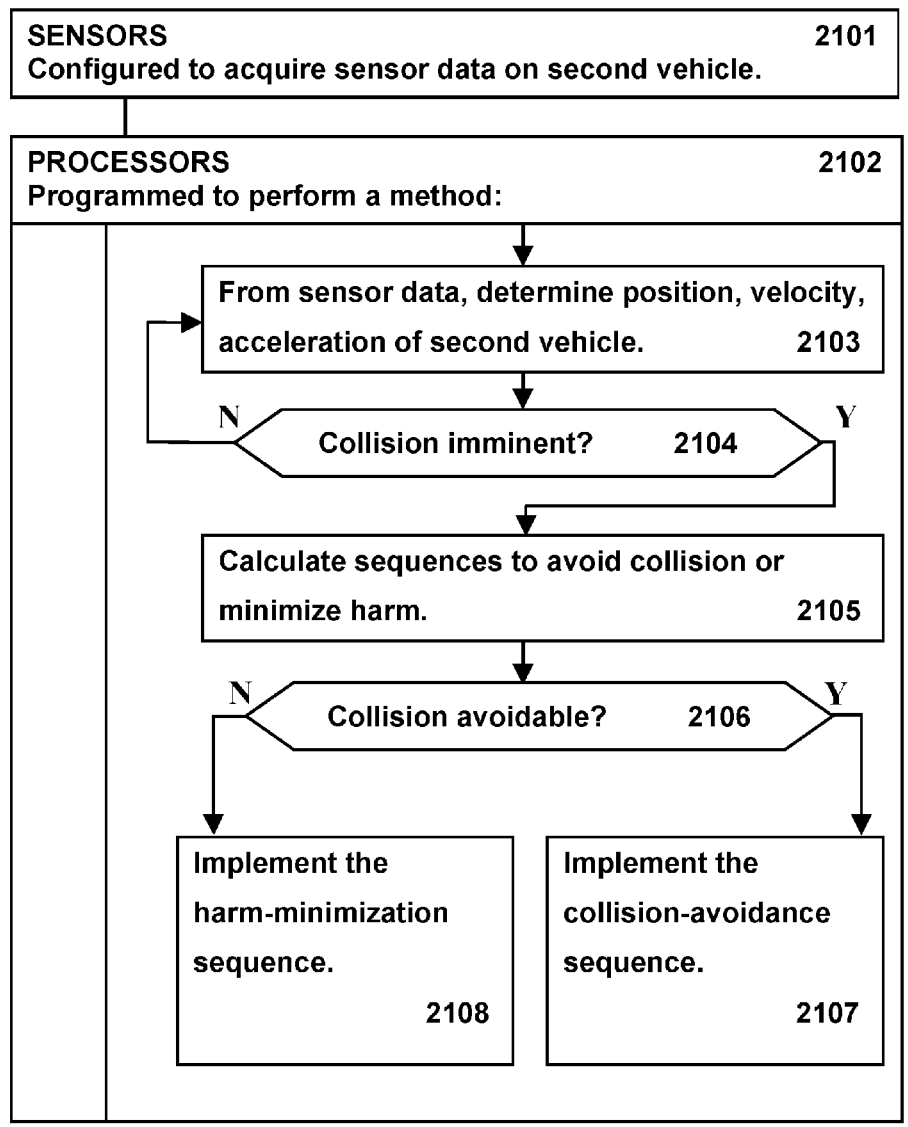
FIG. 21 is a schematic with embedded flowchart, showing how a system according to present principles determines from sensor data if a collision is imminent, and if so calculates if the collision is avoidable, and then implements an avoidance or harm-minimization sequence.

FIG. 21 is a schematic of yet another embodiment of a system according to present principles, again comprising sensors 2101 and processors 2012 programmed to perform a method. Here the method includes determining (2103), from the sensor data, the position or velocity or acceleration of the second vehicle. If the sensor data indicates that a collision is imminent (2104), then one or more sequences are calculated (2105) to avoid the collision or to minimize harm. If the calculations indicate that the collision is avoidable (2106), then the successful collision-avoidance sequence is implemented (2107). Otherwise, the best harm-minimization sequence is implemented (2108).

Figure 22:
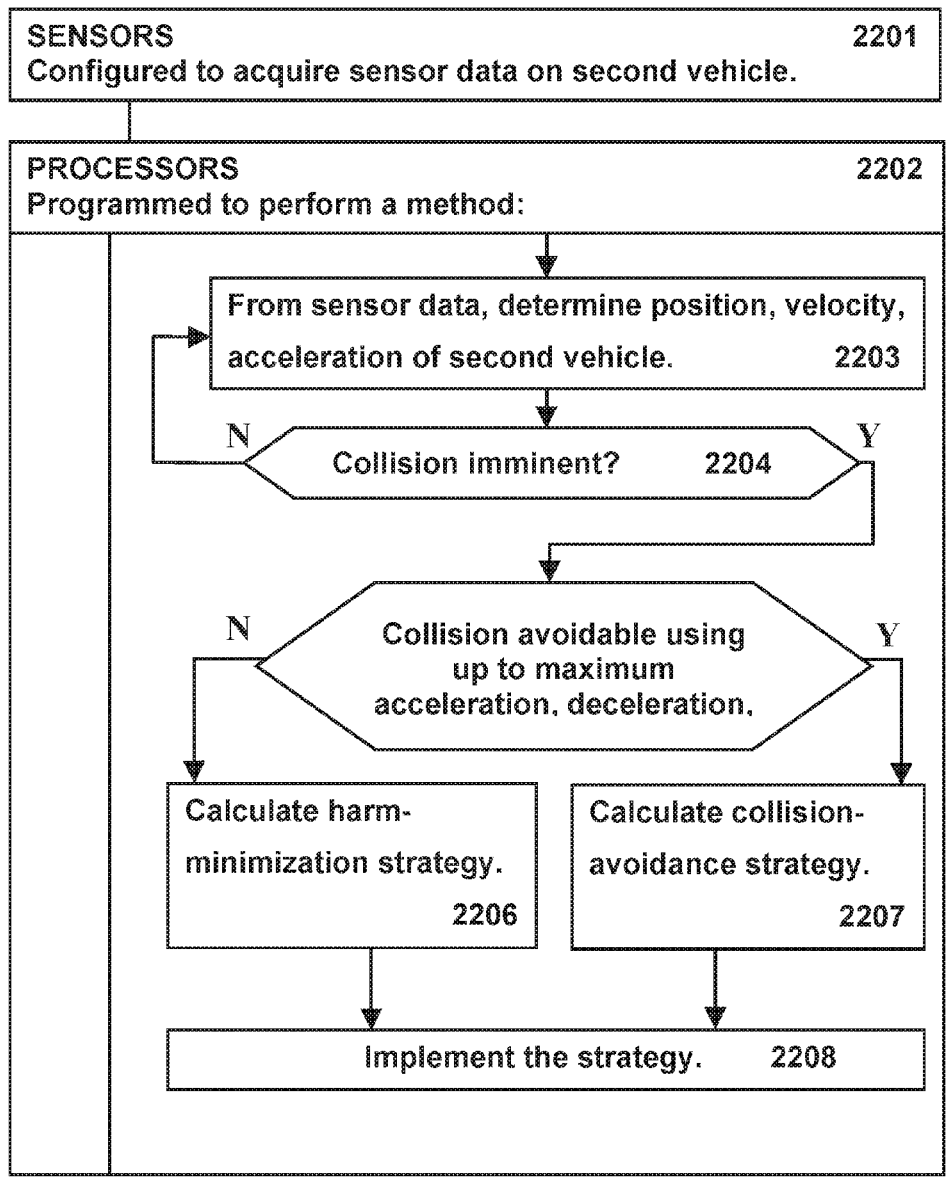
FIG. 22 is a schematic with embedded flowchart, showing how a system according to present principles determines from sensor data if a collision is imminent, and if so, calculates whether the collision can be avoided using up to the maximum acceleration, deceleration, and steering.

FIG. 22 is a schematic of yet another version of a system according to present principles. Sensors 2201 acquire sensor data on the second vehicle and transmit it to processors 2202 programmed to analyze the sensor data to determine (2203) the position or velocity or acceleration of the second vehicle. If (2204) the collision is imminent, the avoidability of the collision is determined (2205) according to sequences of acceleration up to the maximum acceleration, or decelerations up to the maximum deceleration, or steering up to the maximum rate of steering, that the subject vehicle is capable of. Then a collision-avoidance strategy is calculated (2207) if the collision is avoidable, or a harm-minimization strategy is calculated (2006) if otherwise, and the calculated strategy is then implemented (2208).

It is understood that the foregoing description is that of the preferred embodiments of the invention and that various changes and modifications may be made thereto without departing from the spirit and scope of the invention as defined in the appended claims.

What is claimed is:

1. A non-transitory computer readable medium, comprising instructions for causing a computing environment to perform a method for mitigating vehicle collisions, the method comprising:
 detecting, with a sensor mounted on a subject vehicle, a second vehicle;
 calculating that a collision is imminent between the subject vehicle and the second vehicle;
 preparing a plurality of sequences of actions, each action comprising a period of acceleration or deceleration or steering of the subject vehicle for a particular time interval at a particular intensity;
 calculating whether the collision is avoidable or unavoidable, wherein the collision is avoidable if any of the sequences avoids the collision, and the collision is unavoidable if the collision cannot be avoided by implementing any of the sequences;
 if the collision is avoidable, implementing a particular sequence that avoids the collision; and
 if the collision is unavoidable, calculating how much harm would result from a collision according to each of the sequences, and implementing a sequence associated with the least harm.

2. The medium of claim 1, wherein the detecting includes detecting position and velocity and acceleration data about the second vehicle and calculating a projected position of the second vehicle as a function of time.

3. The medium of claim 2, further comprising storing the position and velocity and acceleration data about the second vehicle in a non-transitory computer readable medium.

4. The medium of claim 2, further comprising performing a kinetic analysis comprising calculations including subject vehicle accelerations, and subject vehicle decelerations, and subject vehicle steering, and combinations thereof.

5. The medium of claim 2, further comprising updating the calculation during the implementation of the current avoidance or harm minimization strategy, and redetermining whether the collision has changed from avoidable to unavoidable or from unavoidable to avoidable.

6. The medium of claim 2, further comprising storing the position and velocity and acceleration data about the second vehicle in a first memory, and after a collision storing further position and velocity and acceleration data in a second memory, thereby preserving the position and velocity and acceleration data in the first memory.

7. The medium of claim 1, wherein the calculating that a collision is imminent includes determining if the subject vehicle and the second vehicle will pass within a predetermined radius of each other in the absence of alterations of greater than plus or minus 5% in velocity or direction of the subject vehicle and the second vehicle.

8. The medium of claim 1, wherein the calculating that a collision is imminent includes:
 analyzing data from one or more external sensors, thereby determining a position and a velocity and an acceleration of the second vehicle;
 analyzing data from one or more internal sensors, thereby determining a position and a velocity and an acceleration of the subject vehicle;
 calculating, from the position and velocity and acceleration of the second vehicle, and from the position and velocity and acceleration of the subject vehicle, future values of a separation distance between the subject vehicle and the second vehicle;
 calculating from the future values a collision time at which the separation distance is less than a predetermined separation distance; and
 determining, if the collision time is less than a predetermined time limit, that the collision is imminent.

9. The medium of claim 1, further comprising repeating one or more of the calculating steps responsive to further sensor data, the further sensor data being measured later in time than the sensor data on which the initial calculating was performed.

10. The medium of claim 9, further comprising:
 while the particular sequence is being implemented, continuing to analyze further sensor data, thereby determining if the collision remains avoidable or unavoidable;
 if the continuing analysis indicates that an avoidable collision has become unavoidable, responsively implementing the particular sequence associated with the least harm; and
 if the continuing analysis indicates that an unavoidable collision has become avoidable, responsively implementing the particular sequence that avoids the collision.

11. The medium of claim 1, wherein the calculating that a collision is imminent includes:
 measuring a position and a velocity and an acceleration of the second vehicle;
 calculating, from the position and velocity and acceleration of the second vehicle, future positions of the second vehicle, and if such future positions coincide with at least one future position of the subject vehicle, then determining that the collision is imminent;

calculating a collision time at which the second vehicle will collide with the subject vehicle;

and if the collision time is less than a predetermined threshold, determining that the collision is imminent.

12. The medium of claim 1, wherein the calculating if the collision is avoidable or unavoidable includes:
   a. receiving capability-data about the subject vehicle, wherein the capability-data includes information on the maximum acceleration, and the maximum deceleration, and the maximum rate of steering that the subject vehicle is capable of;
   b. and analyzing, with the capability data, whether the imminent collision can be avoided by applying the maximum acceleration or the maximum deceleration or the maximum rate of steering to the subject vehicle, or by applying sequential combinations of accelerations, decelerations, and steering actions, based on one or more of the maximums.

13. The medium of claim 1, wherein the calculating that a collision is imminent includes:
   evaluating, with data from the sensors, a rate of change of acceleration of the subject vehicle and the second vehicle;
   calculating, from the rate of change of acceleration of the subject vehicle and the second vehicle, future values of a separation distance between the subject vehicle and the second vehicle;
   calculating from the future values a collision time at which the separation distance is less than a predetermined separation distance, and
   determining, if the collision time is less than a predetermined time limit, that the collision is imminent.

14. The medium of claim 1, wherein the calculating if the collision is avoidable or unavoidable includes:
   receiving capability-data about the subject vehicle, wherein the capability-data includes information on the maximum acceleration, and the maximum deceleration, and the maximum rate of steering that the subject vehicle is capable of;
   analyzing, with the capability-data, whether the imminent collision can be avoided by applying the maximum acceleration to the subject vehicle;
   analyzing, with the capability-data, whether the imminent collision can be avoided by applying the maximum deceleration to the subject vehicle;
   analyzing, with the capability-data, whether the imminent collision can be avoided by applying the maximum rate of steering to the subject vehicle; and
   analyzing, with the capability-data, whether the imminent collision can be avoided by applying sequential combinations of accelerations, decelerations, and steering actions.

15. A non-transitory computer readable medium, comprising instructions for causing a computing environment to perform a method for mitigating vehicle collisions, the method comprising:
   detecting, with a sensor mounted on a subject vehicle, a second vehicle, and calculating a projected course of the second vehicle;
   if the subject vehicle is projected to collide with the second vehicle, calculating a plurality of sets of sequential actions to avoid a collision between the subject vehicle and the second vehicle;
   if the subject vehicle, when accelerated according to a particular one of the sets of sequential actions, is projected to avoid colliding with the second vehicle, then implementing the one particular set of sequential actions; and
   if the subject vehicle, when accelerated according to each of the sets of sequential actions, is projected to collide with the second vehicle, then calculating how much harm would be caused by collisions according to each set of sequential actions, and implementing a particular set of sequential actions that would cause the least harm.

16. The medium of claim 15, wherein implementing a particular set of sequential actions includes: measuring a position and velocity and acceleration of the subject vehicle, preparing a feedback signal by comparing the measured position or velocity or acceleration to the selected set of sequential actions, and controlling the accelerator and brakes and steering of the subject vehicle according to the feedback signal in real time, while the particular set of sequential actions are being implemented.

17. A non-transitory computer readable medium, comprising instructions for causing a computing environment to perform a method for mitigating vehicle collisions, the method comprising:
   detecting, with a sensor mounted on a subject vehicle, a second vehicle, and calculating position and velocity and acceleration data about the second vehicle;
   determining, based on the calculated position and velocity and acceleration data about the second vehicle, and on position and velocity and acceleration data about the subject vehicle, whether a collision is projected to occur between the subject vehicle and the second vehicle when no avoidance action is taken;
   if a collision is projected to occur, then calculating a first set of sequential actions to avoid the collision between the subject vehicle and the second vehicle;
   if the first set of sequential actions avoids the collision, implementing the first set of sequential actions; and
   if the first set of sequential actions fails to avoid the collision, then calculating a second set of sequential actions to minimize harm caused by the collision, and implementing the particular sequential action, of the first and the second set of sequential actions, which produces the least harm.

18. The medium of claim 17, wherein the calculating a second set of sequential actions includes:
   analyzing one or more sequences, each sequence comprising periods of acceleration or deceleration or steering of the subject vehicle in a particular order;
   calculating an amount of harm that would be caused by a collision according to each of the analyzed sequences by adding harm associated with fatalities plus harm associated with serious injuries plus harm associated with minor injuries plus harm associated with property damage;
   selecting, from the analyzed sequences, a particular sequence that would cause a minimum amount of harm;
   and implementing the particular sequence of accelerations or decelerations or steering of the subject vehicle.

19. The medium of claim 18, wherein the calculating an amount of harm includes:
   calculating how many fatalities would result from a collision according to each of the sequences;
   calculating how many injuries would result from a collision according to each of the sequences;
   calculating how much property damage would result from a collision according to each of the sequences;

adding, for each of the analyzed collisions, the calculated number of fatalities times a predetermined fatality coefficient, plus the calculated number of injuries times a predetermined injury coefficient, plus the calculated property damage times a predetermined property damage coefficient, wherein a sum of the adding indicates how much harm would be caused by a collision according to each of the sequences.

20. The medium of claim 18, wherein the calculating an amount of harm includes:
predicting vehicle distortions that would occur during a possible collision;
predicting peak accelerations that would occur during the possible collision;
estimating, from the predicted vehicle distortions and peak accelerations, a number of fatalities, a number of injuries, and an amount of property damage that would result from the possible collision;
and combining, according to a formula, the estimated number of fatalities, and the estimated number of injuries, and the estimated amount of property damage, thereby calculating the expected harm of the possible collision.

21. The method of claim 17, further comprising:
preparing, before a collision occurs, a post-collision strategy to minimize post-collision harm;
acquiring, during or after the collision, further sensor data;
updating, according to the further sensor data, the post-collision strategy;
and then implementing the updated post-collision strategy;
wherein:
the post-collision harm comprises harm that occurs after a collision occurs;
and the post-collision strategy comprises a sequence of accelerations or decelerations or steering of the subject vehicle.

22. The method of claim 21, wherein the post-collision strategy further includes at least one of:
turning off a fuel pump;
unlocking doors;
rolling down windows;
driving to a side of a road;
and transmitting a help-request message.

23. The method of claim 22, further comprising:
determining, after a collision occurs, whether a driver of the subject vehicle is responsive or nonresponsive;
while the driver is nonresponsive, implementing the post-collision strategy;
and while the driver is responsive, halting the post-collision strategy.

24. The method of claim 23, further comprising:
determining that the driver is responsive if the driver operates the accelerator or brakes or steering wheel of the subject vehicle after the collision occurs;
and determining that the driver is nonresponsive if the driver fails to operate any of the accelerator and the brakes and the steering wheel of the subject vehicle after the collision occurs.

25. The medium of claim 17, wherein each set of actions includes a positive acceleration of the subject vehicle, or a positive acceleration with steering of the subject vehicle, or a positive acceleration followed by braking of the subject vehicle.

26. The medium of claim 17, wherein the calculating a second set of sequential actions includes:
analyzing one or more sequences, each sequence comprising periods of acceleration or deceleration or steering of the subject vehicle in a particular order;
calculating an amount of harm that would be caused by a collision according to each of the analyzed sequences;
selecting, from the analyzed sequences, a particular sequence that would cause a minimum amount of harm;
implementing the particular sequence of accelerations or decelerations or steering of the subject vehicle;
continuing to calculate, while the particular sequence is being implemented, the amount of harm expected from the collision according to each of the sequences;
and, if an alternate sequence is calculated to result in less harm than the particular sequence, implementing the alternate sequence instead of the particular sequence.

27. A non-transitory computer readable medium, comprising instructions for causing a computing environment to perform a method for mitigating vehicle collisions, the method comprising:
detecting, with a sensor mounted on a subject vehicle, a second vehicle, and calculating if the second vehicle will collide with the subject vehicle;
calculating whether a first set of actions would avoid a collision with the subject vehicle;
if the first set of actions would avoid the collision, implementing the first set of actions;
if the first set of actions would fail to avoid the collision, calculating whether a second set of actions would avoid the collision:
if the second set of actions would avoid the collision, implementing the second set of actions; and
if the second set of actions would fail to avoid the collision, implementing which of the first or second set of actions that would cause the least amount of harm;
wherein each set of actions comprises a set of sequential accelerations of the subject vehicle, each acceleration having a specified timing, duration, direction, and amplitude;
and wherein a collision comprises the second vehicle striking the subject vehicle or passing within a predetermined radius of the subject vehicle.

28. The medium of claim 27, wherein:
the sequences of actions include at least one sequence that was stored in non-transient memory before the second vehicle was detected; and
the second set of one or more sequential accelerations or decelerations or steering actions is calculated to result in less harm than any other set of one or more sequential accelerations or decelerations or steering actions.

29. The medium of claim 27, wherein the first set of sequential actions comprises sequential accelerations or decelerations or steering actions of the subject vehicle, and wherein the second set of sequential actions comprises sequential accelerations or decelerations or steering actions of the subject vehicle, and wherein at least one of the sequential actions comprises a positive acceleration.

30. The method of claim 27, wherein:
the first set of sequential actions includes a plurality of sequences which are all different from each other;
the second set of sequential actions includes a plurality of sequences which are all different from each other and from any of the first set of sequences; and
the second set of sequential actions minimizes the harm caused by the collision if, after the second set of sequential actions is implemented, an amount of harm caused by the collision is less than the harm resulting from any of the other sequential actions.

* * * * *